(12) United States Patent
Schjerven, Sr. et al.

(10) Patent No.: US 11,835,229 B2
(45) Date of Patent: Dec. 5, 2023

(54) CONVECTION CONVEYOR OVEN MANIFOLD AND DAMPER SYSTEM

(71) Applicant: The Middleby Corporation, Elgin, IL (US)

(72) Inventors: William S. Schjerven, Sr., Schaumburg, IL (US); Richard H. Van Camp, Aurora, IL (US); Theodore James Chmiola, Roscoe, IL (US); Brent James Carlson, Watertown, WI (US); Robert Edward Jacob, Watertown, WI (US)

(73) Assignee: The Middleby Corporation, Elgin, IL (US)

( * ) Notice: Subject to any disclaimer, the term of this patent is extended or adjusted under 35 U.S.C. 154(b) by 304 days.

(21) Appl. No.: 17/174,185

(22) Filed: Feb. 11, 2021

(65) Prior Publication Data

US 2021/0164650 A1    Jun. 3, 2021

Related U.S. Application Data

(63) Continuation of application No. 16/218,294, filed on Dec. 12, 2018, now Pat. No. 10,920,980, which is a (Continued)

(51) Int. Cl.
*F23D 23/00*    (2006.01)
*F23D 14/60*    (2006.01)
(Continued)

(52) U.S. Cl.
CPC ............... *F23D 14/60* (2013.01); *A21B 1/33* (2013.01); *A21B 1/40* (2013.01); *A21B 1/48* (2013.01);
(Continued)

(58) Field of Classification Search
CPC .......... F23D 14/60; F23D 14/08; F23D 23/00; A21B 1/33; A21B 1/40; A21B 1/48;
(Continued)

(56) References Cited

U.S. PATENT DOCUMENTS 1,294,999 A    2/1919    Brickman
1,445,984 A    2/1923    Wilkinson
(Continued)

FOREIGN PATENT DOCUMENTS

EP    1484555 A1    12/2004
JP    S50122942 U    10/1975
(Continued)

OTHER PUBLICATIONS

Australian Patent Office Examination Report No. 1 for Application No. 2017286560 dated Jun. 15, 2022 (5 pages).
(Continued)

*Primary Examiner* — Avinash A Savani
(74) *Attorney, Agent, or Firm* — Michael Best & Friedrich LLP

(57) ABSTRACT

A gas manifold for a convection conveyor oven includes an elongated housing having a wall that at least partially encloses an interior volume; a gas inlet in fluid communication with the interior volume and extending through the wall; a plurality of gas outlets in fluid communication with the interior volume and extending through the wall; a plurality of seat inserts removably coupled with a plurality of gas outlets; a plurality of valve openings formed in the wall and aligned opposite the plurality of gas outlets; and at least one valve removably coupled to the wall and aligned with a first valve opening, wherein the valve is aligned with a first gas outlet and has a first position in which a first seat insert is not in fluid communication with the gas inlet.

17 Claims, 37 Drawing Sheets

Related U.S. Application Data continuation-in-part of application No. PCT/US2017/037540, filed on Jun. 14, 2017.

(60) Provisional application No. 62/445,141, filed on Jan. 11, 2017, provisional application No. 62/350,134, filed on Jun. 14, 2016.

(51) Int. Cl.

| | |
|---|---|
| *F23D 14/08* | (2006.01) |
| *A21B 1/48* | (2006.01) |
| *F23N 1/02* | (2006.01) |
| *F23N 1/00* | (2006.01) |
| *A21B 1/33* | (2006.01) |
| *F23N 1/10* | (2006.01) |
| *A21B 1/40* | (2006.01) |
| *F24C 3/12* | (2006.01) |
| *F24C 3/08* | (2006.01) |

(52) U.S. Cl.
CPC .............. *F23D 14/08* (2013.01); *F23D 23/00* (2013.01); *F23N 1/002* (2013.01); *F23N 1/005* (2013.01); *F23N 1/02* (2013.01); *F23N 1/102* (2013.01); *F24C 3/12* (2013.01); *F24C 3/087* (2013.01); *F24C 3/128* (2013.01)

(58) Field of Classification Search
CPC . F23N 1/002; F23N 1/005; F23N 1/02; F23N 1/102; F24C 3/12; F24C 3/087; F24C 3/128
USPC ....................................................... 126/21 A
See application file for complete search history.

(56) References Cited

U.S. PATENT DOCUMENTS

| | | | |
|---|---|---|---|
| 2,043,106 A | 6/1936 | Lange | |
| 2,051,401 A | 8/1936 | Winterstein | |
| 2,139,344 A | 12/1938 | Andersen | |
| 2,625,992 A | 1/1953 | Vernon | |
| 2,939,524 A | 6/1960 | Mathis et al. | |
| 3,162,430 A | 12/1964 | Wilkerson | |
| 3,440,975 A | 4/1969 | Beuker | |
| 3,451,650 A | 6/1969 | Teague, Jr. et al. | |
| 3,468,298 A | 9/1969 | Teague, Jr. et al. | |
| 3,469,567 A | 9/1969 | Bergquist | |
| 3,547,099 A | 12/1970 | McArthur, Jr. | |
| 3,580,164 A | 5/1971 | Baker | |
| 3,586,825 A | 6/1971 | Hurley | |
| 3,604,336 A | 9/1971 | Straub et al. | |
| 3,617,159 A | 11/1971 | Arndt | |
| 3,694,137 A | 9/1972 | Fichter et al. | |
| 3,749,546 A | 7/1973 | Reed et al. | |
| 4,055,677 A | 10/1977 | White | |
| 4,088,436 A | 5/1978 | Alferes | |
| 4,195,558 A | 4/1980 | Speakman | |
| 4,229,157 A | 10/1980 | Ito et al. | |
| 4,252,300 A | 2/1981 | Herder | |
| 4,297,942 A | 11/1981 | Benson et al. | |
| 4,337,893 A | 7/1982 | Flanders et al. | |
| 4,462,383 A | 7/1984 | Henke et al. | |
| 4,508,025 A | 4/1985 | Schultz | |
| 4,569,328 A | 2/1986 | Shukla et al. | |
| 4,614,491 A | 9/1986 | Welden | |
| 4,681,084 A | 7/1987 | Grech | |
| 4,739,154 A | 4/1988 | Bharara et al. | |
| 4,870,993 A | 10/1989 | Causo | |
| 4,887,959 A | 12/1989 | Shellenberger | |
| 4,940,040 A | 7/1990 | Randall et al. | |
| 4,951,648 A | 8/1990 | Shukla et al. | |
| 5,154,160 A | 10/1992 | Burtea et al. | |
| 5,213,128 A | 5/1993 | Baird | |
| 5,277,105 A | 1/1994 | Bruno et al. | |
| RE34,541 E | 2/1994 | Kreiger | |
| 5,361,749 A | 11/1994 | Smith et al. | |
| 5,368,476 A | 11/1994 | Sugahara et al. | |
| 5,379,752 A | 1/1995 | Virgil, Jr. et al. | |
| 5,452,709 A | 9/1995 | Mealer | |
| 5,470,018 A | 11/1995 | Smith | |
| 5,471,972 A | 12/1995 | Corliss, II et al. | |
| 5,531,212 A * | 7/1996 | Smoker .................. | F24H 9/1836 431/153 |
| 5,655,511 A | 8/1997 | Prabhu et al. | |
| 5,746,875 A | 5/1998 | Maydan et al. | |
| 5,795,145 A | 8/1998 | Manning et al. | |
| 5,819,721 A | 10/1998 | Carr et al. | |
| 5,829,425 A | 11/1998 | Woods et al. | |
| 5,836,296 A | 11/1998 | Hillis et al. | |
| 5,919,039 A | 7/1999 | Shaw et al. | |
| 5,937,846 A | 8/1999 | Martin et al. | |
| 5,938,425 A | 8/1999 | Damrath et al. | |
| 5,941,236 A | 8/1999 | Byrne | |
| 5,975,072 A | 11/1999 | Garceau et al. | |
| 6,000,933 A | 12/1999 | Frederick, Sr. | |
| 6,062,245 A | 5/2000 | Berglind et al. | |
| 6,085,775 A * | 7/2000 | Smith ....................... | B67D 7/74 137/269 |
| 6,096,987 A | 8/2000 | Krueger et al. | |
| 6,114,666 A | 9/2000 | Best | |
| 6,179,212 B1 | 1/2001 | Banko | |
| 6,453,984 B1 | 9/2002 | Liebermann et al. | |
| 6,481,433 B1 | 11/2002 | Schjerven, Sr. et al. | |
| 6,655,373 B1 | 12/2003 | Wiker | |
| 6,860,734 B2 | 3/2005 | Zia et al. | |
| 7,059,317 B2 | 6/2006 | Kobayashi | |
| 7,255,100 B2 | 8/2007 | Repper et al. | |
| 7,494,337 B2 | 2/2009 | Specht et al. | |
| 7,513,247 B2 | 4/2009 | Clauss et al. | |
| 7,800,023 B2 | 9/2010 | Burtea et al. | |
| 7,850,448 B2 | 12/2010 | Slaby | |
| 8,021,143 B2 | 9/2011 | Slaby | |
| RE43,035 E | 12/2011 | Schjerven et al. | |
| 8,087,407 B2 | 1/2012 | Wiker et al. | |
| 8,206,147 B2 | 6/2012 | Videto et al. | |
| 8,206,148 B2 | 6/2012 | Paesani | |
| 8,267,051 B2 | 9/2012 | Ando | |
| 8,281,779 B2 | 10/2012 | Wiker et al. | |
| 8,418,661 B2 | 4/2013 | Kanda et al. | |
| 8,757,203 B2 | 6/2014 | Cadeau et al. | |
| 8,839,714 B2 | 9/2014 | Schjerven et al. | |
| 8,839,779 B2 | 9/2014 | Wiker et al. | |
| 8,863,734 B2 | 10/2014 | Shaffer | |
| 8,960,234 B2 | 2/2015 | Cadeau et al. | |
| 9,080,678 B2 | 7/2015 | Naumann | |
| 9,291,364 B2 | 3/2016 | Okamoto et al. | |
| 9,297,537 B2 | 3/2016 | Hensley et al. | |
| 9,317,046 B2 | 4/2016 | Gum | |
| 2001/0054234 A1 | 12/2001 | Asta et al. | |
| 2005/0236596 A1* | 10/2005 | Nowling ............. | F16L 37/0982 251/149 |
| 2006/0147861 A1* | 7/2006 | Czajka ................... | F24C 3/103 431/278 |
| 2007/0235020 A1 | 10/2007 | Hills et al. | |
| 2008/0035746 A1 | 2/2008 | Willms | |
| 2008/0264406 A1 | 10/2008 | Burtea | |
| 2009/0000777 A1* | 1/2009 | Wanni ................... | F28D 9/0075 165/166 |
| 2014/0174301 A1 | 6/2014 | Moon et al. | |
| 2016/0296068 A1 | 10/2016 | Schjerven, Sr. et al. | |

FOREIGN PATENT DOCUMENTS

| | | |
|---|---|---|
| JP | S5132436 U | 3/1976 |
| JP | S54143439 U | 10/1979 |
| JP | S5532991 U | 3/1980 |
| JP | S57145137 U | 9/1982 |
| JP | S5965229 U | 5/1984 |
| WO | 98/10229 A1 | 3/1998 |
| WO | 2008/026031 A2 | 3/2008 |

(56) References Cited

FOREIGN PATENT DOCUMENTS

WO 2008/044107 A2 4/2008
WO 2017/218695 A1 12/2017

OTHER PUBLICATIONS

U.S. Patent and Trademark Non-Final Office Action, received for U.S. Appl. No. 15/183,480, dated Aug. 28, 2018 (13 pages).
International Search Report and Written Opinion, received for International Application No. PCT/US2017/037540, dated Nov. 3, 2017 (15 pages).
International Search Report and Written Opinion, received for International Application No. PCT/US2018/065273, dated Mar. 1, 2019 (11 pages).
Supplementary European Search Report and Opinion, received for European Patent Application No. 17814037.2, dated Nov. 28, 2019 (8 pages).
Australian Patent Office Examination Report No. 2 for Application No. 2017286560 dated Sep. 16, 2022 (3 pages).
European Patent Office Action for Application No. 17814037.2 dated Jan. 3, 2022 (7 pages).

* cited by examiner

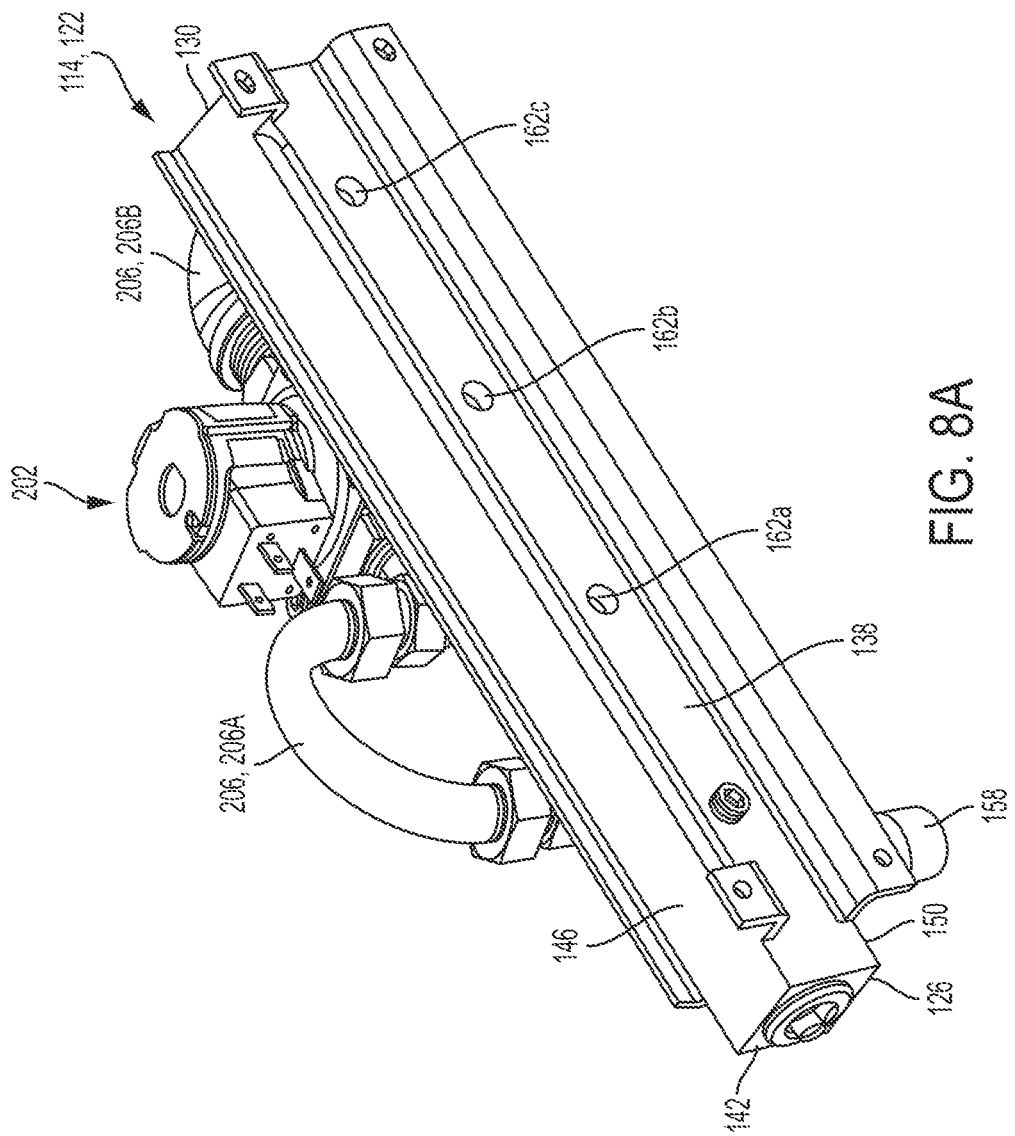

CONVECTION CONVEYOR OVEN MANIFOLD AND DAMPER SYSTEM

CROSS-REFERENCE TO RELATED APPLICATIONS

This patent application is a continuation of U.S. patent application Ser. No. 16/218,294, filed on Dec. 12, 2018, published as U.S. Publication No. 2019-0113229 A1 on Apr. 18, 2019, which is a continuation-in-part of International Patent Application No. PCT/US2017/037540, filed on Jun. 14, 2017, published as International Publication No. WO 2017/218695 on Dec. 21, 2017, which claims priority to U.S. provisional patent application No. 62/350,134 filed on Jun. 14, 2016, and to U.S. provisional patent application No. 62/445,141 filed on Jan. 11, 2017, the entire contents of each of which are incorporated herein by reference.

FIELD

Embodiments of the present disclosure relate to gas and heat delivery systems, and particularly to gas manifolds for heat delivery systems suitable for use in convection conveyor ovens, and methods of controlling gas flow in such heat delivery systems.

BACKGROUND

A convection conveyor oven is a convection oven with a conveyor that moves through a heated tunnel in the oven. Convection conveyor ovens are widely used for baking food products, such as pizzas and baked sandwiches. Examples of such ovens are shown, for example, in U.S. Pat. Nos. 5,277,105, 6,481,433, 6,655,373, 8,087,407, and 8,839,714, the entire contents of each of which are hereby incorporated by reference.

Convection conveyor ovens typically have at least one large metallic housing with a heated tunnel extending through the housing and a conveyor running through the tunnel. Such convection conveyor ovens may be either 70 inches or 55 inches long, although they may be constructed in any suitable size. The conveyor transports food products through the heated oven tunnel at a speed which bakes the food during transit through the tunnel. Such convection conveyor ovens often include a heat delivery system including blowers which supply heated air to the cooking tunnel from a plenum through passageways leading to metal fingers or ducts opening into the oven tunnel at locations above and below the conveyor. The metal fingers act as airflow channels that deliver streams of hot air which impinge upon the surfaces of the food products passing through the tunnel on the conveyor. A microprocessor-driven control panel generally enables the user to regulate the heat, the speed of the conveyor, etc., to properly bake the food product being transported through the oven.

The conveyor can be set at a speed calculated to properly bake selected food products on the belt during the time period required for the conveyor to carry the food through the entire length of the oven tunnel during a full baking or cooking cycle. If less than the set full baking or cooking cycle is required for a particular type of food product and it is not desired to change the conveyor speed, the food products may be placed on the conveyor at a point partially through the oven so that they travel only a portion of the length of the tunnel, or can be placed on the conveyor moving at a faster speed through the tunnel. Alternatively, the conveyor speed can often be varied to accommodate the particular baking or cooking cycle for a selected food product. A sandwich is an example of a product which might require only a portion of the full baking time of a pizza.

Convection conveyor ovens are typically used in restaurant and other types of commercial and institutional kitchens and commercial food preparation and manufacturing facilities. Often such ovens are kept running for extended periods of time, including periods when products are not being baked. Since the inlet and outlet ends of the oven are open, heat and noise are continuously escaping from the conveyor oven tunnel into the surrounding environment. This escape of heat wastes energy, and also warms the surrounding environment—usually unnecessarily and often to uncomfortable levels. This is particularly the case where the convection oven is being used in relatively cramped restaurant kitchen environments. The escaping noise is also undesirable since it may interfere with interpersonal communication among those working near the oven.

Some convection conveyor ovens may also provide users with limited ability to reduce energy losses while running at less than full capacity. Users may only have the ability to turn such ovens on or off, which in many cases involves unacceptably long shut-down and/or start-up times. Therefore, it is necessary to leave such ovens on despite the waste of fuel or other energy supplied to the ovens when cooking food intermittently. It is not uncommon for a convection conveyor oven to be left running in a full production mode for substantially the entire period of time a restaurant or other cooking facility is open.

It is often desirable to maintain uniform heating from one end of the heated tunnel of the oven to the other. However, in other applications it is instead desirable to be able to control the delivery of heat at different points or sections along the conveyor, such as to control the temperature or quantity of heat delivered to an upstream portion of the tunnel independently of the temperature or quantity of heat delivered to a downstream portion of the tunnel. Among the challenges to be overcome in achieving uniform or localized heating control along the tunnel are the inherent variations in heating from oven to oven due to variations in the external environment of otherwise identical ovens. A more significant challenge to maintaining uniform or localized heating control through the length of the heated tunnel is the constantly changing physical and thermal configuration of the tunnel as food products being baked pass from one end of the tunnel to the other. For example, raw pizzas entering the inlet to the tunnel constantly change the physical and thermal configuration of the tunnel environment as they advance to the other end while drawing and emitting ever-varying amounts of heat. As a result, temperatures can vary significantly from one end of the tunnel to the other.

A very common technique for thermal control along the tunnel of conventional convection conveyor ovens involves monitoring temperatures near the inlet and outlet ends of the heated tunnel to maintain a predetermined average temperature over the length of the tunnel. Thus, for example, as a cold raw pizza enters the inlet to the tunnel causing a sudden drop in the tunnel temperature at the inlet, the drop in temperature is sensed and more heat is supplied to the tunnel to raise the temperature near the inlet heat sensor. Unfortunately, this also raises the temperature at the outlet of the oven, which causes the heat sensor at the outlet to trigger a heating reduction to prevent an excessive temperature at the oven outlet. In this way, temperature sensors near the inlet and outlet of the oven help to balance the heating of the tunnel to generally maintain a target average temperature.

However, uniform heating through the length of the heated tunnel may be difficult to achieve in this way. Thus, food products traveling through the oven do not see uniform heating which, it has been discovered, makes it necessary to slow the conveyor to a speed which completes the baking in more time than would be the case if uniform heating could be achieved throughout the length of the heated tunnel. In other words, improved heating uniformity from one end of the tunnel to the other may reduce required baking times.

Additionally, in many applications it is necessary to be able to operate the convection conveyor oven using either side as the inlet, by running the conveyor belt either from left-to-right for a left side inlet, or from right-to-left for a right side inlet. To be most successful in such interchangeable applications, it is particularly desirable to produce a uniform temperature from one end of the heated tunnel to the other.

Even in those convection conveyor ovens in which thermal control along different portions of the tunnel is possible, such control is limited by each individual burner's range of heat output. For example, relatively low or relatively high burner BTU output can generate problems associated with poor combustion. Low burner BTU output may generate incomplete combustion products such as carbon monoxide (CO) production and flame lift-off. To address these problems, when the oven is operating at a lower temperature, one or more of the burners may be turned off so that the remaining burners may function at a higher BTU output so that the remaining burners may burn more efficiently. The ability to independently control the gas supply to burners or sets of burners remains limited in many convection conveyor ovens. In addition, conventional gas supply systems needed for such control are often complex, expensive, and difficult to install, remove, and service.

In convection conveyor ovens, the burners that heat the tunnel or the multiple tunnel segments are typically positioned within a shared burner housing or burner box. Heat exchange tubes are in fluid communication with the burners in the burner housing to provide heated air to a plenum and to a cooking chamber. In convection conveyor ovens having multiple burners that may be controlled independently of each other, heat exchange tubes positioned near burners that are turned off may pull relatively cool external air through the heat exchange tubes and into the plenum, reducing the temperature of the air supplied to the plenum and reducing the effectiveness of the burners at supplying heated air to the plenum.

SUMMARY

Some embodiments of the present disclosure provide a gas manifold for a convection conveyor oven, wherein the manifold comprises an enclosed housing having at least one continuous wall defining an interior volume of the housing, wherein the interior volume comprises a first chamber and a second chamber, and wherein the first chamber is in selective fluid communication with the second chamber; and a gas inlet in fluid communication with the first chamber; wherein a plurality of gas outlets are disposed in the at least one continuous wall, with at least one of the gas outlets positioned to discharge gas from the first chamber, and at least another of the gas outlets positioned to discharge gas from the second chamber.

In some embodiments, a gas manifold for a convection conveyor oven is provided, and comprises a housing constructed of a single seamless integral body and defining a longitudinal axis, wherein the housing has a first end and a second opposite end spaced from the first end along the longitudinal axis; a first chamber and a second chamber defined by the housing, wherein the second chamber is in fluid communication with the first chamber and the first and second chambers are disposed between the first end and second end of the housing; a gas inlet in fluid communication with the first chamber, wherein the gas inlet is spaced from the second chamber along the longitudinal axis; and a first valve in fluid communication with the first chamber and the second chamber, wherein the first valve is operable to selectively control the flow of gas from the first chamber to the second chamber, wherein the housing defines a plurality of gas outlets spaced along the longitudinal axis, and wherein at least one of the gas outlets is positioned to discharge gas from the first chamber and at least another of the gas outlets is positioned to discharge gas from the second chamber.

Some embodiments of the present disclosure provide a gas manifold for a convection conveyer oven, wherein the manifold comprises a housing constructed of a single seamless integral body and defining an elongated interior space for receiving gas, wherein the elongated interior space has (i) a longitudinal axis, and (ii) a first end and a second opposite end spaced from the first end along the longitudinal axis; a gas inlet in fluid communication with the interior space, wherein the gas inlet is spaced from at least one of the first end and the second end of the interior space along the longitudinal axis; a plurality of gas outlets defined by the housing, wherein the plurality of gas outlets are positioned along the longitudinal axis between the first end and the second end of the interior space to discharge gas from the interior space; and a first valve in fluid communication with the inlet and at least one of the gas outlets, wherein the gas inlet and at least one of the gas outlets are positioned upstream of the first valve, and wherein the first valve has a first state in which gas received through the gas inlet is supplied to all of the gas outlets, and a second state in which gas received through the gas inlet is supplied to less than all of the gas outlets.

In some embodiments, a gas manifold for a convection conveyor oven is provided, and comprises a housing having a continuous wall defining an interior space of the housing; a gas inlet in communication with the interior space; a plurality of gas outlets spaced apart from one another along the continuous wall; and a first valve positioned downstream of the gas inlet and at least one of the gas outlets, the first valve having a first state in which gas received through the gas inlet is supplied to all of the gas outlets, and a second state in which gas received through the gas inlet is supplied to less than all of the gas outlets, wherein the housing and the first valve define a single integral unit.

Some embodiments of the present disclosure provide a gas manifold for a convection conveyor oven, wherein the manifold comprises a housing having a wall with a plurality of sides collectively defining an interior space of the housing; a gas inlet defined in one side of the plurality of sides and in communication with the interior space; a plurality of gas outlets spaced apart from one another along one continuous side of the plurality of sides; and a first valve positioned downstream of the gas inlet and at least one of the gas outlets, the first valve having a first state in which gas received through the gas inlet is supplied to all of the gas outlets, and a second state in which gas received through the gas inlet is supplied to less than all of the gas outlets, wherein the housing and the valve are configured to be mounted and installed in the oven as a single integral unit with the gas inlet.

In some embodiments, a gas manifold for a convection conveyor oven is provided, wherein the manifold is in fluid communication with a gas supply line, and wherein the manifold comprises an enclosed housing having a continuous wall defining an interior volume of the housing, wherein the interior volume comprises a first chamber and a second chamber and each chamber is in fluid communication with the gas supply line; a plurality of gas outlets disposed in the at least one continuous wall, with at least one of the gas outlets positioned to discharge gas from the first chamber, and at least another of the gas outlets positioned to discharge gas from the second chamber; a shut off valve in fluid communication with the gas supply line and the first chamber; and a variable flow valve in fluid communication with the gas supply line and the second chamber.

Some embodiments of the present disclosure provide a method of connecting a gas supply line to burners of a convection conveyor oven, wherein the method comprises orienting, as a single integral unit, a gas manifold assembly with respect to a gas supply line and a mounting location on the oven, the gas manifold assembly comprising a housing having a plurality of walls collectively defining an interior space of the housing, a gas inlet, a plurality of gas outlets, and a valve; mounting the gas manifold assembly at the mounting location as the single integral unit; connecting the gas inlet of the gas manifold assembly to the gas supply line; connecting each gas outlet of the manifold assembly to at least one of the burners of the oven via gas conduits; simultaneously supplying gas through the inlet and through all of the outlets of the gas manifold assembly to the burners of the oven; and reducing gas supply through the valve to at least one of the outlets of the gas manifold assembly while continuing to supply gas to another of the outlets.

In some embodiments, a gas manifold for a convection conveyor oven connectable to a gas supply is provided, and comprises a housing defining a longitudinal axis and a continuous wall extending along the longitudinal axis, wherein the housing has a first end and a second opposite end spaced from the first end along the longitudinal axis; a first chamber and a second chamber defined by the housing, wherein the first chamber and second chamber are disposed between the first end and second end of the housing; a first gas inlet in fluid communication with the gas supply and the first chamber; a first valve in fluid communication with the gas supply and the first gas inlet, wherein the first valve is operable to selectively control the flow of gas from the gas supply to the first chamber; and a second gas inlet in fluid communication with the gas supply and the second chamber, wherein the housing defines a plurality of gas outlets spaced along the continuous wall, and at least one of the gas outlets is positioned to discharge gas from the first chamber and at least one of the gas outlet is positioned to discharge gas from the second chamber, and wherein the valve has a first state in which gas is supplied to all of the gas outlets, and a second state in which gas is supplied to less than all of the gas outlets positioned.

Some embodiments of the present disclosure provide a gas manifold for a convection conveyer oven connectable to a gas supply, wherein the manifold comprises a housing defining an elongated interior space for receiving gas, wherein the elongated interior space has (i) a longitudinal axis, (ii) a continuous wall extending along the longitudinal axis, and (iii) a first end and a second opposite end spaced from the first end along the longitudinal axis; a first gas inlet in fluid communication with the interior space; a second gas inlet in fluid communication with the interior space, wherein the second gas inlet is spaced from the first gas inlet along the longitudinal axis; a plurality of gas outlets defined by the housing spaced along the continuous wall between the first end and the second end of the interior space to discharge gas from the interior space; and a first valve in fluid communication with the gas supply, the first gas inlet, and the gas outlets, wherein the first valve has a first state in which gas is supplied to all of the gas outlets, and a second state in which gas is supplied to less than all of the gas outlets.

In some embodiments, a gas manifold for a convection conveyor oven is provided, wherein the gas manifold is selectively in fluid communication with a gas supply, and wherein the gas manifold comprises an elongate housing including a longitudinal axis and a plurality of sidewalls that extend between a first end wall and a second end wall, the plurality of sidewalls, the first end wall, and the second end wall cooperatively defining an elongated interior volume extending along the longitudinal axis; a gas inlet in fluid communication with the interior volume, the gas inlet extending through one of the sidewalls; a plurality of gas outlets in fluid communication with the interior volume, the plurality gas outlets extending through one of the sidewalls and spaced apart along the longitudinal axis; and a valve at least partially positioned within the interior volume, the valve having a first position in which all of the gas outlets are in fluid communication with the inlet and a second position in which one of the gas outlets is not in fluid communication with the inlet.

Some embodiments of the present disclosure provide a convection conveyor oven comprising a plurality of gas burners configured to supply heated air to a cooking chamber, wherein the plurality of gas burners is in fluid communication with a gas manifold, the gas manifold extending along a longitudinal axis and including an elongate interior volume in fluid communication with a gas inlet and a plurality of gas outlets, the gas manifold including a valve to selectively block gas flow to at least one of the plurality of gas outlets; a plenum in fluid communication with the plurality of gas burners; a blower in fluid communication with the plenum and the cooking chamber; and wherein the air heated by the plurality of burners flows through the plenum and the blower to the cooking chamber.

In some embodiments, a convection conveyor oven is provided, and comprises a plurality of gas burners configured to supply heated air to a cooking chamber, wherein the plurality of gas burners is in fluid communication with a gas manifold, the gas manifold including an elongate interior volume in fluid communication with a gas inlet and a plurality of gas outlets, the gas manifold including a valve positioned downstream of the inlet and at least one of the plurality of gas outlets and upstream of at least one of the plurality of gas outlets, the valve having a first position in which gas flows to all of the plurality of gas outlets and a second position in which gas does not flow through the at least one gas outlet positioned downstream of the valve; a plurality of heat exchange tubes, each of the plurality of heat exchange tubes in fluid communication with a respective outlet of each of the plurality of burners; a burner housing in fluid communication with the plurality of burners and the plurality of heat exchange tubes; and a damper positioned proximate an inlet of a heat exchange tube aligned with a burner in fluid communication with a gas outlet positioned downstream of the valve, the damper having a first position in which the heat exchange tube is in fluid communication with the housing and a second position in which the heat exchange tube is not in fluid communication with the housing.

In some embodiments, a gas manifold for a convection conveyor oven is provided, the gas manifold comprising an elongated housing defining a longitudinal axis and an interior volume extending along the longitudinal axis, the elongated housing having a wall that at least partially encloses the interior volume; a gas inlet in fluid communication with the interior volume, the gas inlet extending through the wall; a plurality of gas outlets in fluid communication with the interior volume, the plurality gas outlets extending through the wall and spaced apart along the longitudinal axis; a plurality of seat inserts, wherein each one of the plurality of seat inserts is removably coupled with one of the plurality of gas outlets; a plurality of valve openings formed in the wall and spaced along the longitudinal axis, wherein each one of the valve openings is aligned opposite one of the plurality of gas outlets; and at least one valve removably coupled to the wall and aligned with a first valve opening of the plurality of valve openings, wherein the at least one valve is aligned with a first gas outlet of the plurality of gas outlets, and wherein the at least one valve has a first position in which a first seat insert of the plurality of seat inserts is not in fluid communication with the gas inlet.

In some embodiments, a gas manifold for a convection conveyor oven is provided, the gas manifold comprising an elongated housing defining a longitudinal axis and an interior volume extending along the longitudinal axis, the elongated housing having a wall that at least partially encloses the interior volume; a gas inlet in fluid communication with the interior volume, the gas inlet extending through the wall; a plurality of gas outlets in fluid communication with the interior volume, the plurality gas outlets extending through the wall and spaced apart along the longitudinal axis; a seat insert removably coupled with a first gas outlet of the plurality of gas outlets and having a passageway to discharge gas from the interior volume; an injector coupled with the seat insert and in fluid communication with the passageway; and a plug removably coupled with a second gas outlet of the plurality of gas outlets, wherein the plug and the seat insert are configured to be interchangeably received in the first and second gas outlets.

In some embodiments, a gas manifold for a convection conveyor oven is provided, the gas manifold comprising an elongated housing defining a longitudinal axis and an interior volume extending along the longitudinal axis, the elongated housing having a wall that at least partially encloses the interior volume; a gas inlet in fluid communication with the interior volume, the gas inlet extending through the wall; a plurality of gas outlets in fluid communication with the interior volume, the plurality of gas outlets extending through the wall and spaced apart along the longitudinal axis; a seat insert removably coupled with a first gas outlet of the plurality of gas outlets and having a passageway to discharge gas from the interior volume; an injector coupled with the seat insert and in fluid communication with the passageway; a plug removably coupled with a second gas outlet of the plurality of gas outlets, wherein the plug and the seat insert are configured to be interchangeably received in the first and second gas outlets; a plurality of valve openings formed in the wall and spaced along the longitudinal axis, wherein each of the plurality of valve openings is aligned opposite one of the plurality of gas outlets; and a valve removably coupled to the wall and aligned with a first valve opening of the plurality of valve openings, wherein the valve has a first position in which the seat insert is not in fluid communication with the gas inlet.

Further aspects of the present disclosure, together with the organization and operation thereof, will become apparent from the following detailed description when taken in conjunction with the accompanying drawings.

BRIEF DESCRIPTION OF THE DRAWINGS

Embodiments of the present disclosure are shown in the attached drawings, in which:

FIG. 8A is a front perspective view of the gas manifold of FIG. 8.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting.

Conveyors

Figure 1:
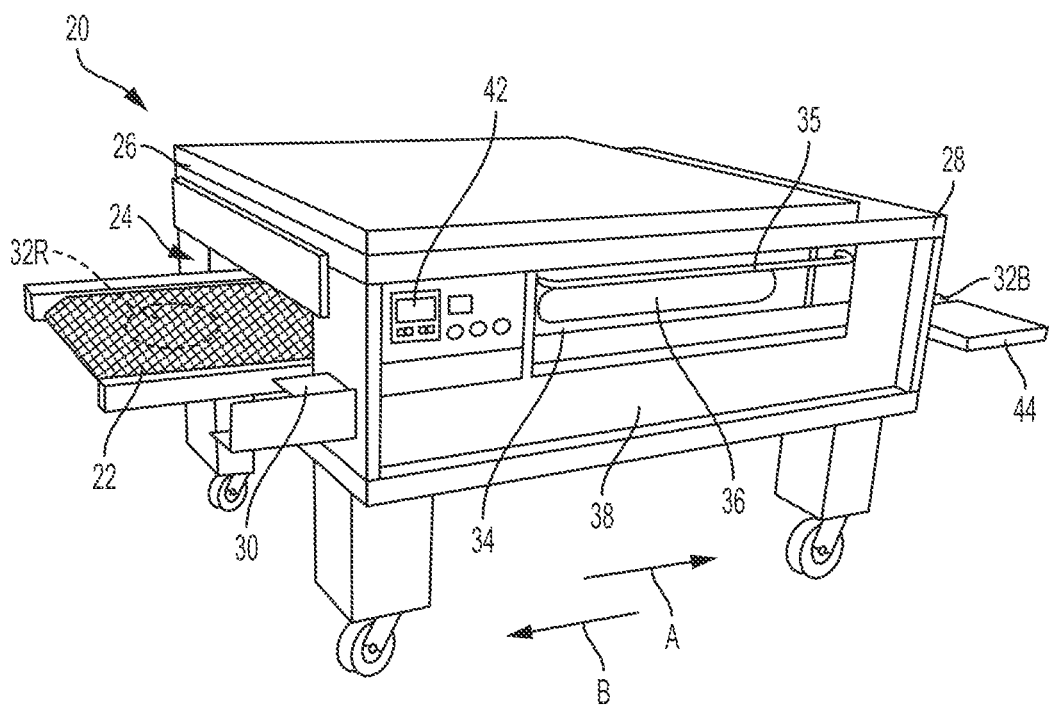
FIG. 1 is a perspective view of a conveyor oven in accordance with an embodiment of the present disclosure.

FIG. 1 shows a convection conveyor oven 20 having a conveyor 22 which runs through a heated tunnel 24 of the oven. The conveyor 22 has a width generally corresponding to the width of the heated tunnel 24 and is designed to travel in direction A from left or first oven end 26 toward right or second oven end 28 or, alternatively in direction B, from second oven end 28 toward first oven end 26. Thus, oven ends 26 and 28 may serve respectively as the inlet and outlet of an oven with a conveyor moving from the first to the second end or as the outlet and inlet of an oven with a conveyor moving from the second to the first end.

The support, tracking and drive of conveyor 22 are achieved using conventional techniques such as those described in U.S. Pat. Nos. 5,277,105 and 6,481,433 and 6,655,373, the entire contents of each of which are incorporated herein by reference, including for their teachings of conveyor support, tracking and drive elements and methods. In the illustrated embodiment, a chain link drive is housed within a compartment at the left end 26 of the oven. Thus, a food product, such as a raw pizza 32R, may be placed on the conveyor 22 at the ingoing first oven end 26 and removed from the conveyor 22 as fully baked pizza 32C (see FIG. 5C) at the outgoing second oven end 28. The speed at which the conveyor 22 moves is coordinated with the temperature in the heated tunnel 24 so that the emerging fully cooked pizza 32C is properly baked.

Normally only one conveyor is used, as shown. However, certain specialized applications may make two or more conveyors a preferable design. For example, a first conveyor may begin at first oven end 26 and travel at one speed to the center or other location of the oven 20, while a second conveyor beginning at the center or other location and ending at the second oven end 28 may travel at a different speed. Alternatively, conveyors that are split longitudinally may be used, so that one conveyor carries a product in direction A while the other conveyor carries a product in direction B, or so that two side-by-side conveyors carry product in parallel paths and in the same direction (A or B) through the oven 20. This enables one product to travel on the conveyor at one speed to bake one kind of product and the other conveyor to travel on the other conveyor at a different speed to bake another kind of product. In addition, three or more side-by-side conveyors can carry product in parallel paths through the oven 20.

Access

With reference to FIG. 1, a hinged door 34 is provided on the front of the oven 20, with a heat resistant glass panel 36 and a handle 35 so that a person operating the oven can view food product as it travels through the oven 20. A stainless steel metal frame surrounds the oven opening and provides a support for a gasket of suitable material (not shown), so that when the door 34 is in its closed position, it fits against and compresses the gasket to retain heat in the oven 20. Also, the operator may open the door 34 by pulling on handle 35 to place a different product on an intermediate position on the conveyor 22 if less than a full bake cycle is required to produce a fully cooked product.

Figure 2:
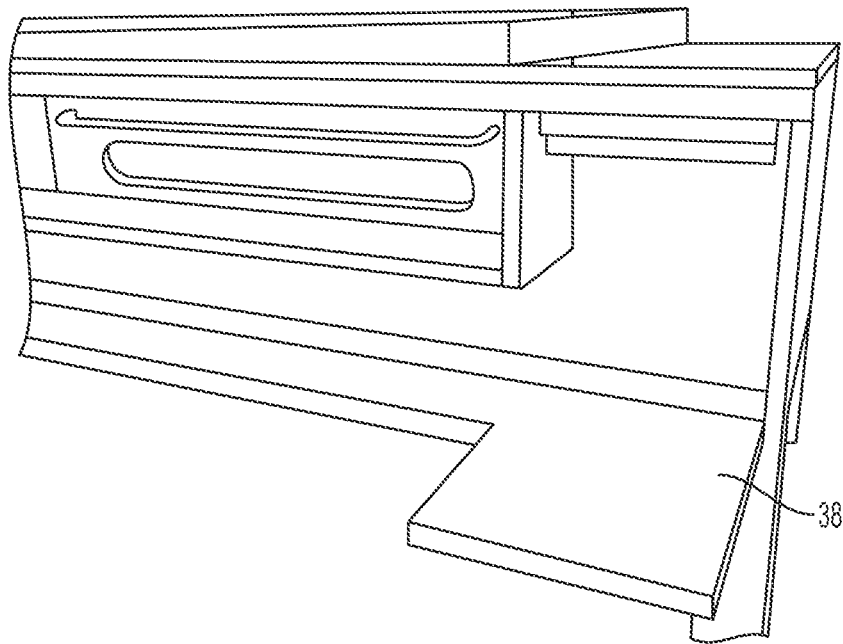
FIG. 2 is a perspective view of a portion of the conveyor oven of FIG. 1, in which a hinged oven access panel has been opened to reveal a compartment for housing internal workings (not shown) of the oven.
Figure 11:
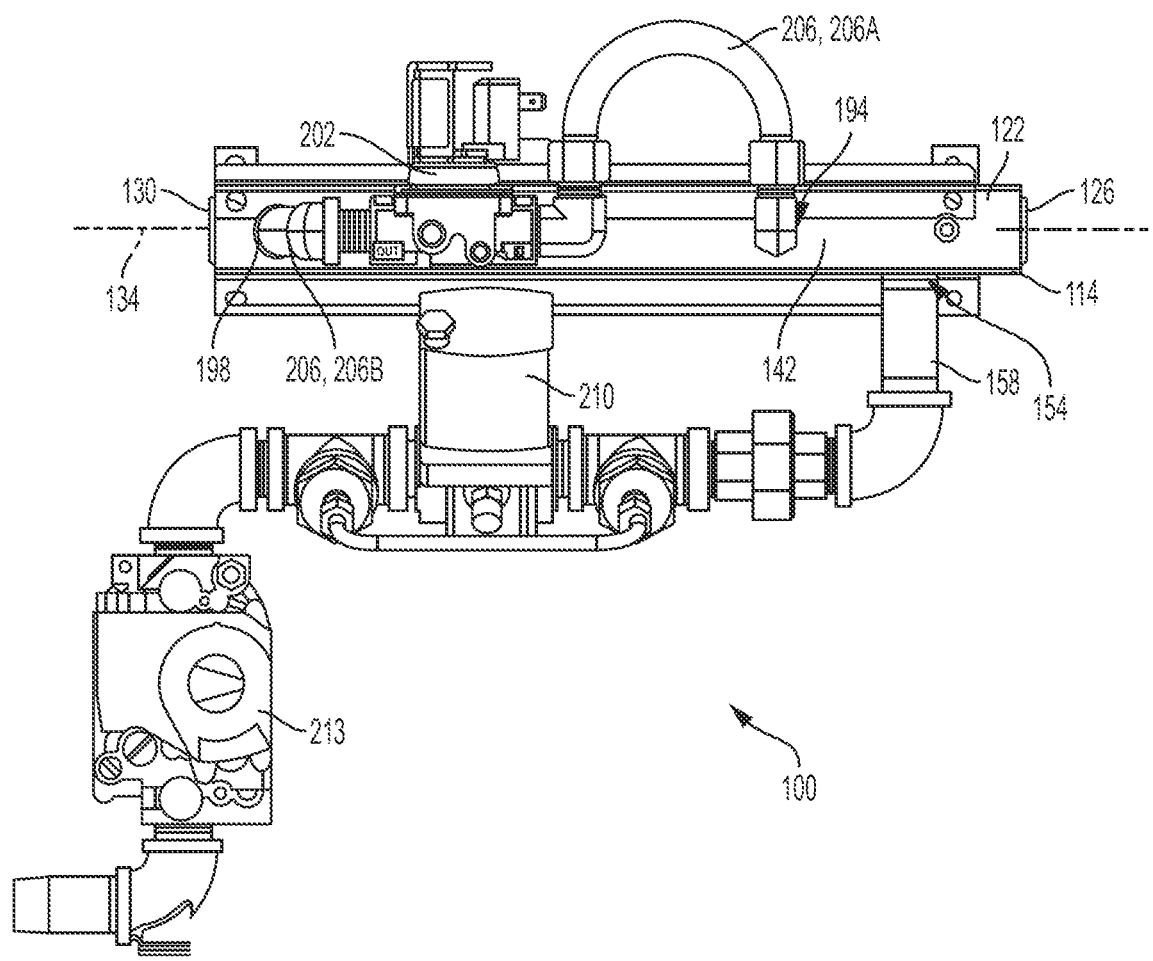
FIG. 11 is a side view of the gas manifold of FIG. 8, shown with the supply conduit and valves illustrated in FIG. 9.
Figure 12:
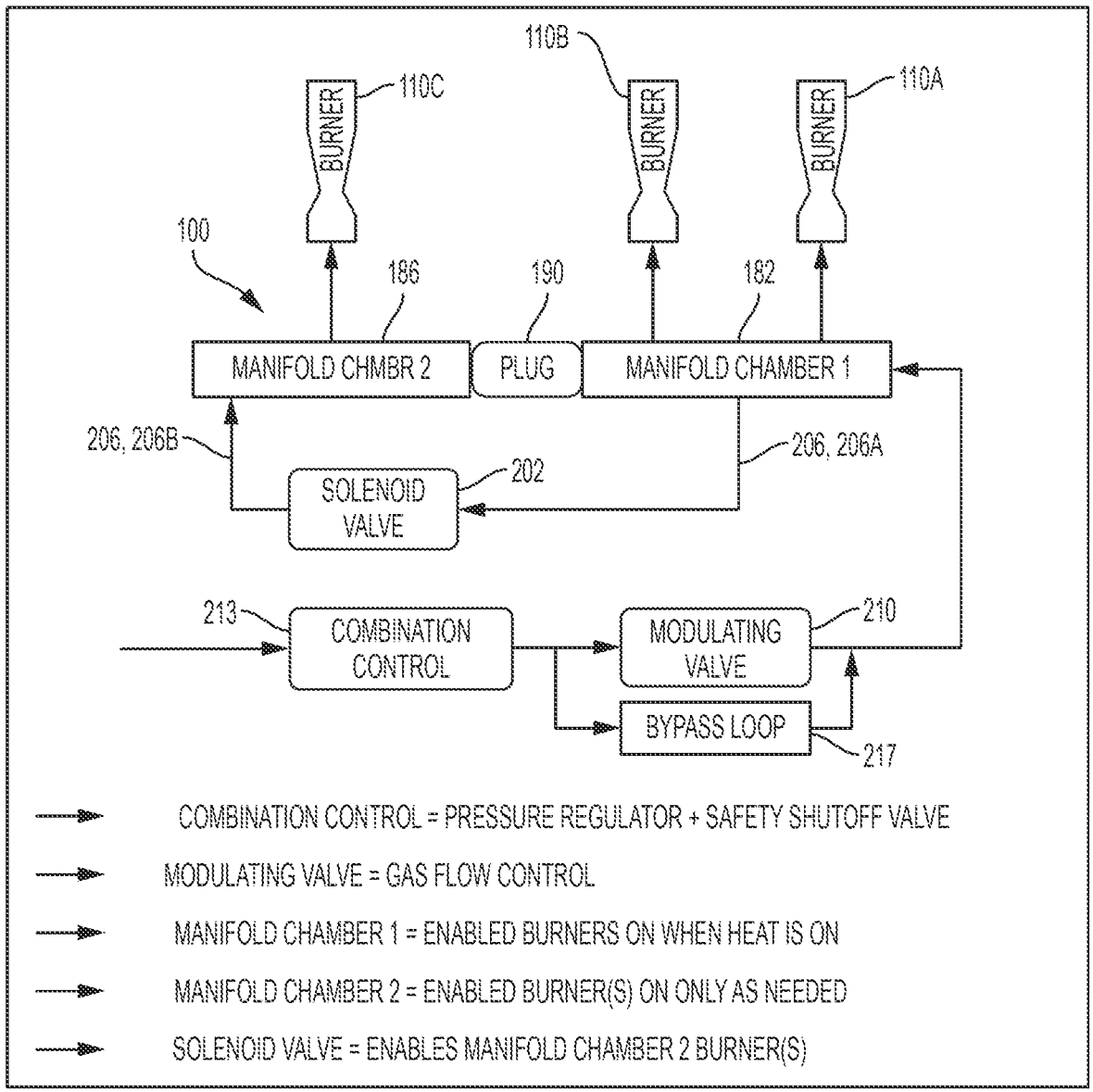
FIG. 12 is a schematic diagram of one embodiment of a gas manifold shown connected to a gas supply conduit and valves.
Figure 13:
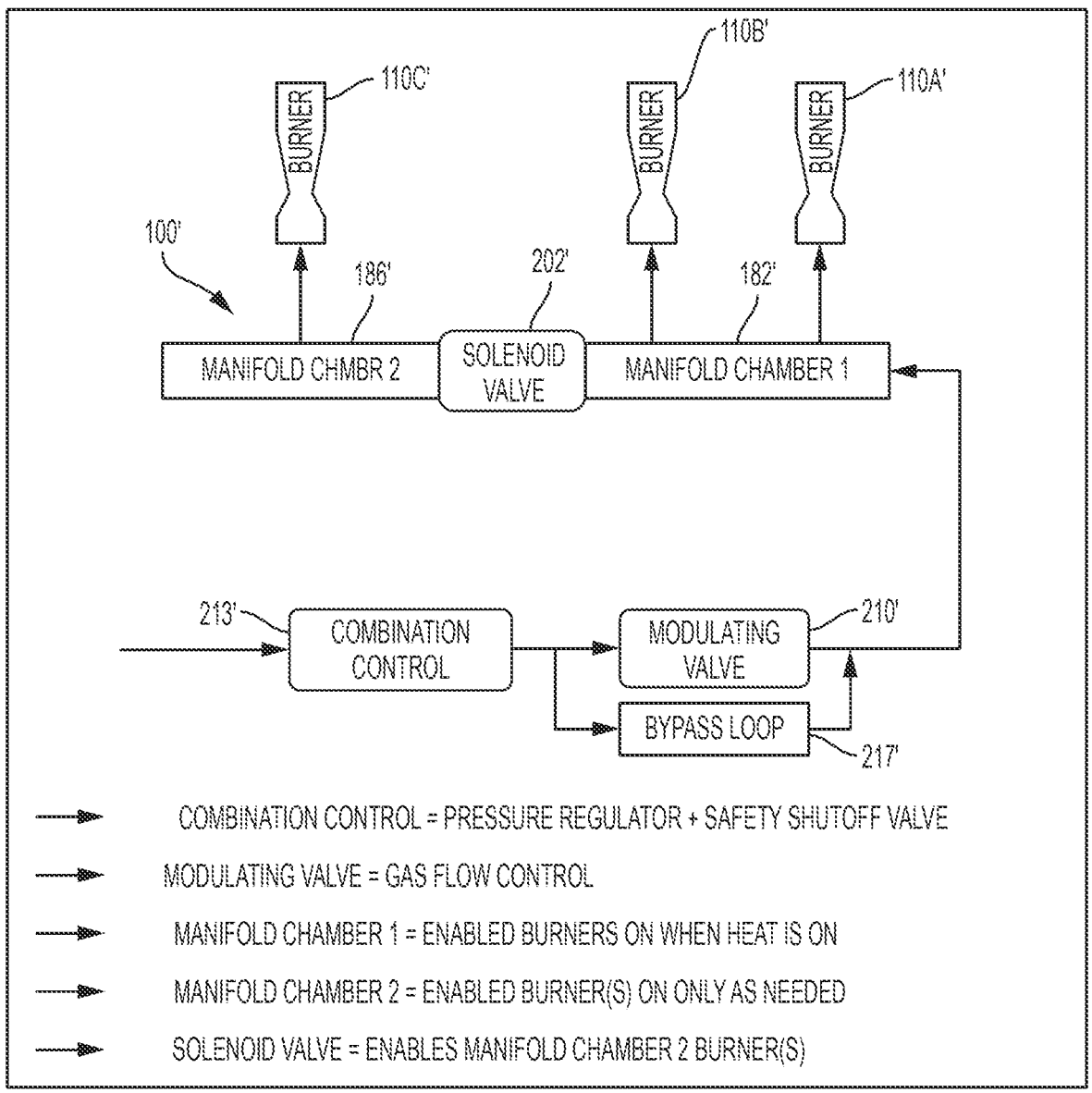
FIG. 13 is a schematic diagram of another embodiment of a gas manifold shown connected to a gas supply conduit and valves.
Figure 14:
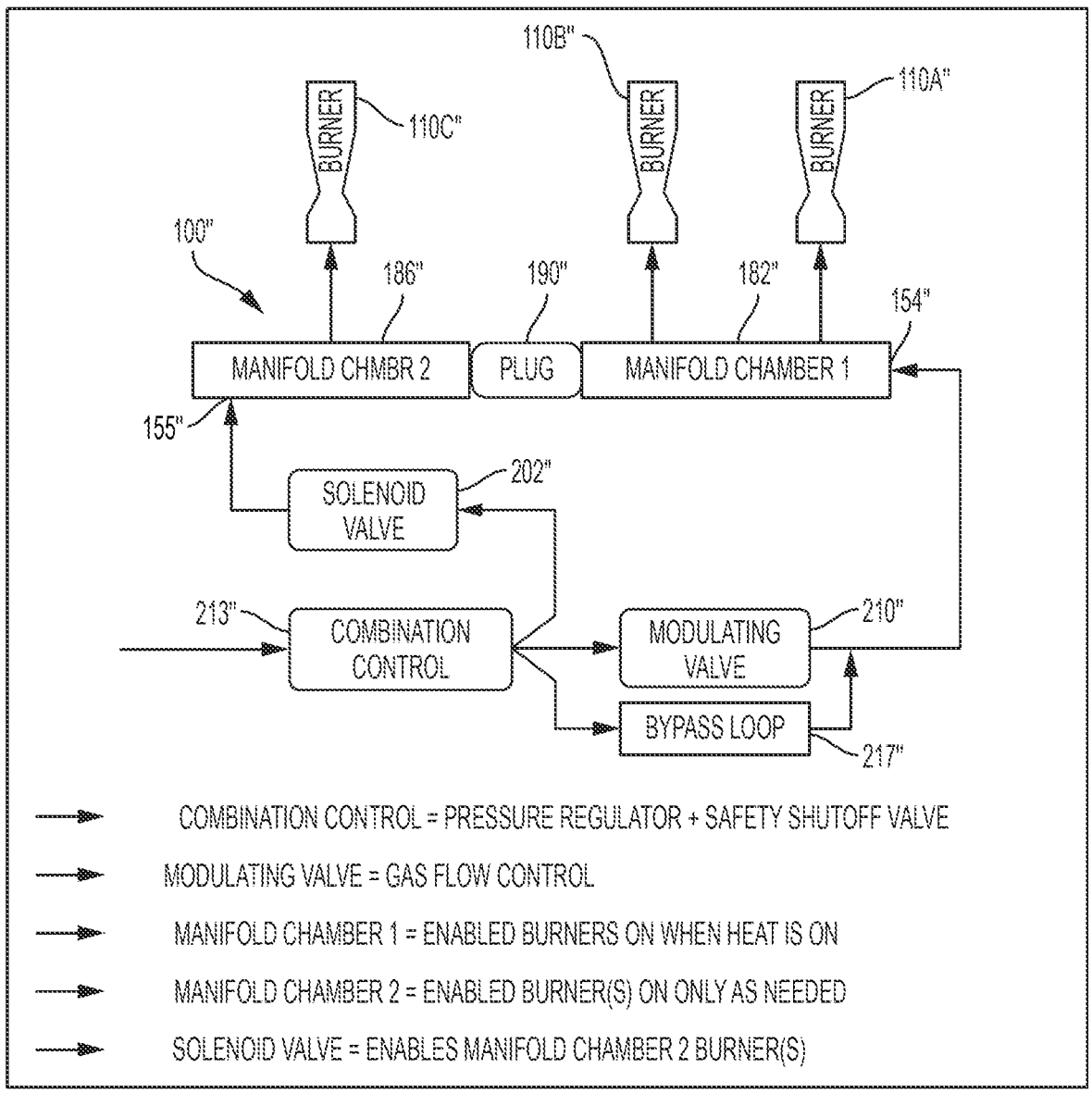
FIG. 14 is a schematic diagram of yet another embodiment of a gas manifold shown connected to a gas supply conduit and valves.

A hinged oven access panel 38 is also provided, open as shown in FIG. 2, to expose inner workings and controls of the oven 20, including, for example, a gas manifold 100 as shown in FIGS. 3A, 4, 8-12 and 15-16, gas manifold 100' as shown in FIG. 13, gas manifold 100" as shown in FIG. 14, gas manifold 214 as shown in FIGS. 17-21, gas manifold 514 as shown in FIGS. 29-34, and described in greater detail below. As explained in more detail below, in some embodiments the hot air blowers and ducts, their associated components, and/or the temperature sensors of the oven 20 can be located within the area revealed by the opened access panel 38.

Oven Controls

Figure 3:
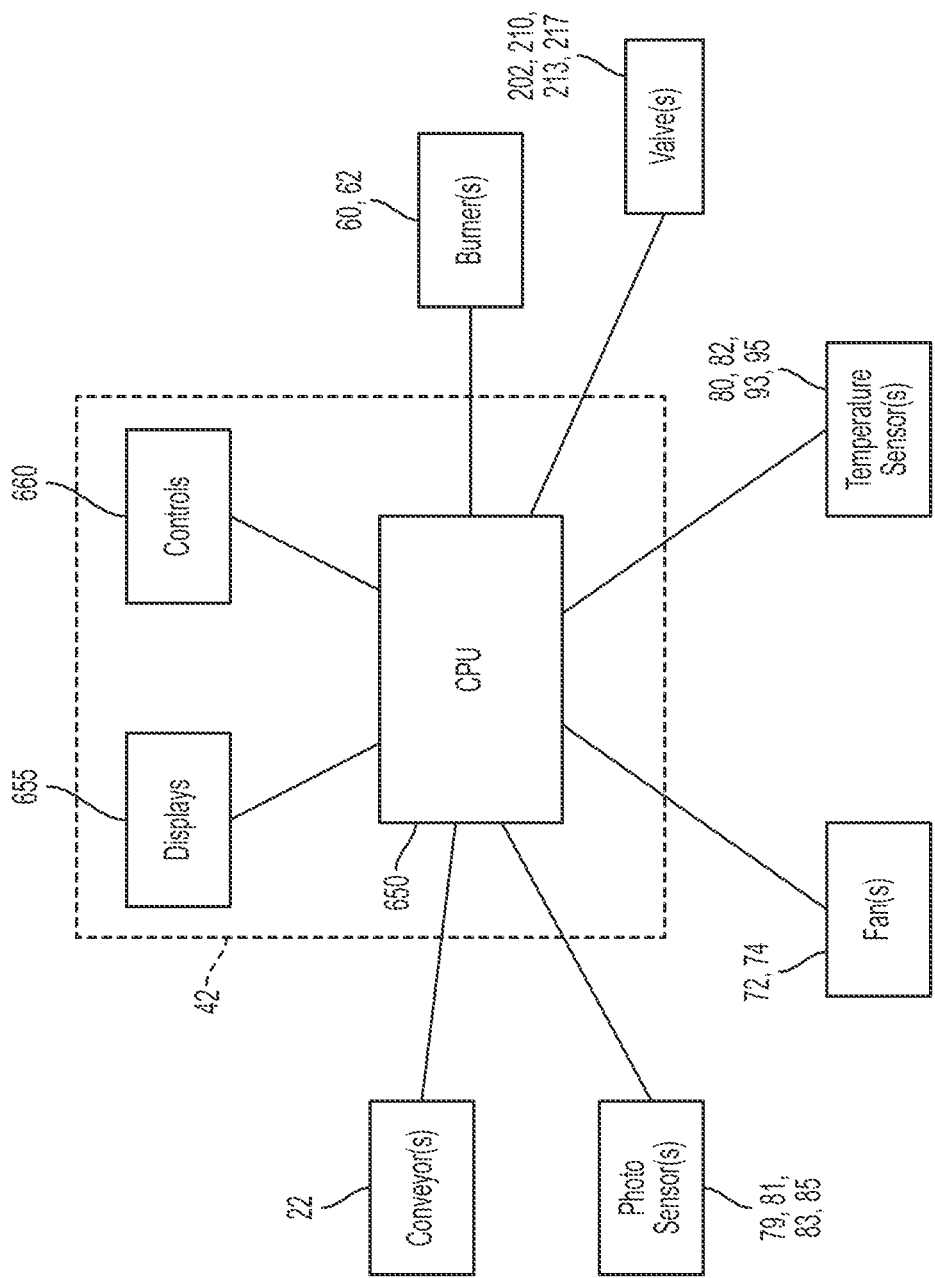
FIG. 3 is a schematic illustration of an embodiment of the control system of the conveyor oven of FIG. 1.

FIG. 3 shows a schematic illustration of the control system for the oven 20. A microprocessor-based main controller 42 may include a central processing unit ("CPU") 650, and a user interface that can include one or more displays 655 and/or controls 660. The CPU 650 can control a plurality of devices including one or more burners 60, 62 (including associated blower switches, ignition switches and blowers, fuel valves, and flame sensing elements), one or more fans 72, 74 (described in greater detail below), and one or more conveyors 22. The CPU 650 may also receive input from a plurality of sensors including one or more temperature sensors 80, 82, 93, 95 and one or more photo sensors 79, 81 and/or 83, 85 (also described in greater detail below).

Figure 3A:
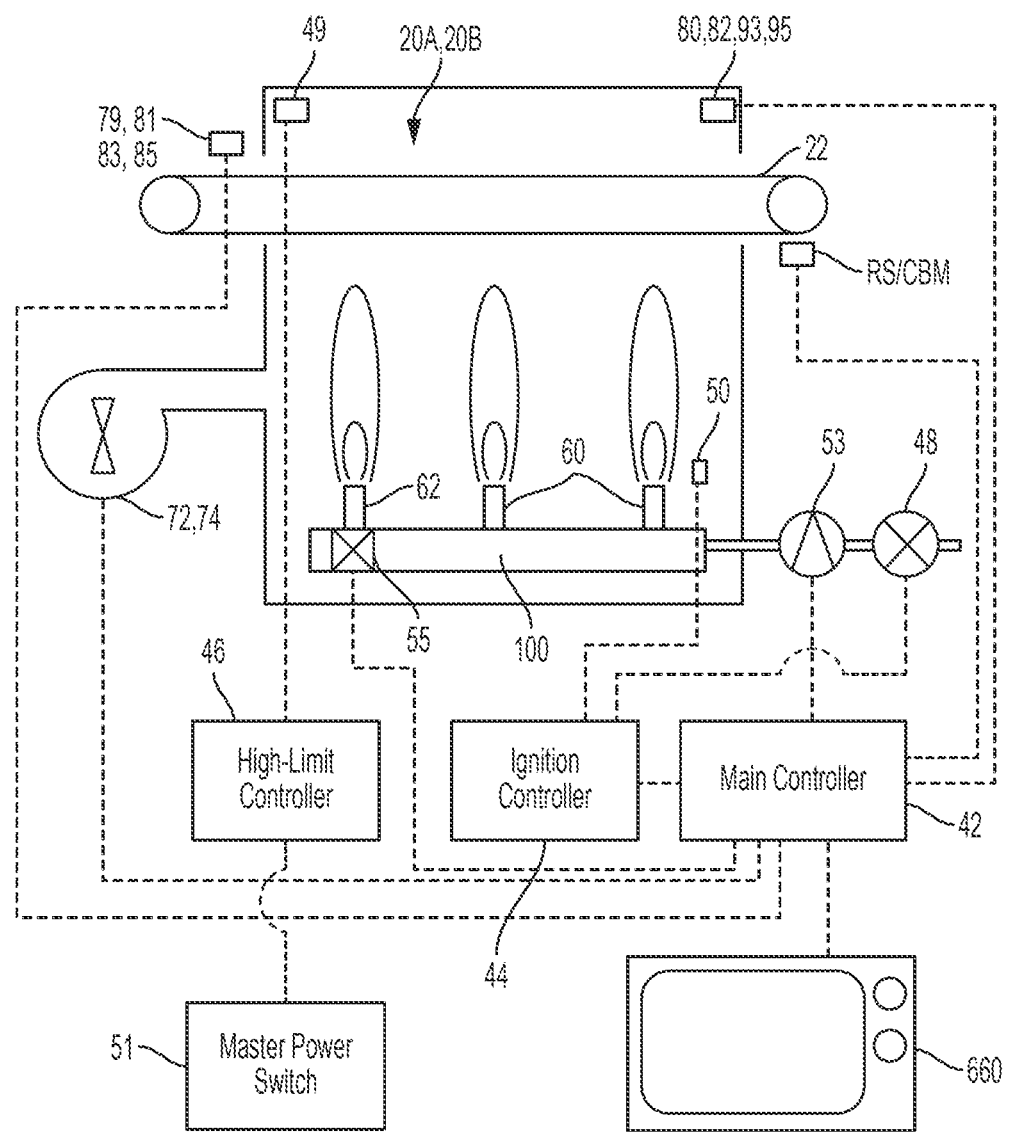
FIG. 3A is a schematic illustration of an embodiment of the control system of the oven of FIG. 1.

As shown in FIG. 3A, in some embodiments the control system includes the main controller 42, an ignition controller 44, and a high-limit controller 46. As will be discussed in greater detail below, the main controller 42 controls the oven temperature, the conveyor 22 speed, and one or more energy savings modes, and communicates with the ignition controller 44 to open a main control valve 48 in preparation for cooking, and to close the main control valve 48 when burner operations are no longer needed. The main control valve 48 is the gas valve that supplies gas to the oven 20 from an external source.

The ignition controller 44 operates a spark igniter to ignite the burners 60, 62 and is controlled by the main controller 42. When the ignition controller 44 is turned on by the main controller 42, the ignition controller 44 opens the main control valve 48 and signals the igniter to ignite the burners 60, 62. Reference to burners 60, 62 should be understood to include all of the manifold embodiments described herein and their associated burners. A flame sensor 50 monitors burners 60, 62 to ensure that the burners 60, 62 remain lit. If the burners 60, 62 go out or cannot be ignited after a designated number of attempts (e.g., three attempts), the ignition controller 42 can enter a lockout mode in which the main control valve 48 is closed, and stops flow of gas to a manifold 100. In some embodiments, once in the lockout mode, the ignition controller 44 cannot be restarted until the main controller 42 cuts power to the ignition controller 44 and then reapplies power to the ignition controller 44.

The high-limit controller 46 monitors the temperature within the oven's heated tunnel or cooking chamber 24 through a high-limit thermocouple 49, and in some embodiments is independent of the main controller 42. If the temperature of the oven 20 exceeds a predetermined maximum temperature, in some embodiments the high-limit controller 46 opens a master power switch 51 of the oven 20 to cut off power supply to the entire oven 20, turning off the burners 60, 62 and some or all of the oven components.

Tunnel Segments

Heat delivery systems for supplying heat to the tunnel 24 are described in U.S. Pat. Nos. 5,277,105, 6,481,433 6,655, 373, 8,087,407, and 8,839,714, the entire disclosures of each of which are incorporated herein by reference, including for their teachings of heat delivery systems and methods. These systems typically include a heat source in the form of one or more gas-fired burners 60, 62 (or other heat source such as an electric heating element) for heating a plenum. For example, the burners 60, 62 can be located at the front of the oven for heating a plenum located at the back of the oven. Blowers 72, 74 are typically provided to move heated air in the plenum through passageways to metal fingers that open into the oven at appropriate spacing above, below and/or along the conveyor belt to deliver streams of hot air directly heated by the burners 60, 62 onto food products present on the conveyor, as discussed earlier. The heat source is cycled on and off or otherwise modulated or varied as necessary by the main controller 42, which responds to signals from temperature sensors (e.g., thermocouples) positioned, for example, at the ends of the oven tunnel.

In some embodiments, a desired heating profile along the tunnel 24 (e.g., uniform heating from one end of the tunnel 24 to the other) is achieved by apportioning the tunnel 24 into two or more segments and by providing independent temperature sensing and independent delivery of heated air to each segment. One example of a multi-segment oven 20 is shown diagrammatically in FIG. 4, where the oven 20 has a pair of burners 60 and 62 with respective heating flames 64 and 66 supplying heat to respective independent plenums 68 and 70 associated with segments 20A and 20B of the oven 20. The heated air in plenums 68 and 70 is blown into the two oven segments 20A, 20B by separate blower fans 72 and 74 through holes 75 and 77 in groupings of top fingers 76 and 78 (and through holes in corresponding groupings of bottom fingers, not shown) associated with the respective oven segments 20A, 20B. Accordingly, the oven 20 uses a single airflow that is heated directly by the gas burners 60, 62, exhausted through heat exchange tubes (not shown) into the independent plenums 68, 70, drawn in by the blower fans 72, 74, and impinged onto the food product through holes 75, 77 in the groupings of top fingers 76, 78 (and through holes in corresponding groupings bottom fingers, not shown). In other embodiments, the gas burners may be used to heat the air in a single plenum for delivery of convection cooking airflow in tunnel 24.

A number of different types of fans 72, 74 can be utilized for supplying heated air within the oven 20, and can be driven by any type of motor. As will be described in greater detail below, it is desirable in some embodiments to control the speed of fans 72, 74 independently based at least in part upon one or more temperatures sensed within the oven 20, one or more positions of food within, entering, or exiting the oven 20, and/or the passage of one or more predetermined periods of time. To provide control over fan speed based upon any of these factors, the fans 72, 74 can be driven by motors 71, 73 coupled to and controlled by the main controller 42. In some embodiments, the fans 72, 74 are driven by variable-speed motors 71, 73 coupled to and controlled by the main controller 42. Power can be supplied to each variable-speed motor 71, 73 by, for example, respective inverters. In some embodiments, each inverter is a variable-speed inverter supplying power to the motor 71, 73 at a frequency that is adjustable to control the speed of the motor 71, 73 and, therefore, the speed of the fan 72, 74.

Figure 4:
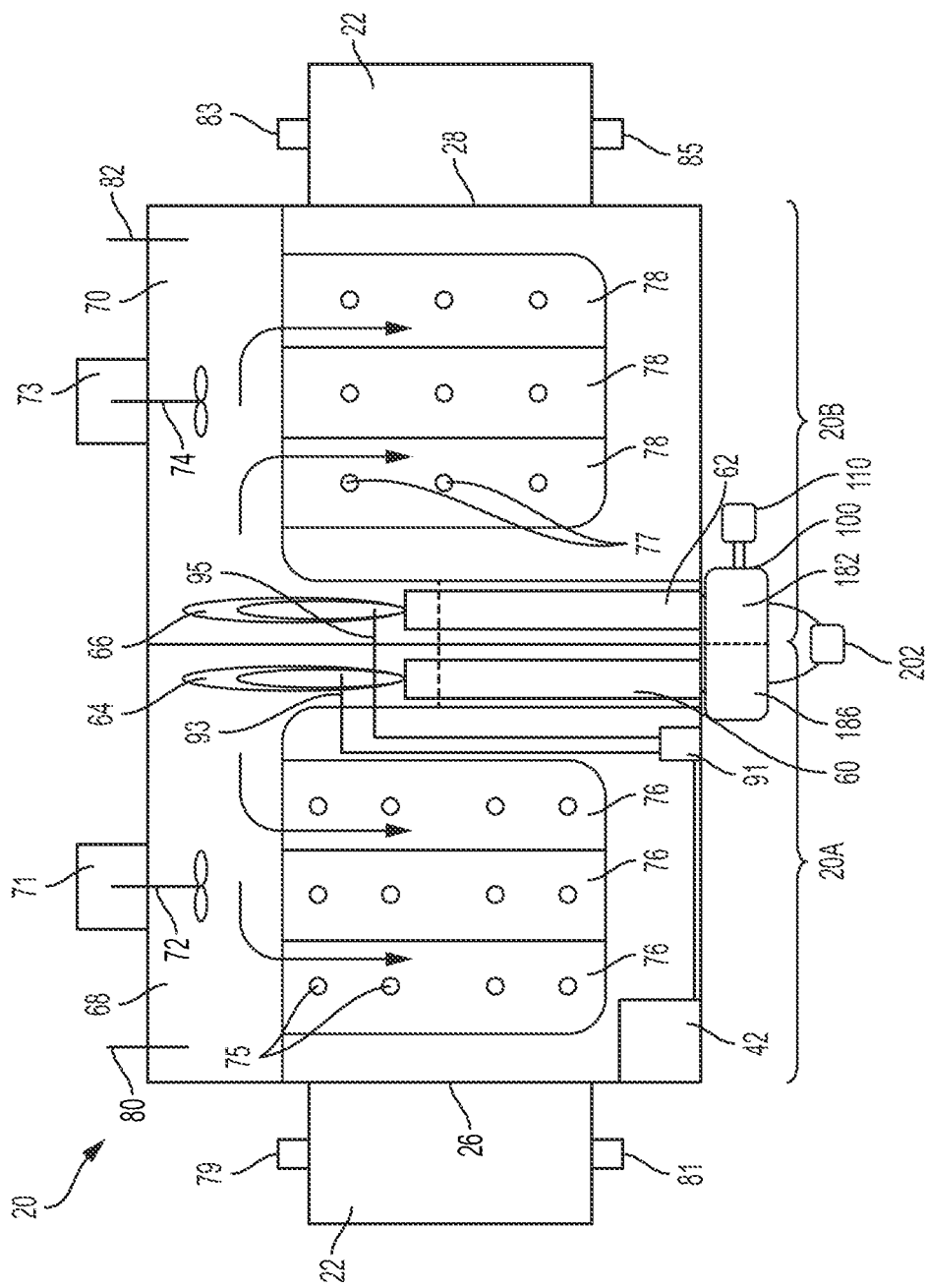
FIG. 4 is a diagrammatic representation of the tunnel of the oven of FIG. 1, apportioned into two segments with independent temperature sensing and independent heat delivery systems.

The temperatures in each of the plenums 68, 70 or oven tunnel segments 20A, 20B can be monitored by temperature sensors (e.g., thermocouples or other temperature sensing elements) 80 and 82, which are shown in FIG. 4 as being mounted in the plenums near the inlet end 26 and the outlet end 28 of the oven 20. Either or both temperature sensors 80, 82 can be located in respective plenums 68, 70 as shown in the figures. In some alternative embodiments, either or both temperature sensors 80, 82 are instead located within segments 20A, 20B of the tunnel chamber 24 through which the conveyor 22 moves. In addition to or in place of either or both temperature sensors 80, 82, one or more position sensors 79, 81 and/or 83, 85 can be located to detect the position of a pizza or any other type of desired food product to be cooked on the conveyor 22, and to thereby control one or more operations of the oven 20 as a result of such position detection (described in greater detail below). Furthermore, in those embodiments in which the oven 20 is heated by one or more gas burners 60, 62, one or more gas output sensors (not shown) can be positioned to detect the amount of fuel supplied to the oven 20. This information can be provided to the main controller 42 in order to control one or more operations of the oven 20, such as to turn a conveyor 22 and/or one or both fans 72, 74 on or off, to adjust the speed of the conveyor 22 and/or one or both fans 72, 74, and/or adjust or turn on or off one or both burners 60, 62.

Figure 5A:
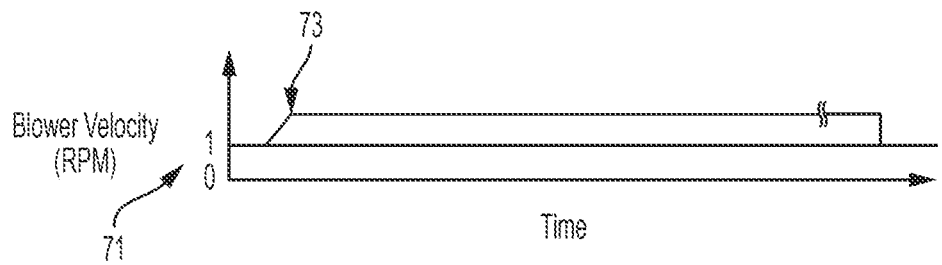
FIGS. 5A-5C include a diagrammatic representation of a pizza moving through the heated tunnel of the conveyor oven of FIG. 1, with graphs showing changing heat output and blower output as the pizza advances through the tunnel.
Figure 5B:
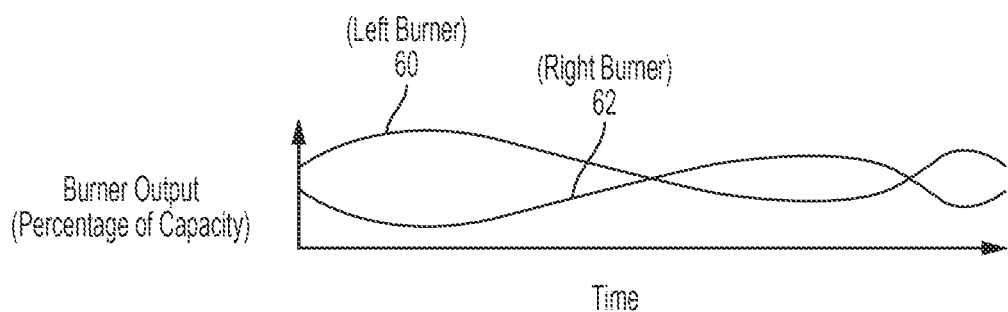
Figure 5C:
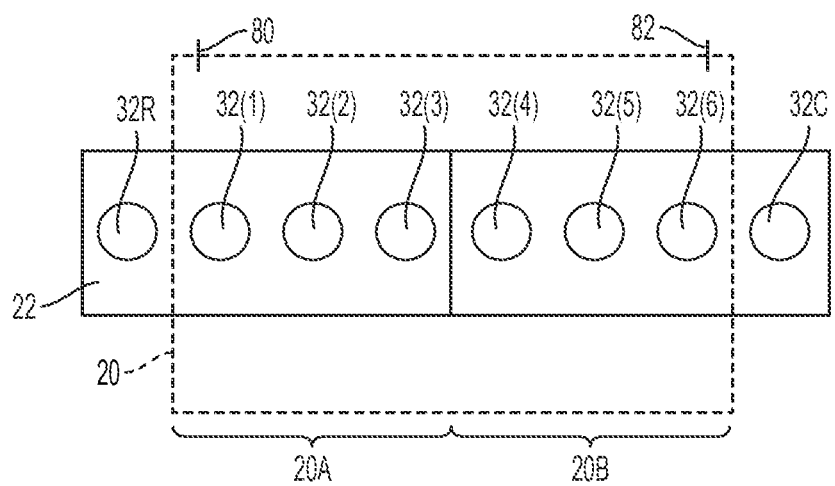

The operation of the oven proceeds as shown in FIGS. 5A-5C, which includes a diagrammatic representation of a pizza moving through the oven tunnel 24 below graphs showing the changing heat output of the burners 60, 62 and the corresponding blower output as the pizza advances through the tunnel 24. Thus, a raw pizza 32R is shown in FIG. 5C resting on the conveyor 22 before the pizza enters the oven tunnel 24. As the pizza 32 travels through the tunnel 24, the main controller 42 can monitor conditions of the oven 20 to control the fans 72, 74, gas burners 60, 62, and conveyor 22 (FIG. 3). It is to be understood that pizza is just one example of the type of food product that can be cooked or baked in the convection conveyor ovens disclosed herein, and the embodiments of the described invention are not limited to cooking pizza.

For example, the temperature sensor 80 (located in either or both the plenum 68 and cooking tunnel segment 20A) can be used to detect the presence of a raw pizza 32R on the conveyor 22. To illustrate one embodiment of the oven, FIGS. 5A-5C follow a single pizza through cooking tunnel 24. As the raw pizza 32R enters the oven 20 and approaches position 32(1), it draws heat causing sensor 80 (FIG. 4) to call for the main controller 42 to supply additional gas to the burner 60 via the modulating gas valve 53 and/or to increase the speed of either or both fans 72, 74. The main controller 42 can respond to detection of the raw pizza 32R by increasing the heat output of the burner 60 of the left tunnel segment 20A, and can also respond to the signal(s) from the position sensor 79, 81 by increasing the speed of either or both fans 72, 74. Either response can occur immediately or after a lag time, and can occur relatively abruptly or gradually.

As a pizza advances to the right in this figure to position 32(2), the pizza is now warmed. Therefore, less heat is drawn by the pizza, and the temperature in the first tunnel segment 20A rises. In some embodiments, this temperature rise is detected by the temperature sensor 80 of the first plenum 68 or by a temperature sensor in the tunnel segment 20A, which can signal the controller 42 to reduce the supply of gas to the left burner 60, thereby producing a reduction in heat output as shown in FIG. 5B. In these and other embodiments, the main controller 42 can also be triggered to reduce the supply of gas to the left burner 60 by a position sensor positioned in or adjacent the first tunnel segment 20A to detect when the pizza has advanced to a location in the first tunnel segment 20A. The position sensor can have any of the forms described above with reference to the position sensor 79, 81 at or adjacent the entrance to the left tunnel segment 20A (FIG. 4). The lowered heat output level can continue for any part or all of the remaining time that the pizza is in the first tunnel segment 20A (e.g., all of such time as shown in the illustrated embodiment of FIG. 5B).

Next, the pizza reaches the position 32(3) shown in FIG. 5C, and then passes the midpoint of the tunnel 24 between the two segments 20A, 20B. Since the pizza has exited segment 20A, and there is therefore no further significant perturbation to the heating environment in segment 20A, the main controller 42 can lower the gas supply (and therefore the heat output) of the left burner 60 to a reduced steady state by controlling the selective control valve 55. This reduction can be triggered by a threshold temperature change detected by the temperature sensor 80 in the first plenum 68 or tunnel segment 20A and/or by the temperature sensor 82 in the second plenum 70 or tunnel segment 20B. Alternatively or in addition, this reduction can be triggered by one or more signals from a position sensor positioned to detect when the pizza has advanced to a location between the first and second tunnel segments 20A, 20B (or near such a location). The position sensor can have any of the forms described above with reference to the position sensor 79, 81 at or adjacent the entrance to the left tunnel segment 20A.

With continued reference to FIGS. 5A-5C, the right burner 62 supplies heat to the second tunnel segment 20B. The sensor 82 corresponding to the second tunnel plenum 70 or tunnel segment 20B can initially detect a spillover of heat from the first tunnel segment 20A (i.e., as the pizza enters and is in the first part of the baking process in the first tunnel segment 20A). Upon detection of sufficient spillover heat (e.g., when the sensor 82 detects that a threshold temperature has been reached), the sensor 82 can trigger the main controller 42 to drop the initial heat output of the right burner 62 by controlling the modulating gas valve 53. However, when the partially cooked pizza approaches the second tunnel segment 20B, the pizza draws heat from the second tunnel segment environment. This heat draw can also be detected by the sensor 82 of the second tunnel segment 20B, which can trigger the main controller 42 to supply additional gas to the burner 62 of the second tunnel segment 20B by controlling the modulating gas valve 53. As a result, the heat output of the right burner 62 can increase as the pizza moves to and through positions 32(4), 32(5), and 32(6). Of course, when multiple food items are transported through cooking tunnel 20 in close succession, the heating and overall operating profile of oven 20 will vary from the example shown in FIGS. 5A-5C.

In some embodiments, when the pizza leaves the position 32(6) and begins exiting the tunnel 24 with no other food product following on conveyor 22, the temperature sensor 82 of the second tunnel segment 20B can detect a rise in the tunnel temperature, and can trigger the main controller 42 to reduce the output of the right burner 62 via the modulating gas valve 53 as shown in the heat output graph of FIG. 5B. As described above, the speed of fans 72, 74 and/or the heat output of burners 60, 62 can be controlled as the heat load of the oven 20 varies during the cooking cycle for any number of different types of food products to maintain a steady state temperature (e.g., a cooking temperature) throughout the cooking tunnel 24 or in one of tunnel segments 20A, 20B.

The position sensors 83, 85 and the temperature sensors 80, 82 can be connected to the main controller 42 in parallel, thereby enabling the controller 42 to change the heat output of the burners 60, 62 and/or the speed of either or both fans 72, 74 based upon signals received by the position sensors 83, 85 and/or the temperature sensors 80, 82.

The heat output of either or both burners 60, 62 can be controlled by the main controller 42 in any manner desired. For example, the gas supply to either or both burners 60, 62 can be lowered or raised or turned off by the main controller 42 relatively abruptly or gradually upon detection of threshold temperatures by either or both temperature sensors 80, 82, after a set period of time, and/or after sufficient movement of the pizza is detected by a position sensor.

In some embodiments, the oven 20 can include one or more temperature sensors 93, 95 (e.g., thermocouples) coupled to the controller 42 and positioned to detect the heat output of either or both burners 60, 62. Using such an arrangement of elements, a speed change of the fans 72, 74 can be delayed for a desired period of time in order to prevent undue cycling of the fans 72, 74 as temperatures rise and fall within the tunnel 24 and as the heat output of the burners 60, 62 rise and fall. In this regard, as the heat output detected by either or both temperature sensors 93, 95 decreases below a threshold level, power to either or both fans 72, 74 can remain unchanged for a set period of time, after which time power to the fans 72, 74 can be reduced to a standby speed of the fans 72, 74.

In the embodiment illustrated in FIG. 4, for example, a relay 91 coupled to the temperature sensors 93, 95, is also coupled to the main controller 42, and cooperates with the main controller 42 (FIG. 3) to control power to either or both fans 72, 74 in a manner as just described. In this embodiment, when the oven temperature or the output of either or both burners 60, 62 falls below a threshold value (e.g., 60% of maximum output in some embodiments), the relay 91 and the main controller 42 enter into a timed state. When the oven temperature or the output of either or both burners 60, 62 remains below the threshold value for a set period of time (e.g., five minutes in some embodiments), either or both burners 60, 62 can be shut off or otherwise varied (e.g., one burner 60, 62 being shut off while the heat output of the other burner 62, 60 is modulated). Either or both burners 60, 62 can be re-activated in some embodiments by detection of a sufficiently low threshold temperature by either of temperature sensors 80, 82, by either of temperature sensors 93, 95, by sufficient movement of a pizza detected by any of the position sensors described above, or after a set period of time has passed, and the like. Thus, as the oven temperature or heat output of either or both burners 60, 62 move above and below one or more threshold levels, the tendency of the fans 72, 74 to cycle (e.g., between high and low speed levels, and in some cases between on and off states) is reduced. Instead, the fans 72, 74 can remain at a full speed level until a lowered heat level is established for at least a set period of time, such as for five minutes in the illustrated embodiment.

Under some operating conditions, the heat output of the burners 60, 62 in some embodiments can be reduced to a relatively low level (e.g., as low as a 5:1 air to gas ratio, in some cases). Relatively low (and relatively high) per burner heat output can generate problems associated with poor combustion. For example, relatively low burner heat output can generate incomplete combustion and flame lift-off. To address these issues, the main controller 42 in some embodiments of the present invention is adapted to turn gas to either or both burners 60, 62 completely off in the event that either or both temperature sensors 80, 82 or either or both temperature sensors 93, 95 detect that a low threshold temperature has been reached.

In some of these embodiments, when either or both temperature sensors 80, 82 or either or both temperature sensors 93, 95 detect that a sufficiently low temperature has been reached, the controller 42 responds by turning off gas to one of the burners 60, 62 associated with that temperature sensor 80, 82, 93, 95 (either immediately or if a higher temperature is not detected after a set period of time), while the heat output of the other burner 60, 62 is modulated. The supply of gas to the burner 60, 62 that was turned off can be restored after a period of time and/or after one or more of the temperature sensors 80, 82, 93, 95 detects a temperature below a lower predetermined threshold temperature. In this manner, one of the burners 60, 62 can be cycled on and off in order to avoid operating both burners 60, 62 at a very low heat output. In some embodiments two or more burners 60, 62 will always be on or off together. In such cases, the controller 42 can respond to a low threshold temperature by turning off the supply of gas to one or both burners 60, 62, and can restore the supply of gas to one or both burners 60, 62 after a period of time and/or after the temperature sensors 80, 82, 93, 95 detects that a lower threshold temperature has been reached.

Similarly, in some embodiments, when a temperature sensor 80, 82, 93, 95 detects that a sufficiently high temperature has been reached, the high-limit controller 46 responds by turning off gas to one of the burners 60, 62 associated with that temperature sensor 80, 82, 93, 95 (either immediately or if a lower temperature is not detected after a set period of time), while the heat output of the other burner 60, 62 is modulated. The supply of gas to the burner 60, 62 that was turned off can be restored after a period of time and/or after the temperature sensors 80, 82, 93, 95 detect a temperature below the low threshold temperature or a sufficient drop in temperature. In this manner, one of the burners 60, 62 can be cycled on and off in order to avoid operating both burners 60, 62 at a very high heat output for an extended duration. In some embodiments two or more burners 60, 62 will always be on or off together. In such cases, the high-limit controller 46 or main controller 42 can respond to a high threshold temperature by turning off the supply of gas to one or both burners 60, 62, and can restore the supply of gas to one or both burners 60, 62 after a period of time and/or after the temperature sensor 80, 82, 93, 95 detects a temperature below the low threshold temperature or an otherwise sufficient drop in temperature.

Although only two tunnel segments 20A, 20B are used in the illustrated embodiment, more than two tunnel segments can be used in other alternative embodiments, each such alternative embodiment having one or more tunnel segments with any combination of the elements and features described above with reference to the illustrated embodiment. Finally, although gas burner(s) are preferred, other heating elements and devices can instead or also be used (e.g., one or more electric heating elements). As used herein and in the appended claims, unless otherwise required by the context, the term "heating elements" refers to gas burners, electric heating elements, microwave generating devices, and all alternative heating elements and devices.

Energy Management

In some embodiments, it may be desirable to operate the oven 20 in one or more energy saving modes. Components of the oven 20 that can be controlled by the main controller 42 to provide energy savings may include either or both burners 60 and 62, either or both fans 72 and 74, and/or the conveyor 22. Exemplary energy saving features and techniques that can be used with the disclosed embodiments and energy saving modes of operation that can be achieved with the disclosed embodiments are described in U.S. Pat. Nos. 8,087,407 and 8,839,714, the entire contents of each of which are hereby incorporated by reference.

Saving energy with the burners 60 and 62 may be achieved by lowering the temperature threshold in one or both of the plenums 68 and 70 and corresponding tunnel segments 20A, 20B heated by burners 60 and 62. This lower temperature threshold can result in one or both of the burners 60 and 62 being on less often, or operating at a lower output, resulting in energy savings. For example, both of the burners 60 and 62 may be turned off completely, may be cycled on and off together, or one burner may be turned off while the other burner remains on and its heat output is modulated or adjusted toward a desired set-point temperature. Saving energy with the fans 72 and 74 may be achieved by reducing the speed or RPMs of one or both of the fans 72 and 74 which can require less power and, therefore, save energy. Additionally, one or both of the fans 72 and 74 may be turned off completely. Saving energy with the conveyor 22 may be achieved by slowing down or turning off the conveyor 22.

Energy management strategies may include controlling any one or more of the burners 60, 62, fans 72, 74, and conveyor 22 of the oven 20 individually or in combination and/or controlling such components in the different tunnel segments of the oven 20 individually or in combination. In particular, the main controller 42 can execute instructions to adjust the fans 72, 74 and/or burners 60, 62 to carry out the energy saving procedures.

Figure 6:
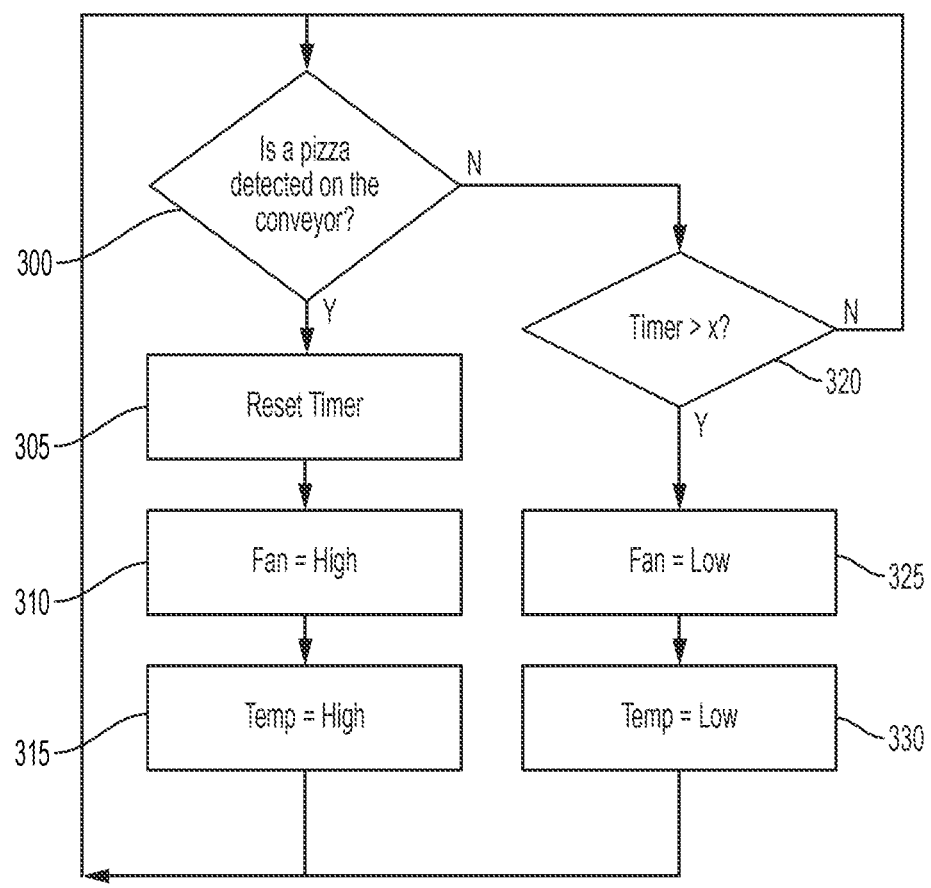
FIG. 6 is a flowchart illustrating an exemplary energy management mode for the conveyor oven of FIG. 1.

FIG. 6 illustrates a process for an energy management mode that can be utilized for a conveyor oven, such as the oven 20 of FIG. 4 used, for example, to bake a pizza. At step 300, the main controller 42 can check for the presence of a pizza on conveyor 22. A pizza can be detected in any of the manners described herein, such as by one or more optical sensors 79 and 81. If a pizza is detected, a timer can be reset, either or both of the fans 72 and 74 can be set to or maintained at a cooking (high) speed, and/or either or both of the burners 60, 62 can be set to or maintained at a cooking (high) output to set or maintain the temperature in one or both of the plenums 68, 70 at a cooking (high) temperature (steps 305, 310, and 315). If no pizza is detected by the sensors 79 and 81 (step 300), the main controller 42 can check a timer to determine the period of time since the last pizza was put on the conveyor 22 (step 320). If the timer is less than a predetermined threshold, the operation of the oven 20 can remain unchanged (steps 305, 310, and 315) and the main controller 42 can continue to check for the presence of a pizza (step 300). If the timer exceeds the predetermined threshold, the main controller 42 can go into an energy saving mode. In this energy saving mode, either or both fans 72 and 74 can be set to a low speed or one fan can be turned off and the temperature can be set to a low value (steps 325 and 330) by lowering the heat output of both burners 60, 62 or turning off one of the burners 60, 62 and adjusting the heat output of the other burner. Alternatively, in some embodiments, the fan speed is decreased and the temperature in the energy saving mode can be adjusted toward a set-point cooking temperature by adjusting the heat output of both burners 60, 62 or, alternatively, turning off one of the burners 60, 62 and adjusting the heat output of the other burner toward the set-point cooking temperature. In addition, in other embodiments, the oven temperature during an energy saving mode can be increased above the set-point cooking temperature while fan speed is decreased. The main controller 42 can then continue to check for the presence of a pizza on the conveyor 22 (step 300). The main controller 42 can remain in this energy saving mode until a pizza is detected on the conveyor 22 at step 300.

Figure 7:
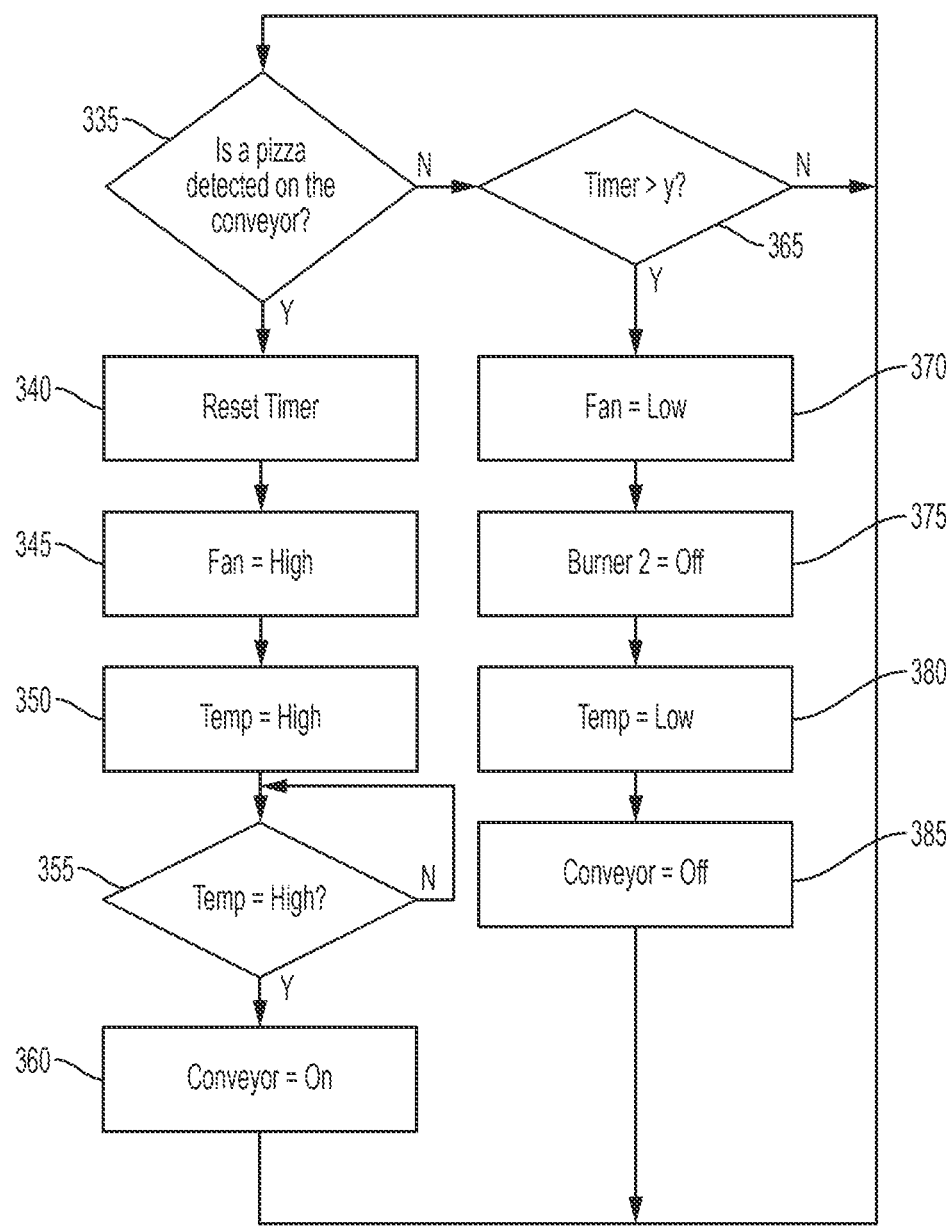
FIG. 7 is flowchart illustrating another exemplary energy management mode for the conveyor oven of FIG. 1.

FIG. 7 illustrates another embodiment of a process for an energy management mode that can be utilized for a conveyor oven, such as the oven 20 of FIG. 4 used, for example, to bake a pizza. At step 335, the main controller 42 can check for the presence of a pizza on conveyor 22. A pizza can be detected in any of the manners described herein, such as by one or more optical sensors 79 and 81. If a pizza is detected, a timer can be reset, either or both of the fans 72 and 74 can be set to a cooking (high) speed, and/or either or both of the burners 60, 62 can be set to or maintained at a cooking (high) output to set or maintain the temperature in one or both of the plenums 68, 70 at a cooking (high) temperature (steps 340, 345, and 350). Since, as will be explained later, the oven temperature can be relatively low (e.g., if the oven 20 has been in an energy management mode), it may be necessary to wait until the temperatures in the plenums 68 and 70 reach levels that will result in temperatures satisfactory for baking when the pizza arrives in the respective plenums before allowing the pizza on conveyor 22 to enter the oven 20. Therefore, at step 355, the main controller 42 can wait until the temperatures of the oven 20 reach their thresholds. If in one of the alternative embodiments described above, the temperature of the oven 20 during the energy saving mode has been increased above the set-point cooking temperature, the temperature of the oven 20 can be reset to a set-point cooking temperature when pizza is again detected on the conveyor 22.

Once the temperatures of the oven 20 reach their thresholds, the conveyor 22 can start (step 360) and the pizza can enter the oven 20 and bake. If no pizza is detected by the sensors 79 and 81 (step 335), the main controller 42 can check a timer to determine the period of time since the last pizza was put on the conveyor 22 (step 365). If the timer is less than a predetermined threshold, the operation of the oven 20 can remain unchanged (steps 340, 345, and 350) and the main controller 42 can continue to check for the presence of a pizza (step 335). If the timer exceeds the predetermined threshold, the main controller 42 can enter an energy saving mode. In this energy saving mode, either or both fans 72 and 74 can be set to a low speed (step 370) or one fan can be turned off, burner 62 can be turned off independently of burner 60 and the heat output of burner 60 can be adjusted or set to a lower level (step 380). The conveyor 22 can also be turned off (step 385). The main controller 42 can then continue to check for the presence of a pizza on the conveyor 22 (step 335). The main controller 42 can remain in this energy saving mode until a pizza is detected on the conveyor 22 at step 335.

Embodiments of two exemplary energy saving modes have been illustrated. Further embodiments can include, for example, other methods of controlling the components of the conveyor oven or adjusting or turning off operation of the fans, burners, and conveyor in other combinations or at different levels of operation during different time periods.

In preparation for turning off the entire oven 20 (e.g., when kitchen operations are shut down at the end of a business day or the oven 20 enters the energy saving mode), the main controller 42 may enter a cool-down mode. During the cool-down mode, the main controller 42 cuts the power to the ignition controller 44, causing the ignition controller 44 to close the main control valve 48. With the main control valve 48 closed, the gas supply to all three burners 60, 62 is shut off and each of the burners 60, 62 is extinguished. After the burners 60, 62 are extinguished, the main controller 42 continues to operate, controlling the fans 72, 74 and monitoring the oven temperature through temperature sensors 80, 82, 93, 95. When the oven temperature drops below a predetermined threshold at which the oven 20 can safely be shut down completely, the main controller 42 will turn off other oven components, such as the fans 72, 74.

As one skilled in the art will understand, numerous strategies and combinations of strategies exist for implementing energy management for an oven 20. Considerations in deciding which strategies to implement include the time it will take to be ready for baking after entering an energy saving mode and the amount of energy required to reach baking temperature following an energy saving mode. As such it can be desirable to provide multiple energy management strategies and allow users to choose the strategy or combination of strategies that best meets their needs.

Gas Manifold

The main controller 42 (FIG. 3) can control the operation of the burners such as burners 60, 62 of FIG. 4 in several different ways to adjust the temperature of the oven 20 and/or engage in an energy saving mode as described above. For example, the main controller 42 can control operation of the burners 60, 62 in a continual or periodic effort to maintain a constant steady state temperature along the tunnel 24, to maintain respective selected temperatures in two or more areas (e.g., segments) along the tunnel 24, to maintain the temperature of the tunnel 24 or individual tunnel segments 20A, 20B within a selected temperature range or within a selected temperature deviation from a desired temperature, or to maintain respective temperatures in two or more areas or segments along the tunnel 24 within selected deviations or ranges from desired respective temperatures of the areas. In some embodiments, a gas manifold 100 is provided to selectively supply gas to a plurality of burners 110 for achieving any or all of these functions. The configuration of the gas manifold 100 can help the main controller 42 control some of the burners 110 independently of the other burners 110.

Figure 8:
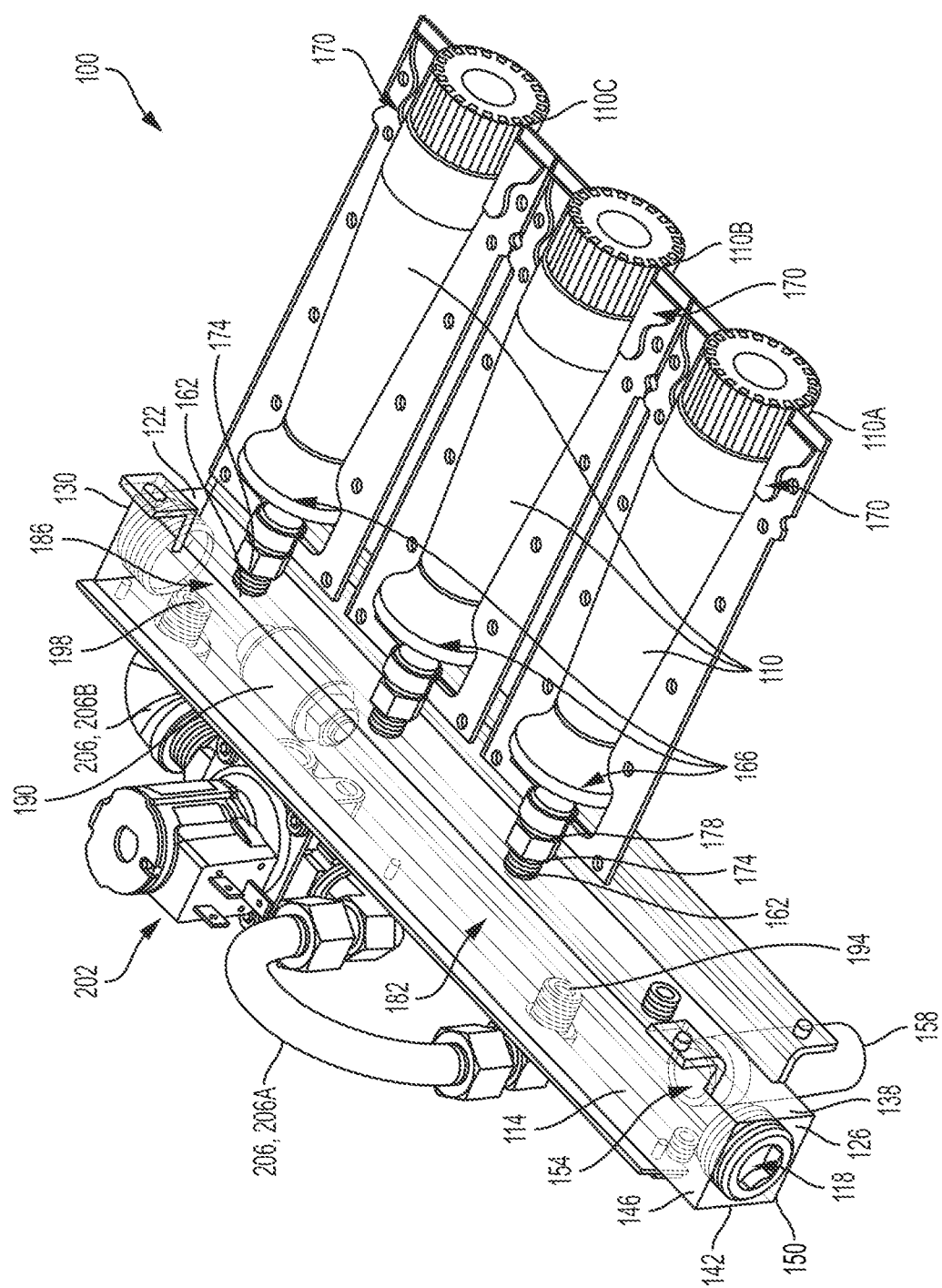
FIG. 8 is a perspective view of an exemplary embodiment of a gas manifold with some parts depicted as translucent to reveal other parts.
Figure 8B:
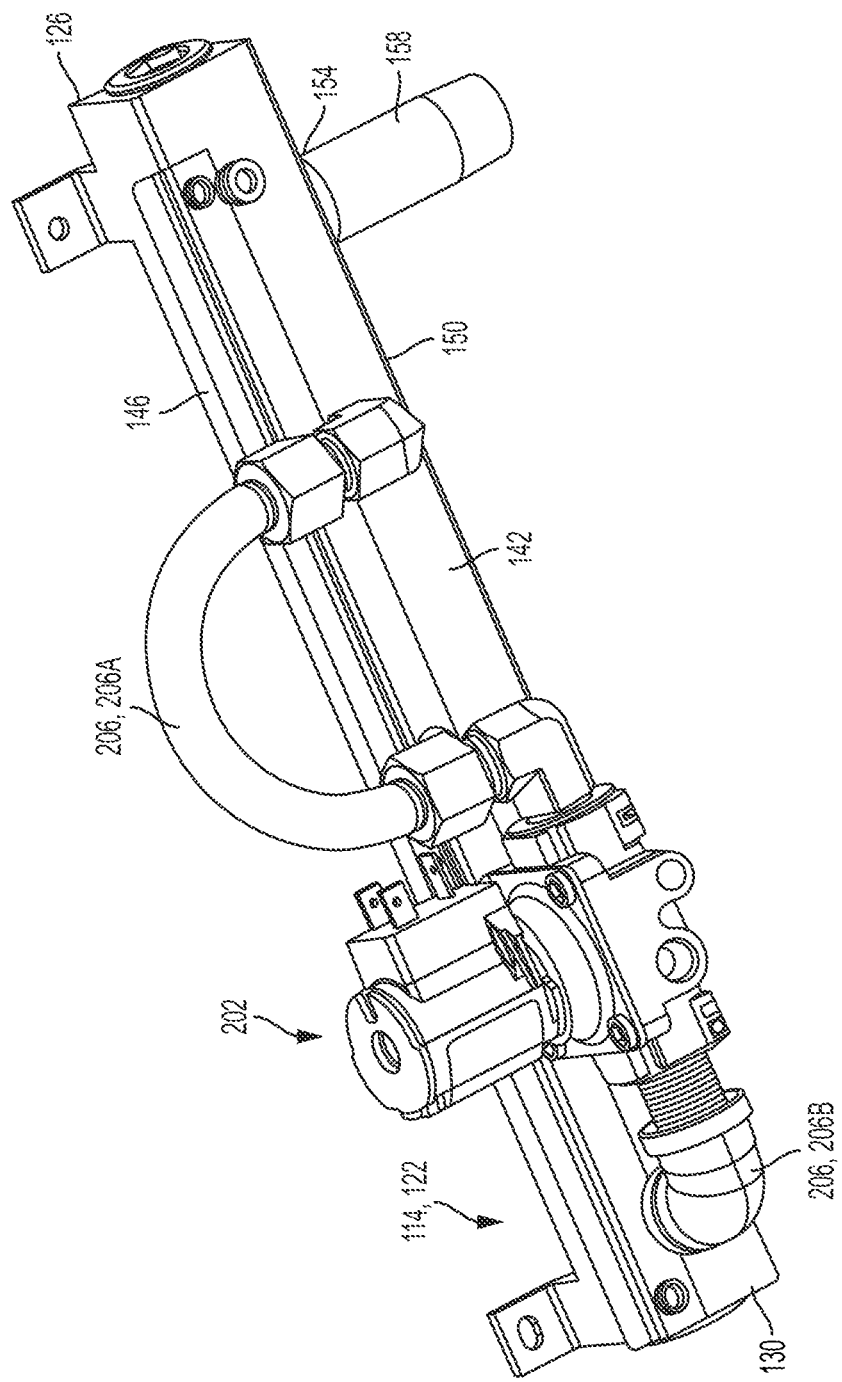
FIG. 8B is a rear perspective view of the gas manifold of FIG. 8.

FIGS. 8-16 illustrate exemplary embodiments of the gas manifold 100 for regulating the supply of gas to the plurality of gas burners 110. The manifold includes an enclosed housing 114 defining an interior space 118 in which gas can flow. Housing 114 can comprise either a one-piece unit or multiple units connected together. In the illustrated embodiment of FIGS. 8-16, the housing 114 is constructed of a single integral unit produced by machining operations (e.g., drilling, milling, and the like) on a piece of metal to create the various features of the housing 114 described herein. In these and other manners, the housing 114 can be a single integral unit having no seams, and therefore fewer locations where leaks can form. A housing defined by a single, integral, and seamless body can also greatly simplify the manufacturing and assembly process of the gas supply components of the oven 20, reduce part count, and reduce the opportunity for assembly error, and incorrect part interconnections (e.g., poor fit). The interior space 118 is at least partially enclosed by a wall 122 (which is shown clear in this figure to facilitate viewing of the interior space). The wall 122 may extend continuously between a first end 126 of the housing 114 and a second end 130 of the housing 114 spaced apart from the first end 126 with no gaps or openings, other than gas outlet ports, gas inlet ports, or valve openings, formed therein. In some embodiments, the wall 122 includes multiple sidewalls to enclose the interior space 118. The housing 114 can be elongated as shown in FIGS. 8-14, and can thereby define a longitudinal axis 134 (see FIGS. 10-11 and 15-16) extending through the first end 126 and the second end 130. In the illustrated embodiment, the wall 122 of the housing 114 extends in a direction parallel to the longitudinal axis 134 for the entire length of the housing 114. As shown in FIGS. 8-8B, the wall 122 has a rectangular outer perimeter defined by a first sidewall 138, a second sidewall 142 opposite the first sidewall 138, a third sidewall 146, and a fourth sidewall 150 opposite the third sidewall 146, and includes an interior space 118 having a circular cross section defining a volume of the interior space 118. The gas inlet 158 and gas outlets 162A-C extend through the wall 122 of the housing 114 and into the interior space 118. In other embodiments, the housing 114 can have any shape adapted to allow gas to flow through an interior space 118, including without limitation other prismatic shapes having triangular, square, or other polygonal cross-sections, square manifolds, round or rotund manifolds, irregularly-shaped manifolds, and the like.

With continued reference to FIGS. 8-16, gas is supplied to the housing 114 through a gas inlet 154. The gas inlet 154 is in fluid communication with the interior space 118 such that gas flowing through the gas inlet 154 is received within the interior space 118 of the housing 114. In some of the illustrated embodiments, the gas inlet 154 extends through the fourth sidewall 150 of the housing 114 proximate the first end 126 of the housing 114. A supply conduit 158 is coupled between a gas supply (not shown) and the gas inlet 154. The gas inlet 154 may be disposed along any of the sidewalls 138, 142, 146, 150 of the housing. Also, some embodiments may include multiple gas inlets. In the case of housing 114 having multiple gas inlets, the gas inlets can be disposed along the housing 114 and spaced apart along the longitudinal axis 134 (see FIG. 14). In other embodiments, a gas inlet 154 is disposed on the first end 126 or the second end 130 such that the longitudinal axis 134 extends through the gas inlet 154 (see FIGS. 12-14).

Gas can exit the interior space 118 of the housing 114 through a plurality of gas outlets 162A-C. The gas outlets 162A-C are in fluid communication with the interior space 118 of the housing 114 and extend through the wall 122 of the housing 114 to discharge gas from the interior space 118. In the illustrated embodiment, the gas outlets 162A-C are spaced apart from the gas inlet 154 in respective positions downstream of the gas inlet 154, and are also spaced apart from one another along the longitudinal axis 134 between the first end 126 and the second end 130 of the housing 114. The size, shape, number, and position of gas outlets 162A-C may vary. For example, in some embodiments, two gas outlets 162 are disposed on the third side 146 of the housing 114 and a third gas outlet 162 is disposed on the second end 130 of the housing 114 such that the longitudinal axis 134 extends through the third gas outlet 162. Alternatively, the gas outlets 162 may be positioned on either or both sides of the gas inlet 154. For example, a first gas outlet 162 may be disposed within the wall 122 in a position closer to the first end 126 of the housing 114 than the gas inlet 154, and second and third gas outlets 162 may be disposed within the wall 122 in respective positions between the gas inlet 154 and the second end 130 of the housing 114. In some embodiments, the gas outlets 162 may be evenly spaced along the longitudinal axis 134, while in other embodiments, the spacing between the gas outlets 162 may vary.

The gas outlets 162A-C are in fluid communication with the burners 110A-C, respectively. Gas discharged from the interior space 118 of the housing 114 passes through the gas outlets 162A-C and is received by the burners 110A-C for combustion. FIGS. 8-12 illustrate the gas manifold 100 with an exemplary arrangement of the housing 114 in fluid communication with three burners 110. In the illustrated embodiment, each gas outlet 162A-C communicates with one burner 110A-C, although in other embodiments one or more of the gas outlets 162 may communicate with two or more burners 110, such as by one or more Y, V, T, or other gas connections. The illustrated gas manifold 100 includes a first burner 110A, a second burner 110B, and a third burner 110C. The burners 110A-C are elongated and each have a proximal end 166 adjacent the housing 114 and a distal end 170 spaced from the housing 114. The illustrated burners 110A-C extend from the first side 138 of the housing 114, and are oriented in a direction that is orthogonal to the longitudinal axis 134.

In other embodiments, the number, position, and orientation of the burners 110A-C may vary. In some embodiments the gas manifold 100 may include burners 110A-C extending from multiple sides of the housing 114 and/or in different directions. By way of example only, a first burner 110A may extend from a second end 130 of the housing 114 in a direction parallel to the longitudinal axis 134, and second and third burners 110B, 110C may extend from the third side 146 of the housing 114 in a direction orthogonal to the first burner 110A. The burners 110A-C may also extend in a non-orthogonal direction relative to the longitudinal axis 134. Again by way of example only, the burners 110 may extend from the fourth side 150 of the housing 114 at a 30 degree angle relative to the longitudinal axis 134. Additionally, although the burners 110A-C described and illustrated herein are of the same size and shape, in other embodiments, the burners 110A-C can be different in size and shape.

With continued reference to the illustrated embodiment, the proximal end 166 of each burner 110A-C is coupled to the housing 114 at one of the gas outlets 162A-C, respectively, to receive gas discharged from the gas manifold 100. The burners 110A-C can be coupled to the housing 114 in any suitable manner, such as by one or more clamps, braces, or other fixtures or structures adapted for this purpose. In the illustrated embodiment by way of example only, the burners 110A-C are each directly coupled to the gas manifold 100A-C by an injector 174A-C, respectively. Each of the injectors 174A-C may be coupled to the manifold 100 via a threaded connection (e.g., external threads of each of the injectors 174A-C mating with internal threads of the housing 114). In some embodiments, each injector 174A-C has one or more portions (e.g., wrench flat section 178A-C in the illustrated embodiment) shaped to facilitate installation and removal of the injectors 174A-C with a wrench. Each of the injectors 174A-C in the illustrated embodiment has a hollow interior that allows gas to pass through from the interior space 118 to each individual burner 110A-C. In some embodiments, an end of each of the injectors 174A-C opposite the gas manifold 100 is slidingly received within the burner inlet. In other embodiments, supply tubes (not shown) of any length and construction (e.g., flexible or rigid) may be used with or without such injectors 174A-C to direct the gas from each gas outlet 162A-C to a corresponding burner 110A-C. Alternatively, when multiple burners 110 are configured to receive gas from a shared gas outlet 162, the burners 110 may be coupled to a common supply tube (not shown) leading to the shared gas outlet 162. Gas is received by the burner 110 at a proximal end 166, and is ignited as it passes through the burner 110, thus producing a flame at a distal end 170 of the burners 110. Each burner 110 may have its own independent igniter (not shown), or burners may share igniters.

The burners 110A-C may be controlled and adjusted by the main controller 42 (FIG. 3). As described above, the burners 110 are controlled by the main controller 42 to manage the heat load of the oven 20 or to operate the oven 20 in an energy saving mode. In doing so, the main controller 42 may execute instructions to increase or decrease the heat output of one or more burners 110. The main controller 42 may turn off a burner 110 or execute instructions to modulate the heat output of a burner 110. The exemplary arrangement of the gas manifold 100 illustrated in FIGS. 8-12 and FIGS. 15-20 enables the main controller 42 to operate at least one of the burners 110A-C independently of the other burners 110A-C. In other embodiments, the manifold 100 can be configured to operate sets of multiple burners independently of one another, as explained below.

In some of the illustrated embodiments, independent control of one or more burners 110A-C with respect to one or more other burners 110A-C is accomplished by creating two chambers 182, 186 within the housing 114 that may be in selective fluid communication with each other. In other words, the interior space 118 of the housing 114 is divided into a first chamber 182 and a second chamber 186 that are not in direct fluid communication. In the illustrated embodiments, the chambers 182, 186 are established by a plug 190, 190" or valve 202' located in the interior space 118 of the housing 114 and positioned to block the flow of gas from one chamber to the other (FIGS. 8-16). Additional plugs 190 may be inserted into the interior space 118 of the housing 114 to create additional chambers. In other embodiments, the chambers 182, 186 are created by coupling two separate housings 114 together such that each housing 114 establishes a separate chamber 182, 186. The chambers may be created in any appropriate manner as long as at least one chamber is not in direct fluid communication with at least one other chamber.

In some of the illustrated embodiments, the first chamber 182 extends between the first end 126 of the housing 114 and the plug 190, and the second chamber 186 extends between the second end 130 of the housing 114 and the plug 190. The plug 190 prevents direct fluid communication between the second chamber 186 and the first chamber 182 so that gas flowing through the first chamber 182 cannot flow directly into the second chamber 186 through the interior space 110 of the housing 114. In the illustrated embodiment, the gas inlet 154 is configured to extend to and distribute gas to the first chamber 182, and the second chamber 186 is positioned downstream (i.e., in series flow) of the first chamber 182 so that the gas outlets 162A-B extending from the first chamber 182 are upstream with respect to the gas outlet 162C extending from the second chamber 186.

As shown in the illustrated embodiments, two gas outlets 162A, 162B extend from the first chamber 182, and one gas outlet 162C extends from the second chamber 186. In other embodiments, however, any number (i.e., one or more) of gas outlets 162 can extend from each chamber 182, 186. Each chamber 182, 186 therefore includes at least one gas outlet 162 that is in fluid communication with at least one burner 110. For example, in the illustrated embodiments, the first burner 110A and the second burner 110B are in fluid communication with the first chamber 182 and the third burner 110C is in fluid communication with the second chamber 186. Accordingly, gas flowing through the gas inlet 154 can flow through the first chamber 182 and exit through the gas outlets 162A, 162B in communication with the first burner 110A and the second burner 110B, respectively, for combustion. However, based on this exemplary configuration, gas cannot flow along the interior space 118 of the housing 114 to reach the third burner 110C because the plug 190, 190" or valve 202' blocks the gas from flowing through the housing 114 into the second chamber 186.

Instead, in some exemplary embodiments, gas may be supplied to the second chamber 186 by selectively routing the gas externally to the housing 114 from the first chamber 182 to the second chamber 186. More specifically, an outlet port 194 is defined through a wall 122 of the housing 114 and is in fluid communication with the first chamber 182. An inlet port 198 is also defined in the wall 122 of the housing 114 and is in fluid communication with the second chamber 186. A first valve 202 (either a shut off or modulating variable flow valve) is positioned downstream of the outlet port 194 and upstream of the inlet port 198. In the illustrated embodiment, the first valve 202 is positioned external to the housing 114. The first valve 202 is operable to selectively control the flow of gas from the first chamber 182 to the second chamber 186. In other words, the first valve 202 can selectively open and close to allow gas to flow from the first chamber 182 to the second chamber 186 or otherwise modulate the flow of gas from the first chamber 182 to the second chamber 186. When gas is allowed to flow into the second chamber 186, the third burner 110C can receive gas from the gas outlet 162C that extends from the second chamber 186. As such, the first valve 202 can be used to selectively provide gas to any burners 110 in fluid communication with the second chamber 186 for selective operation of such burners 110.

As shown in FIGS. 8-11, one or more conduits 206 may extend between the outlet port 194 and the inlet port 198 to transfer gas from the first chamber 182 to the second chamber 186. With reference to FIGS. 8-11, a first conduit 206A is in fluid communication with the outlet port 194 of the first chamber 182 and a second conduit 206B is in fluid communication with the inlet port 198 of the second chamber 186. The first valve 202 is fluidly coupled between the first conduit 206A and the second conduit 206B. Alternatively, a single conduit 206 may be used to route gas from the first chamber 182 to the second chamber 186 with the first valve 202 directly coupled to the housing 114 at either the outlet port 194 or the inlet port 198.

Figure 15:
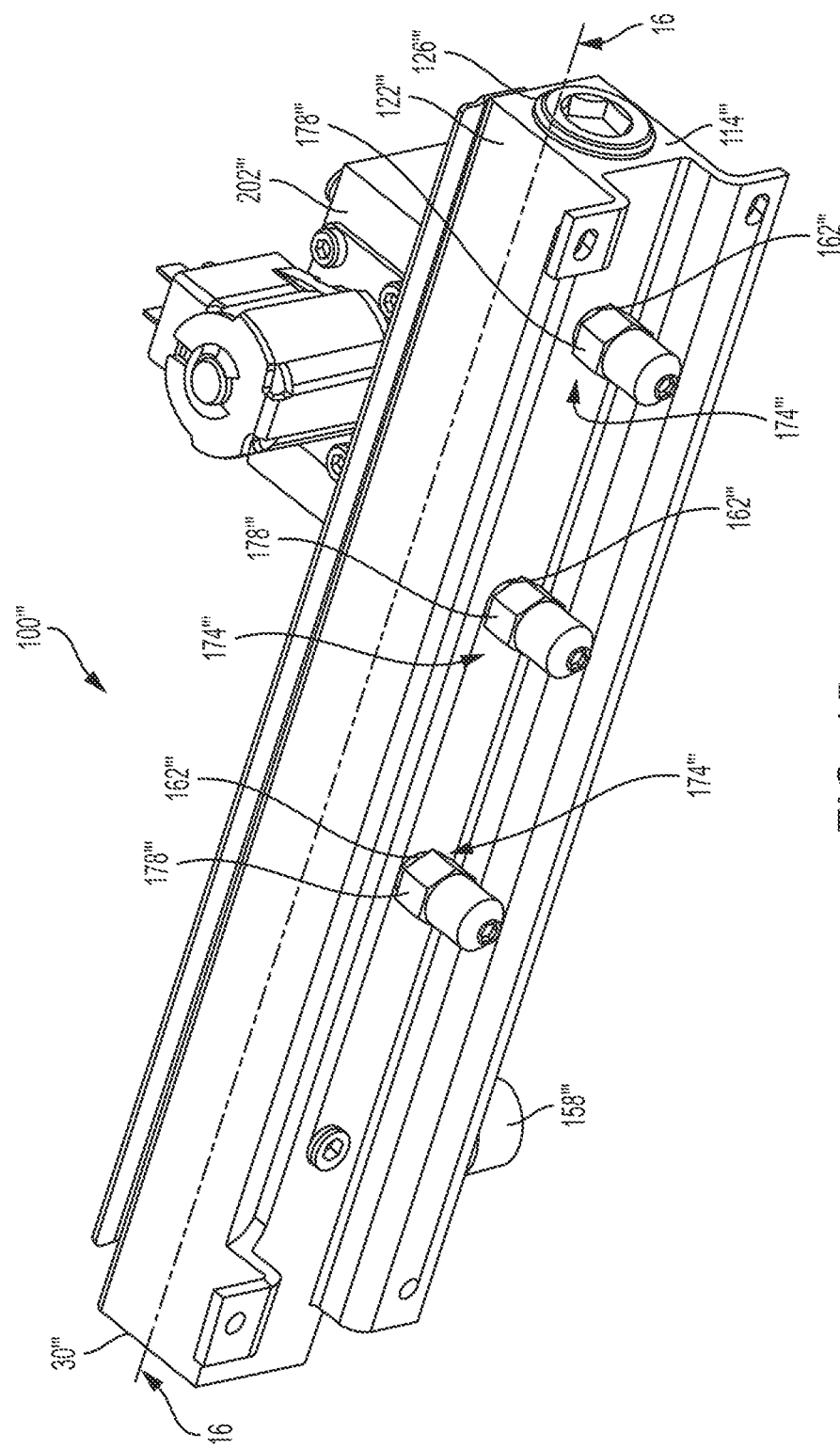
FIG. 15 is a perspective view of yet another embodiment of a gas manifold.
Figure 16:
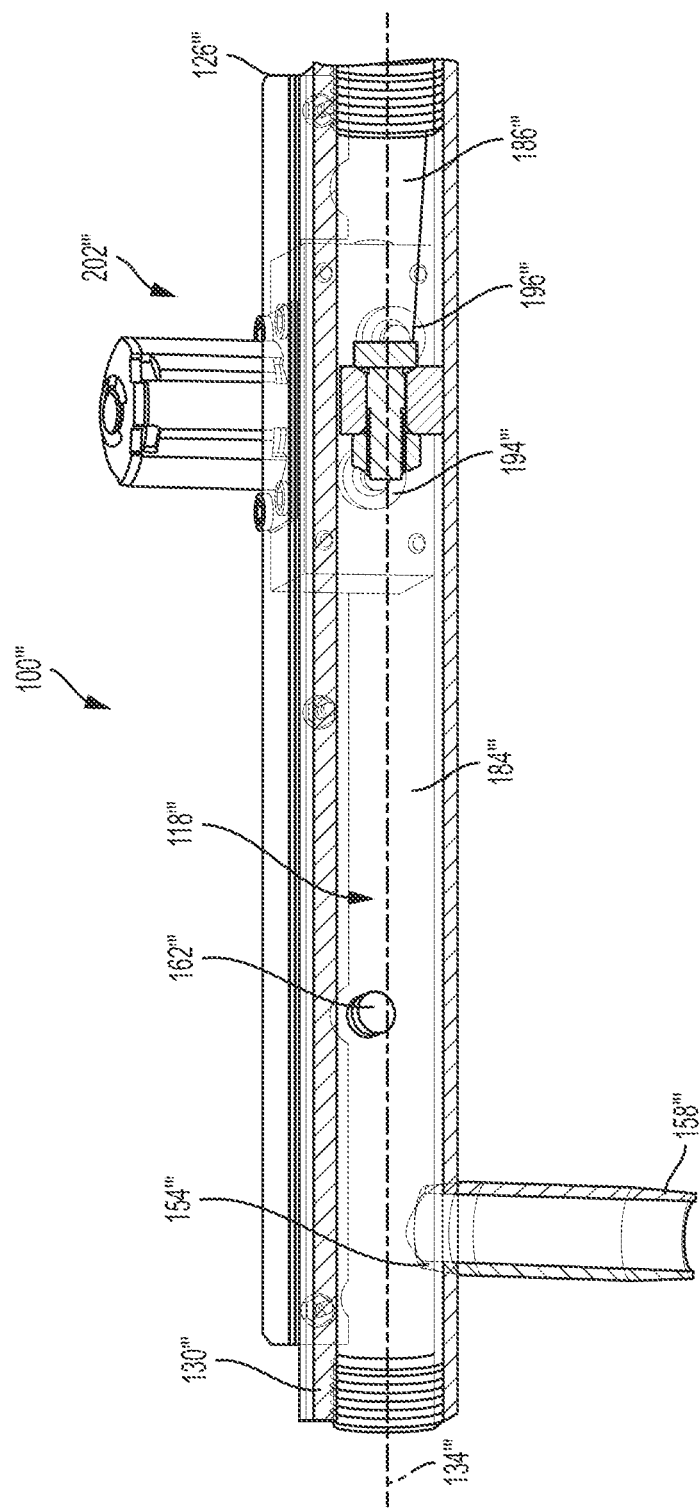
FIG. 16 is a section view of the gas manifold of FIG. 15 taken along line 16-16 with some parts depicted as translucent to reveal other parts.
Figure 17:
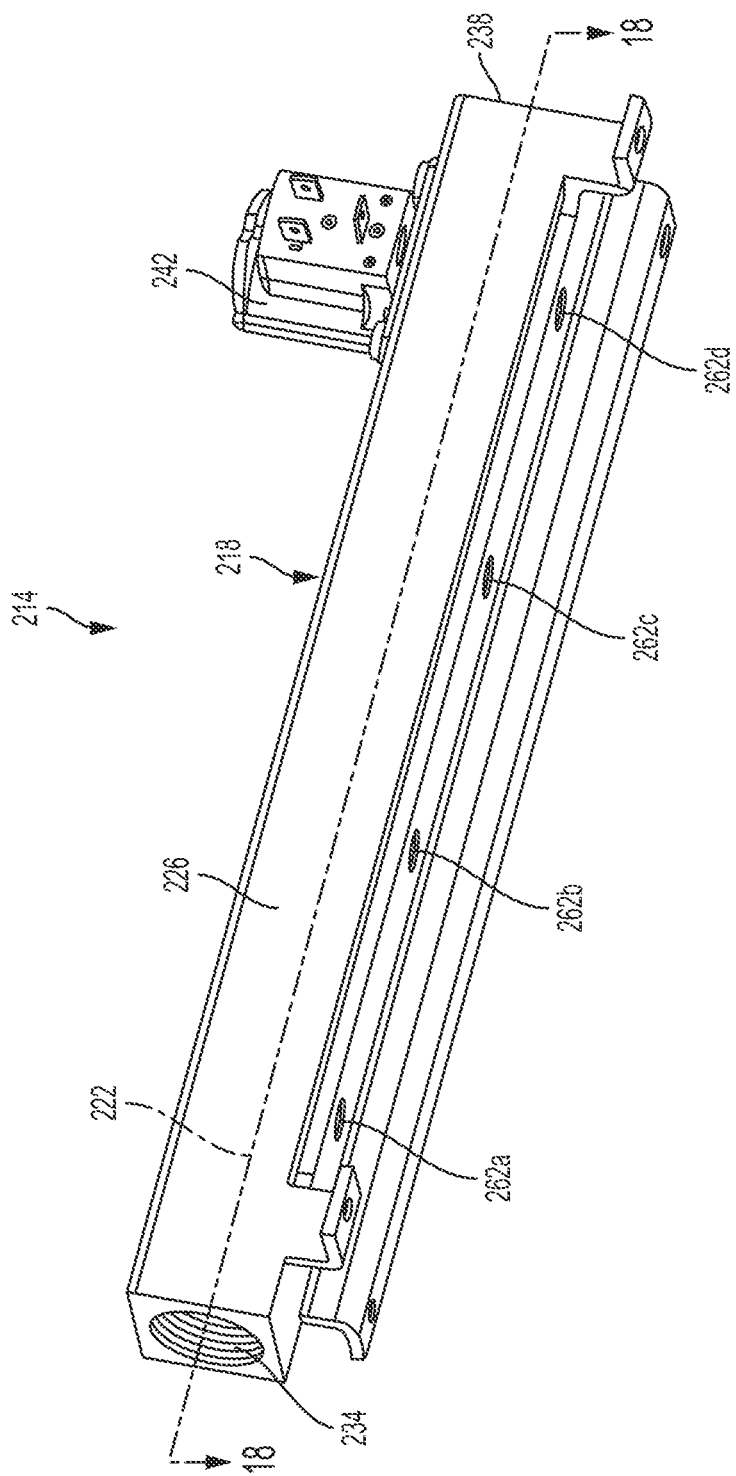
FIG. 17 is a perspective view of another embodiment of a gas manifold.

FIGS. 15-16 show an alternate embodiment of a gas manifold 100''' for regulating the supply of gas to a set of gas burners 110a-c. With the exception of structure and features described above and illustrated in FIGS. 1-14 that are incompatible with the embodiment of FIGS. 15-16, reference is hereby made to the embodiments of FIGS. 1-14 above for a more complete description of the features and elements of the embodiments of FIGS. 15-16 (and possible alternatives thereto). With reference to FIGS. 15-16, in some embodiments, the first valve 202''' can be directly coupled to the housing 114''' at both the outlet and inlet ports 194''', 198''', thereby eliminating the need for the conduits 206A''', 206B'''. The outlet port 194''' and the inlet port 198''' may be positioned at different heights to accommodate the internal structure of the first valve 202'''.

In some embodiments, the first valve 202 can even be located partially or entirely within the housing 114 (e.g., within the interior space 118 of the housing 114), such as a first valve 202' being received within a bore, counterbore, recess, receptacle, or other aperture defined by the housing 114 (FIG. 13). In such embodiments, the first valve 202' can be positioned to selectively establish fluid communication between the first and second chambers 182, 186 by opening or closing a passage within the housing 114 (e.g., within the interior space 118 of the housing 114) to selectively permit or otherwise modulate gas flow within and along the housing 114 between the first and second chambers 182, 186. Also with respect to such embodiments, the first valve 202' can be positioned so that at least a portion of the first valve 202' is located between the first and second chambers 182, 186 to selectively open and close fluid communication between the first and second chambers 182, 186 (FIG. 13). In such an embodiment, the valve 202' may be used to separate the first and second chambers 182, 186. Such embodiments can eliminate the need for the gas outlet 194 and the gas inlet 198, the first and second conduits 206A, 206B, and the plug 190 as shown in the illustrated embodiment, thereby significantly simplifying the manifold 100.

Although the outlet and inlet ports 194, 198 are both illustrated as being defined in the same wall 122 of the housing 114, it will be appreciated that the outlet port 194 and inlet port 198 can be defined in any other wall and/or be defined in different walls of the housing 114 as long as they are in fluid communication with the first and second chambers 182, 186, respectively.

Figure 9:
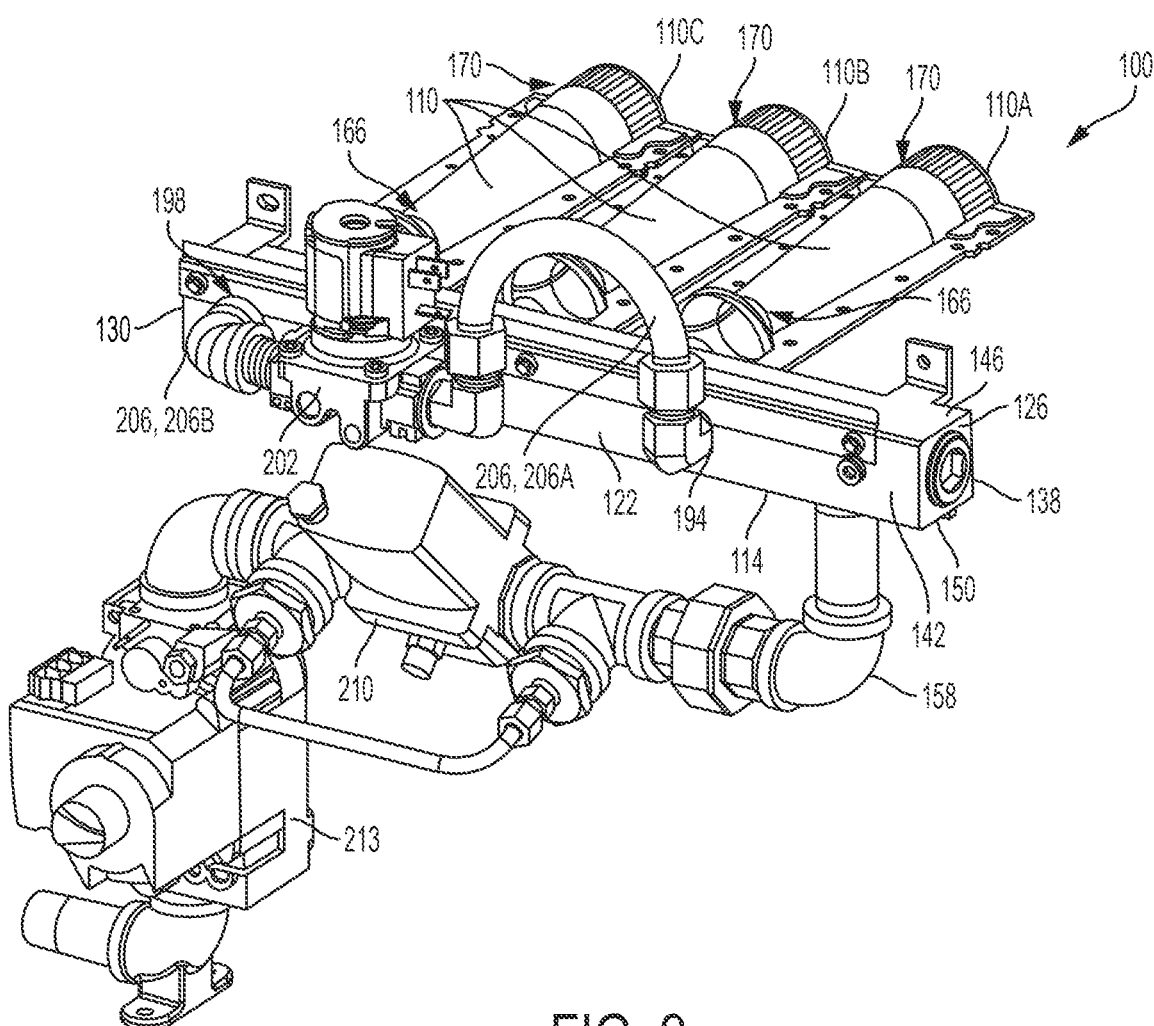
FIG. 9 is another perspective view of the gas manifold of FIG. 8, shown connected to a gas supply conduit and valves.
Figure 10:
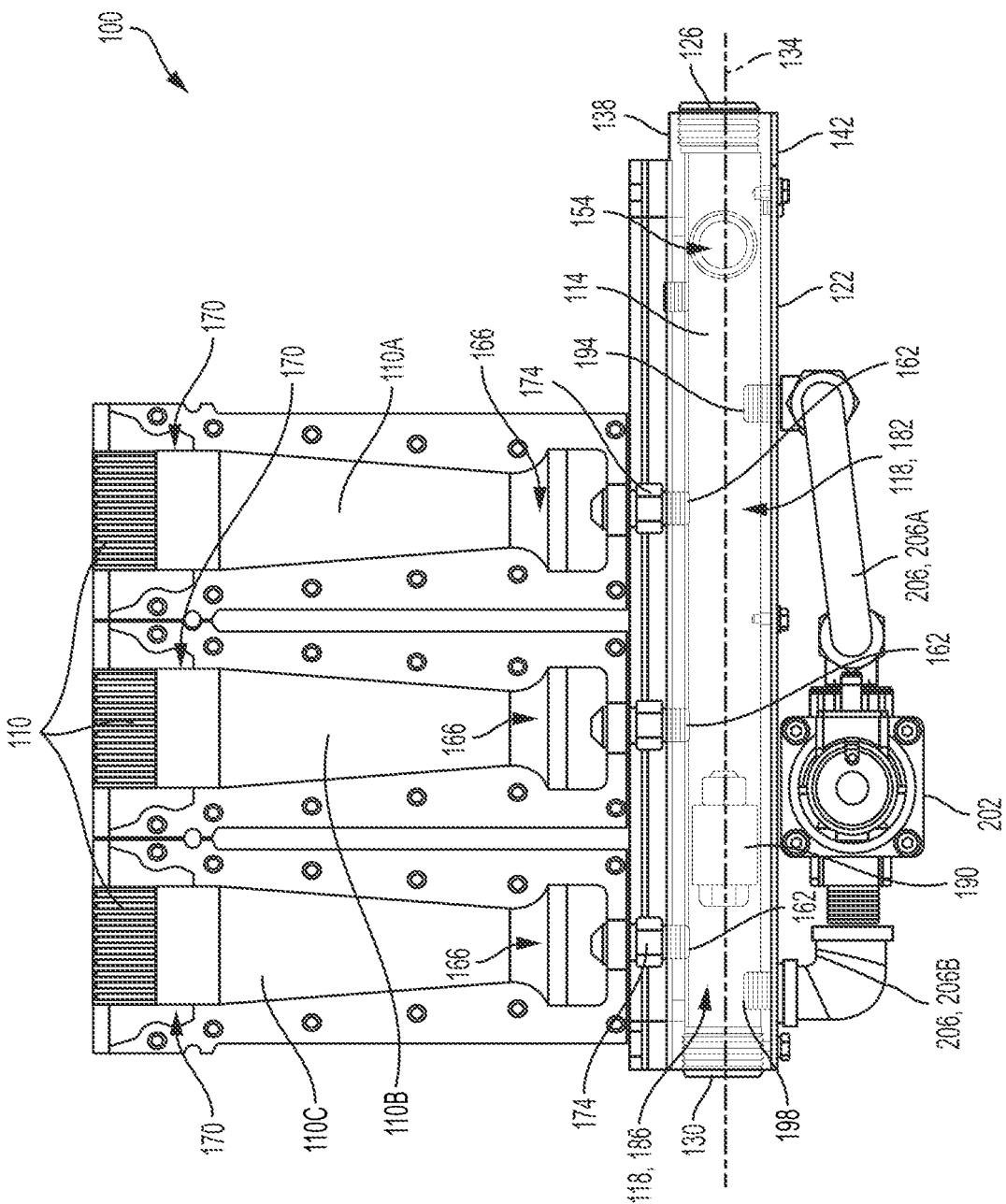
FIG. 10 is top view of the gas manifold of FIG. 8 with some parts depicted as translucent to reveal other parts.

Furthermore, additional valves may be used with the gas manifold 100 to further control the flow of gas. For example, in some embodiments, a second valve 210 (either a modulating variable flow or shut off valve) is in fluid communication with the supply conduit 158 upstream of the gas inlet 154. With reference to FIGS. 9 and 11, the second valve 210 is positioned external to the housing 114, and can be used to control the flow of gas to the first chamber 182. The second valve 210 is operable to selectively control the flow of gas into the first chamber 182.

In some embodiments, an existing single-chamber manifold may be retrofitted with the plug 190, 190", the first valve 202, and the conduits 206A, 206B to create a gas manifold substantially similar to the gas manifold 100 described above. For example, the plug 190, 190" may be installed in the interior space 118 of an existing manifold to create separate chambers 182, 186. In such embodiments, the plug 190, 190" must be made of a thermostable deformable material, such as silicone, so that the plug 190, 190" expands as it is secured within the interior space 118 so that the first chamber 182 is no longer in direct fluid communication with the second chamber 186. The outlet port 194 may then be drilled through one of the sidewalls 122 of the housing 114 into the first chamber 182. The inlet port 198 may be drilled through one of the sidewalls 122 of the housing 114 into the second chamber 186. The first conduit 206A is installed between the outlet port 194 and an inlet of the first valve 202, whereas the second conduit 206B is installed between an outlet of the first valve 202 and the inlet port 198. Accordingly, a selective flowpath is established between the first chamber 182 and the second chamber 186. For example, gas may flow from the gas inlet into the first chamber 182 and into the first conduit 206A. When the first valve 202 is in the open position, gas may flow through the first valve 202 into the second chamber 186. When the first valve 202 is in the closed position, gas may not flow into the second chamber 186.

The gas manifold 100 can be installed in the oven as a single integral unit. More specifically, in some embodiments the housing 114 and the first valve 202 are permanently or releasably connected together (e.g., by threaded fittings as shown in the illustrated embodiment, or with clamps, brackets, fasteners, brazing, welding, or in any other suitable manner) as a single integral unit, and can therefore be mounted within the oven by an installer, service technician, or other user as a single integral unit. In other words, the housing 114 and first valve 202 can collectively define an assembly that can be moved into position, oriented, and secured in position with respect to the conveyor oven 20 while in an assembled and integrated state. Such modular installation of the assembly can greatly simplify installation, removal, and servicing, reduce parts count, and/or reduce manufacturing and setup time of the conveyor oven 20. In other embodiments, the second valve 210 and/or the burners 110A-C are also installed with the housing 114 and the first valve 202 as part of the same assembly (i.e., as part of the same single integral unit).

In operation, the main controller 42 can control the first valve 202 to regulate the flow of gas to the second chamber 186, thereby controlling operation of the burner(s) 110 downstream from the first chamber 182 (i.e., those burners 110 supplied with gas through gas outlets 162 extending from the second chamber 186). In some embodiments, the main controller 42 can control the first valve 202 according to a set of predetermined instructions or programs. The main controller 42 may also communicate with the temperature sensors 80, 82, position sensors 79, 81, 83, 85, and thermocouples 93, 95 to control the first valve 202 as described above, for example, to adjust the oven toward a steady state temperature throughout the oven tunnel 24 or in a selected tunnel segment 20A, 20B, or to control operation of an energy saving mode. Additionally, the first valve 202 can control the flow of gas to the second chamber 186 in different ways depending at least in part upon the type of valve used or operation of the controller 42. For example, the first valve 202 may be a shut-off valve that includes an open state and a closed state. In such embodiments, the first valve 202 fully blocks the flow of gas to the second chamber 186 when in a closed state, and allows gas to flow into the second chamber 186 when in an open state. Accordingly, when the first valve 202 is in the open state, gas is supplied to all of the gas outlets 162, and thus, to all of the burners 110. When the first valve 202 is in the closed state, gas is supplied to gas outlet(s) 162 extending from the first chamber 182, but is shut off from gas outlet(s) 162 extending from the second chamber 186. Therefore, when the first valve 202 is in the closed state, the burners 110 extending from outlets 162 corresponding to the first chamber 182 are turned on while the burners 110 extending from outlets 162 corresponding to the second chamber 186 are turned off.

Similarly, the first valve 202 can also be a modulating variable flow valve 202 that modulates the flow of gas to the second chamber 186. The variable flow valve can be adjusted from a fully-opened state to a fully-closed state, as well as partially-opened states between the fully-open state and the fully-closed state. Likewise, the main controller 42 can control the second valve 210 to regulate the flow of gas to the first chamber 182. The second valve 210 can be used to control operation of the burners 110 connected to both the first chamber 182 and the second chamber 186. For example, when the second valve 210 blocks the flow of gas into the first chamber 182, none of the burners 110 will receive gas, whereas when the second valve 210 and the first valve 202 are open, gas can be simultaneously supplied to both chambers 182, 186 and their corresponding outlets 162 and burners 110. Similar to the first valve 202, the second valve 210 can be used to control the flow of gas to the chambers 182, 186 in different ways depending at least in part upon the type of valve used. The second valve 210 may be a shut off valve or a modulating variable flow valve as described above with respect to the first valve 202.

FIG. 12 provides an exemplary configuration of the gas manifold 100 with the burners 110A-C and the first and second valves 202, 210. In this configuration by way of example only, gas is supplied to the manifold 100 by a combination control valve 213 which functions as a shut-off valve for gas supply to the manifold 100 in addition to regulating and maintaining a constant gas pressure to components downstream of the combination control valve 213 (e.g., the manifold 100 and the first valve 202). Also in this configuration, the first valve 202 is a solenoid valve that can function as a shut off valve, and the second valve 210 is a modulating valve. A bypass loop 217 is provided around the second valve 210 in a manner as described and illustrated in U.S. Pat. No. 6,684,875, the contents of which are incorporated herein by reference, including those regarding modulating valves and valve bypass features, elements, and processes. In this regard, it will be appreciated that the bypass loop 217 can be external of the second valve 210, or can be internal to the second valve 210 as described and illustrated in U.S. Pat. No. 6,684,875.

FIG. 13 provides another exemplary configuration of the gas manifold, wherein like elements of FIG. 12 are presented with like reference numbers each ending in a prime ('). Absent features and functionality that are incompatible with the embodiment of FIG. 13 illustrated and described herein, the above description regarding the embodiment of FIGS. 1-12 (and alternatives thereto) apply equally to the embodiment of FIG. 13. For further understanding of the features and functionality of the embodiment of FIG. 13 (and alternatives thereto), reference is made to FIGS. 1-12 and the description above in connection with FIGS. 1-12. In the configuration of FIG. 13, the plug 190 is not used, and is instead replaced with the first valve 202', which can either be a shut off or modulating variable flow valve, in a manner as described above so that the valve 202' is located at least partially within the manifold housing 114, and selectively opens and closes fluid communication between the first and second chamber 182', 186'.

FIG. 14 provides another exemplary configuration of the gas manifold wherein like elements of FIGS. 12 and 13 are presented with like reference numbers each ending in a double prime ("). Absent features and functionality that are incompatible with the embodiment of FIG. 14 illustrated and described herein, the above description regarding the embodiment of FIGS. 1-12 (and alternatives thereto) apply equally to the embodiment of FIG. 14. For further understanding of the features and functionality of the embodiment of FIG. 14 (and alternatives thereto), reference is made to FIGS. 1-12 and the description above in connection with FIGS. 1-12. In the configuration of FIG. 14, the first valve 202" is supplied with gas directly from the combination control valve 213" rather than from the second valve 210" and the first chamber 182". In this illustrated embodiment, the gas manifold 100" is provided with the plug 190" that is positioned and functions in the same manner as the manifolds of FIGS. 1-12. However, gas enters the second chamber 186" by way of a second gas inlet 155" that can take any of the forms and be in any of the positions with respect to the second chamber 186" as the first gas inlet 154" described and illustrated herein can take with respect to the first chamber 182". Reference is made to the description of the first gas inlet 154 above and accompanying FIGS. 8-12 for more information regarding the second gas inlet 155" and possible alternatives thereto.

With continued reference to the illustrated embodiment of FIG. 14, the first valve 202" can be either a shut off or modulating variable flow valve positioned with respect to the manifold housing 114" (not shown) in any of the manners described above with regard to the illustrated embodiment of FIGS. 8-12, such as by being mounted to one or more external surfaces of the housing 114" and/or by mounting the first valve 202" with respect to the housing 114" so that both define a single integral unit as described above. Similarly, the first valve 202" can be connected to the second gas inlet 155" by one or more conduits or directly to an inlet port (not shown) of the housing 114" as described in greater detail above with regard to the embodiment of FIGS. 8-12. In yet another embodiment (not shown), modulating valve 210" shown in FIG. 14 may be eliminated from the gas line between combination control valve 213" and gas inlet 154" to first chamber 182", with only shut off or modulating valve 202" provided in the gas line between combination control valve 213" and gas inlet 155" to second chamber 186".

Figure 19:
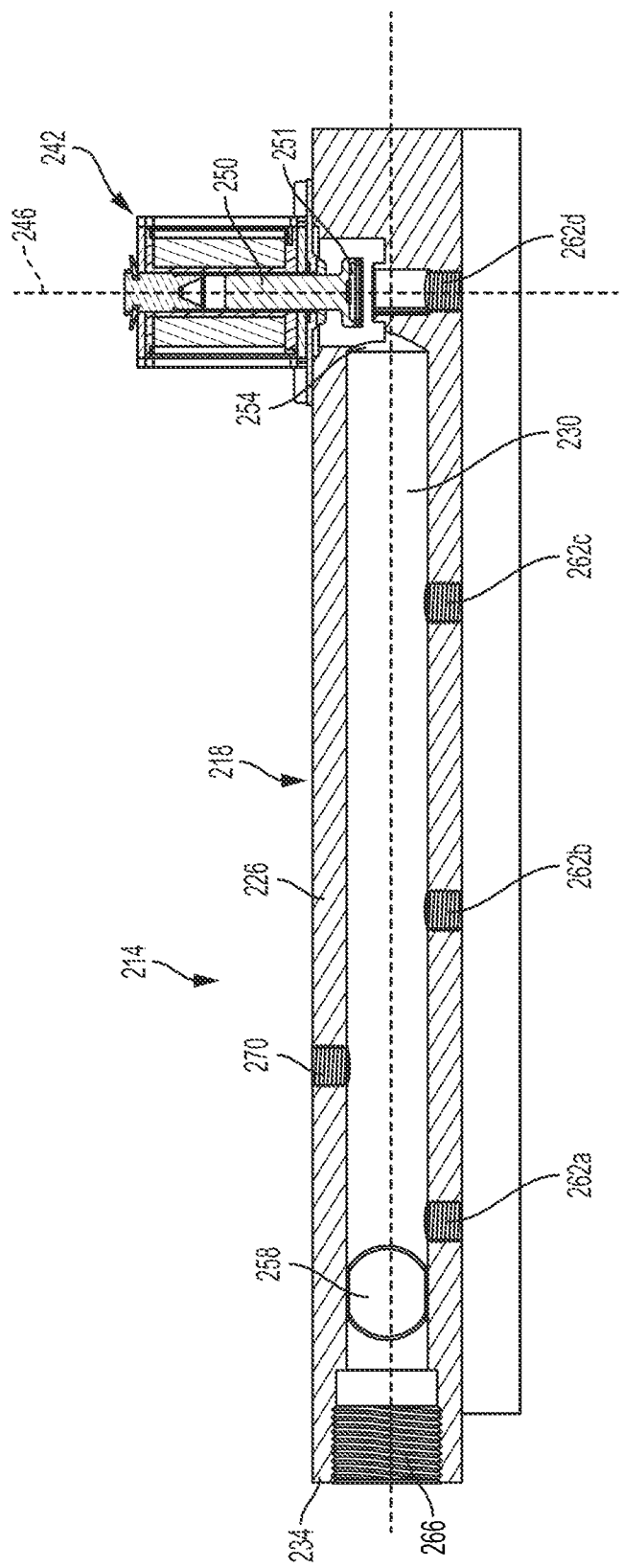
FIG. 19 is a section view of the gas manifold of FIG. 17 taken along line 18-18 and showing the manifold valve in an intermediate position.
Figure 20:
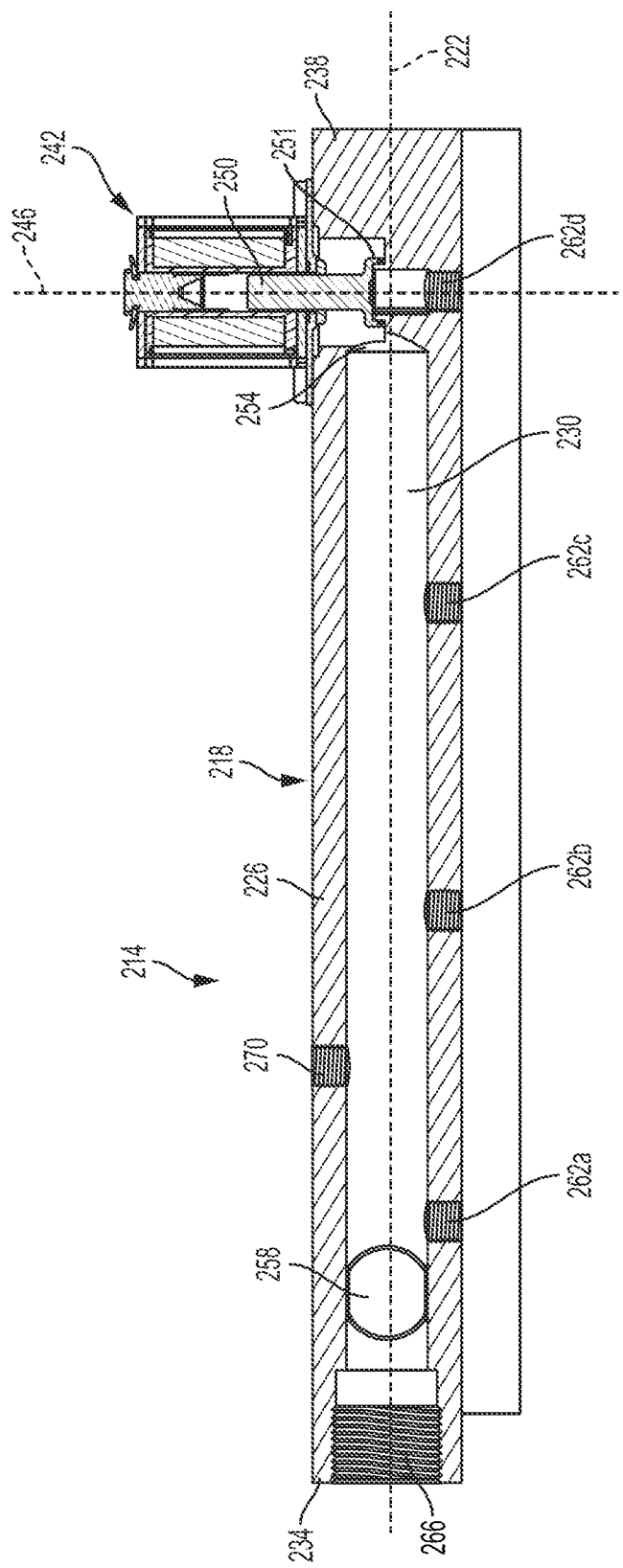
FIG. 20 is a section view of the gas manifold of FIG. 17 taken along line 18-18 and showing a manifold valve in a closed position.
Figure 21:
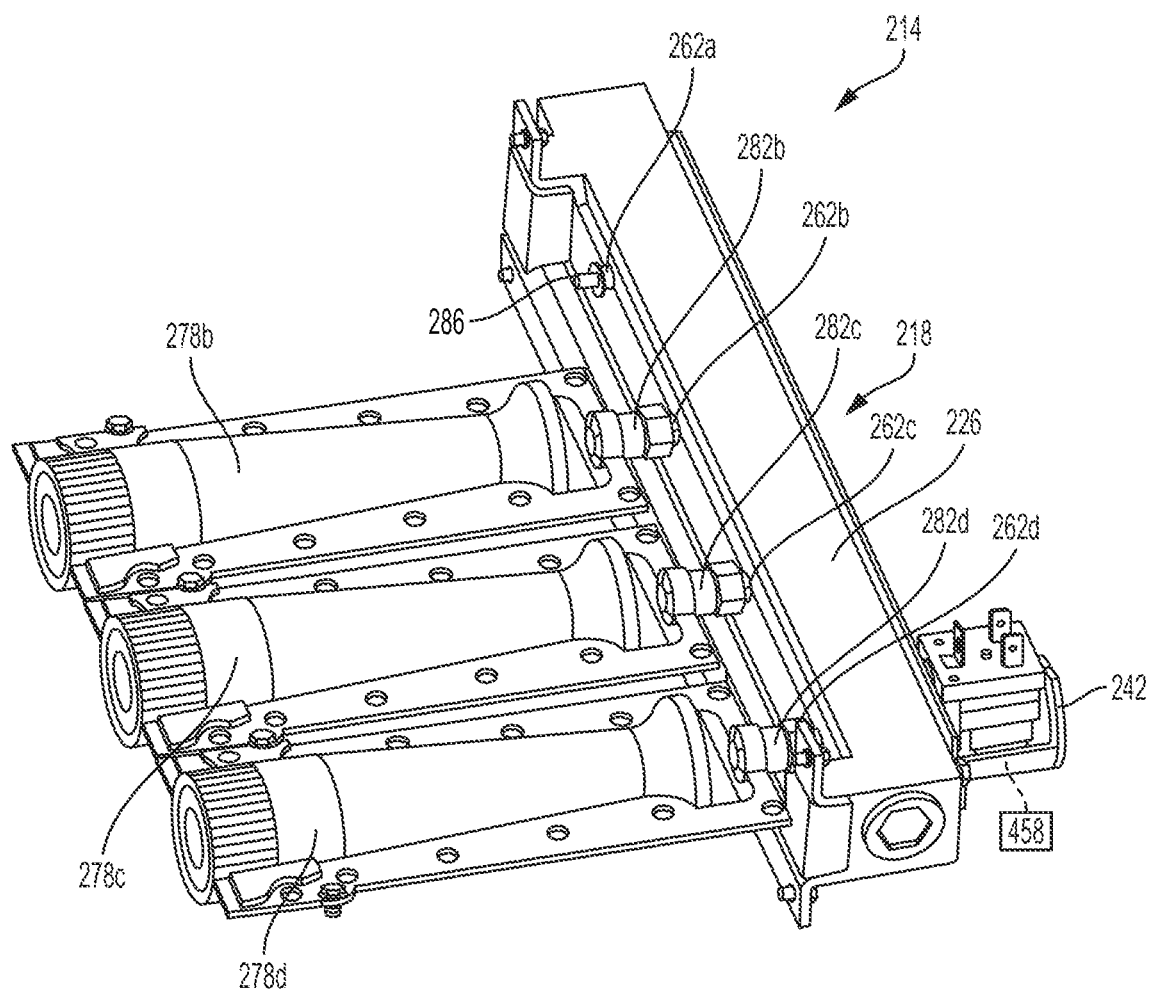
FIG. 21 is a perspective view of the manifold of FIG. 17 engaged with a plurality of burners.

FIGS. 17-20 show an alternate embodiment of a gas manifold 214 for regulating the supply of gas to a set of gas burners 278b-d (FIG. 21). With the exception of structure and features described above and illustrated in FIGS. 1-14 that are incompatible with the embodiment of FIGS. 17-20, reference is hereby made to the embodiments of FIGS. 1-14 above for a more complete description of the features and elements of the embodiments of FIGS. 17-20 (and possible alternatives thereto), which above descriptions apply equally to the embodiments of FIGS. 17-20, with like elements being identified by like reference numbers in the 200-series of reference numbers. The gas manifold 214 includes a housing 218 with a longitudinal axis 222. The housing 218 has a continuous sidewall 226 and first and second ends 234, 238 that defines an interior volume 230.

Figure 18:
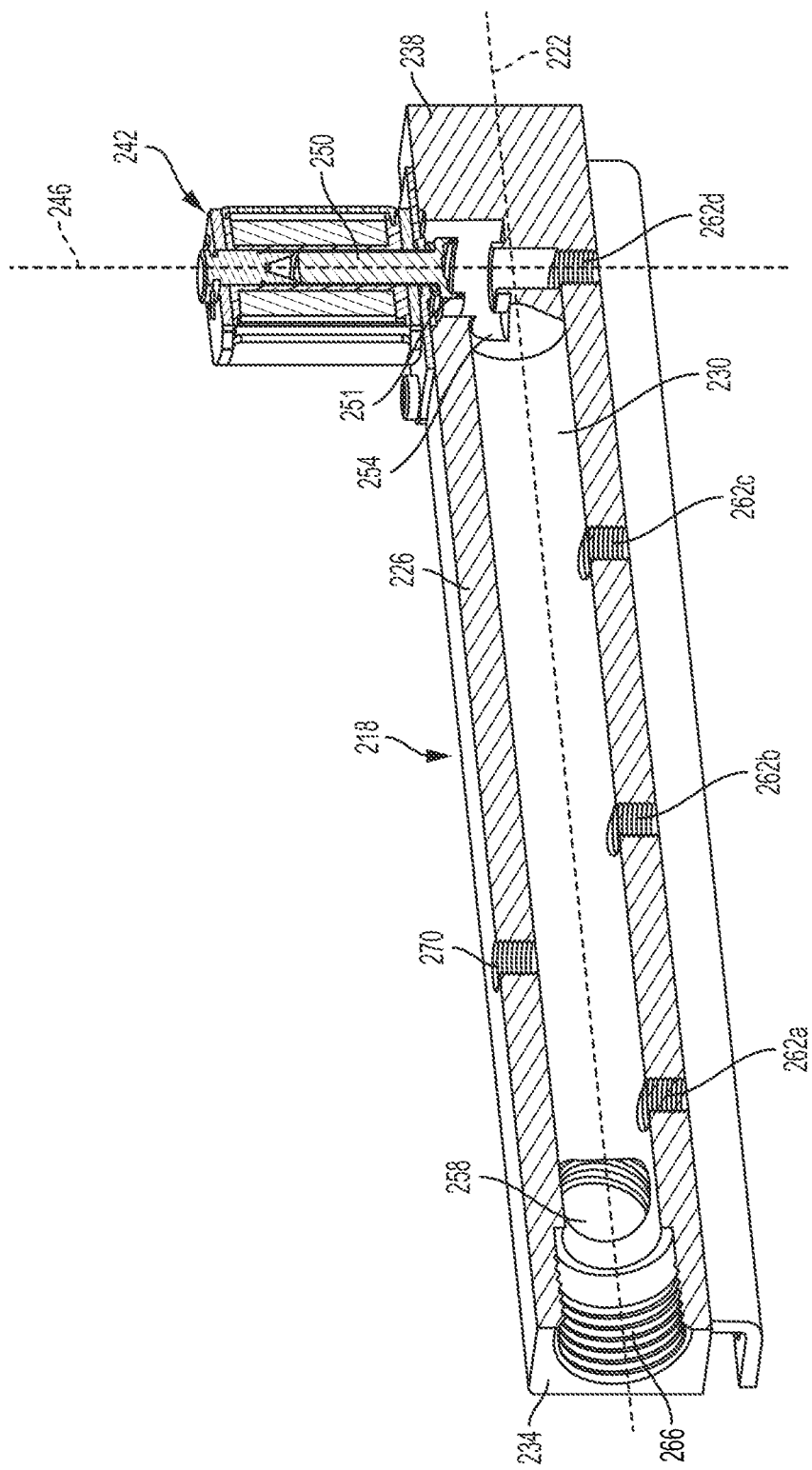
FIG. 18 is a perspective section view of the gas manifold of FIG. 17 taken along line 18-18 and showing the manifold valve in an open position.

As shown in FIGS. 17-20, the interior volume 230 extends between the first end 234 and the second end 238 of the housing 218 along the longitudinal axis 222. The interior volume 230 is fitted with a gas valve 242, which in the illustrated embodiment is proximate the second end 238. In the illustrated embodiment, a portion of the interior volume 230 proximate the gas valve 242 has a substantially cylindrical cross-section having an axis 246, although any other cross-sectional shape is possible. The axis 246 can be substantially perpendicular to the longitudinal axis 222 as shown in FIGS. 18 and 19, by way of example. The gas valve 242 includes a valve body 250 that is at least partially positioned within the interior volume 230 and is aligned with and movable along the axis 246. Valve body 250 includes a valve disk 251 at one end that is movable with the valve body within volume 230. An opening 254 connects the longitudinal and cylindrical portions of the interior volume 230 to form the single interior volume 230.

The housing 218 includes a gas inlet 258, and a plurality of gas outlets 262a-d, and can also include a first opening 266 and/or a second opening 270 such as those shown in FIGS. 17-20. The gas inlet 258, the plurality of gas outlets 262a-d, the first opening 266, and the second opening 270 of the illustrated embodiment are formed within the sidewall 226 of the housing 218. In the illustrated embodiment, the gas inlet 258, the first opening 266, the second opening 270, and the plurality of gas outlets 262a-d are threaded. The gas inlet 258 is sized to receive a gas conduit 274 (FIGS. 22-23), although any other suitable type of connection to an upstream gas supply line can instead be used. The gas conduit 274 is coupled to a gas supply (not shown) and allows gas to enter the interior volume 230. The gas outlets 262a-d of the illustrated embodiment are positioned along sidewall 226 of the housing 218. In the illustrated embodiment, the gas outlets 262a-d are positioned along the axis 246, and can be positioned on the same side of the housing 218, such as in the manner shown in FIGS. 17-20. In alternate embodiments, different numbers and arrangements of gas outlets 262a-d are possible.

With reference to the illustrated embodiment of FIGS. 17-21, the fourth gas outlet 262d is an elongated gas outlet. A portion of the fourth gas outlet 262d extends into the interior volume 230. The fourth gas outlet 262d is positioned along the axis 246 and is aligned with the valve body 250 and valve disk 251. As shown in FIGS. 18-20, the valve body 250 is continuously repositionable from a fully open position (FIG. 18) in which the valve disk 251 of valve body 250 is seated against the housing 218 opposite the inlet for the fourth gas outlet 262d or is otherwise in a retracted position, and a closed position (FIG. 20) in which the valve disk 251 of valve body 250 is seated against the inlet of the fourth gas outlet 262d.

As shown in FIG. 21, the gas outlets 262b-d are each in fluid communication with a burner 278b-d, respectively, whereas the first gas outlet 262a is engaged with a plug 286. For example, in the illustrated embodiment, the gas outlets 262b, 262c, and 262d are in fluid communication with burners 278b, 278c, and 278d, respectively. The gas outlets 262b-d of the illustrated embodiment are each sized to receive an injector 282b-d. The injectors 282b-d can be substantially the same as the injectors 174 described above, and can include a hollow passageway to allow gas to pass from the interior volume 230 of the housing 218 to the burners 278b-d.

In the illustrated embodiment, the first opening 266 can be engaged with a plug (not shown), which prevents gas in the interior volume 230 from flowing out of the first opening 266. Any other unused gas outlets 262a-262d can also be engaged with a plug (e.g., plug 286 described above and shown in FIG. 21) based upon other configurations of the gas manifold 214. In some embodiments, sensors may be installed through the openings 266, 270, or the openings 266, 270 may function as additional gas inlets or additional gas outlets. For example, in the illustrated embodiment, the second opening 270 can be used as a manifold pressure monitoring port, and so can be sized to receive at least one sensor (not shown) for measuring a pressure within the manifold 214. In such embodiments, the sensor can be in communication with the main controller 458 so that when the gas valve 242 and/or another gas control valve (e.g., main control valve 48 shown in FIG. 3A) are adjusted, the pressure within the manifold 214 can be monitored.

Additional valves may be used with the gas manifold 214 to further control the flow of gas. For example, in some embodiments a gas control valve (not shown, either a modulating variable flow and/or a shut off valve) is in fluid communication with the gas supply conduit 274 upstream of the gas inlet 258. Any such valves can be positioned external to the housing 218, and can be operable to selectively control the flow of gas to the interior volume 230 of the gas manifold 214. Valves supplying gas to the gas manifold 214 can take any of the forms and can be connected and operated in any of the manners described above in connection with the embodiments of FIGS. 1-14. Reference is hereby made to these earlier embodiments for a more complete description of such valves and valve arrangements (and alternatives thereto) that can be utilized in the embodiments of FIGS. 17-21.

As discussed above, the gas manifold 214 can be installed in the oven 20 as a single integral unit. More specifically, in some embodiments the housing 218 and the gas valve 242 are permanently or releasably connected together (e.g., by threaded fittings as shown in the illustrated embodiment, or with clamps, brackets, fasteners, brazing, welding, or in any other suitable manner) as a single integral unit, and can therefore be mounted within the oven 20 by an installer, service technician, or other user as a single integral unit. In other embodiments, the gas control gas valve 242 and/or the burners 278b-d are also installed with the housing 218 and the gas valve 242 as part of the same assembly (i.e., as part of the same single integral unit).

In operation, and with reference to FIG. 21, a controller 458 controls the operation of the gas manifold 214. The controller 458 is substantially similar to the main controller 42 discussed above, and will therefore not be described in detail. Reference is hereby made to the embodiments of FIGS. 1-14 above for further description of the controller 458 and its operation (and alternatives thereto). The controller 458 in the embodiments of FIGS. 15-28 controls the gas valve 242 to regulate the flow of gas to the fourth gas outlet 262d (see FIGS. 17-20), thereby controlling operation of the burner 278d supplied with gas by the fourth gas outlet 262d. In some embodiments, the controller 458 can control the gas valve 242 according to a set of predetermined instructions or programs. The controller 458 may also communicate with temperature sensors, position sensors, and thermocouples to control the gas valve 242 as described above, such as (by way of example only) to adjust the oven 20 toward a steady state temperature throughout the oven tunnel 24 or in a selected tunnel segment 20A, 20B, or to control operation of an energy savings mode. Additionally, the gas valve 242 can control the flow of gas to the fourth gas outlet 262d in different ways depending at least in part upon the type of valve used, and operation of the controller 458. For example, the gas valve 242 may be a shut-off valve that includes an open state and a closed state. In such embodiments, the gas valve 242 fully blocks the flow of gas to the fourth gas outlet 262d when with valve disk 251 seated against the inlet of the fourth gas outlet 262d in a closed state, and allows gas to flow into the fourth gas outlet 262d with valve disk 251 retracted from the inlet of the fourth gas outlet 262d when in an open state. Accordingly, when the gas valve 242 is in the open state, gas is supplied to all of the gas outlets 262b-d, and thus, to all of the burners 278b-d. When the gas valve 242 is in the closed state, gas is supplied to the second and third gas outlets 262b-c, but is shut off from the fourth gas outlet 262d. Therefore, when the gas valve 242 is in the closed state, the burners 278b-c supplied by the second and third gas outlets 262b-c are turned on and can receive a modulated gas supply, while the burner 278d supplied by the fourth gas outlet 262d is turned off.

Similarly, the gas valve 242 can instead be a modulating variable flow valve that modulates the flow of gas to the fourth gas outlet 262d. In such embodiments, the variable flow valve 242 can be adjusted from a fully-opened state to a fully-closed state, as well as partially-opened states between the fully-open state and the fully-closed state. Likewise, the controller 458 can control the gas supply valve (e.g., valve 48 in FIG. 3A) engaged with the gas conduit 274 upstream of the gas manifold 214 to regulate the flow of gas to the interior volume 230. Such a gas supply valve 48 can be used to control operation of the burners 278b-d connected to all of the gas outlets 262b-d. For example, when the gas supply valve 48 blocks the flow of gas into the interior volume 230, none of the burners 278b-d will receive gas, whereas when the gas supply valve 48 and the gas valve 242 are open, gas can be simultaneously supplied and modulated to the interior volume 230, the gas outlets 262b-d, and the burners 278b-d. Similar to the gas valve 242, the gas supply valve 48 can be used to control the flow of gas to the interior volume 230 in different ways depending at least in part upon the type of valve used. The gas supply valve may be a shut off valve 48 or can instead be a modulating variable flow valve such as modulating gas valve 53 described above in connection with FIG. 3A.

Figure 22:
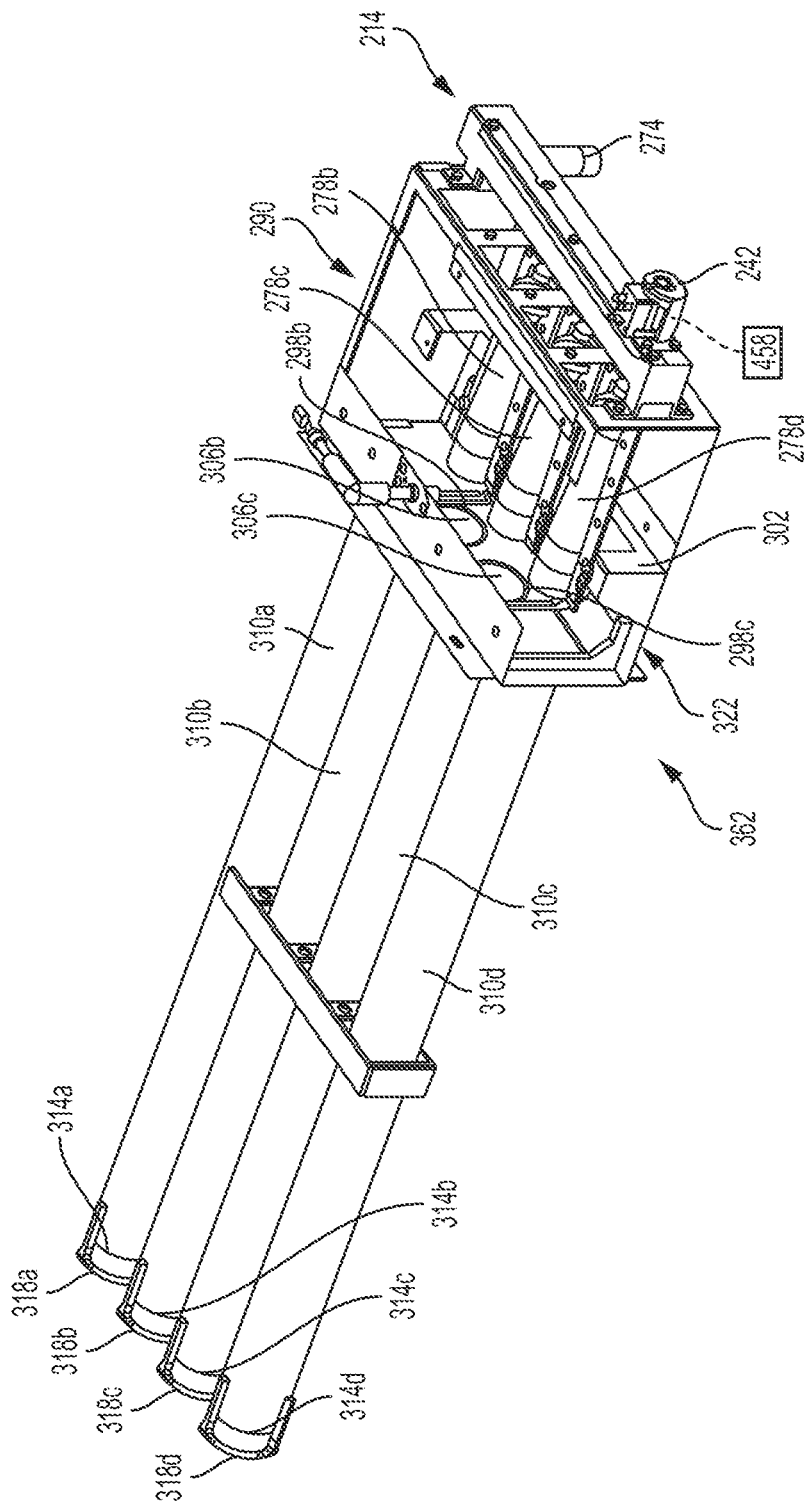
FIG. 22 is a perspective view of a burner support housing engaged with a manifold, a plurality of burners, and a plurality of heat exchange tubes.
Figure 23:
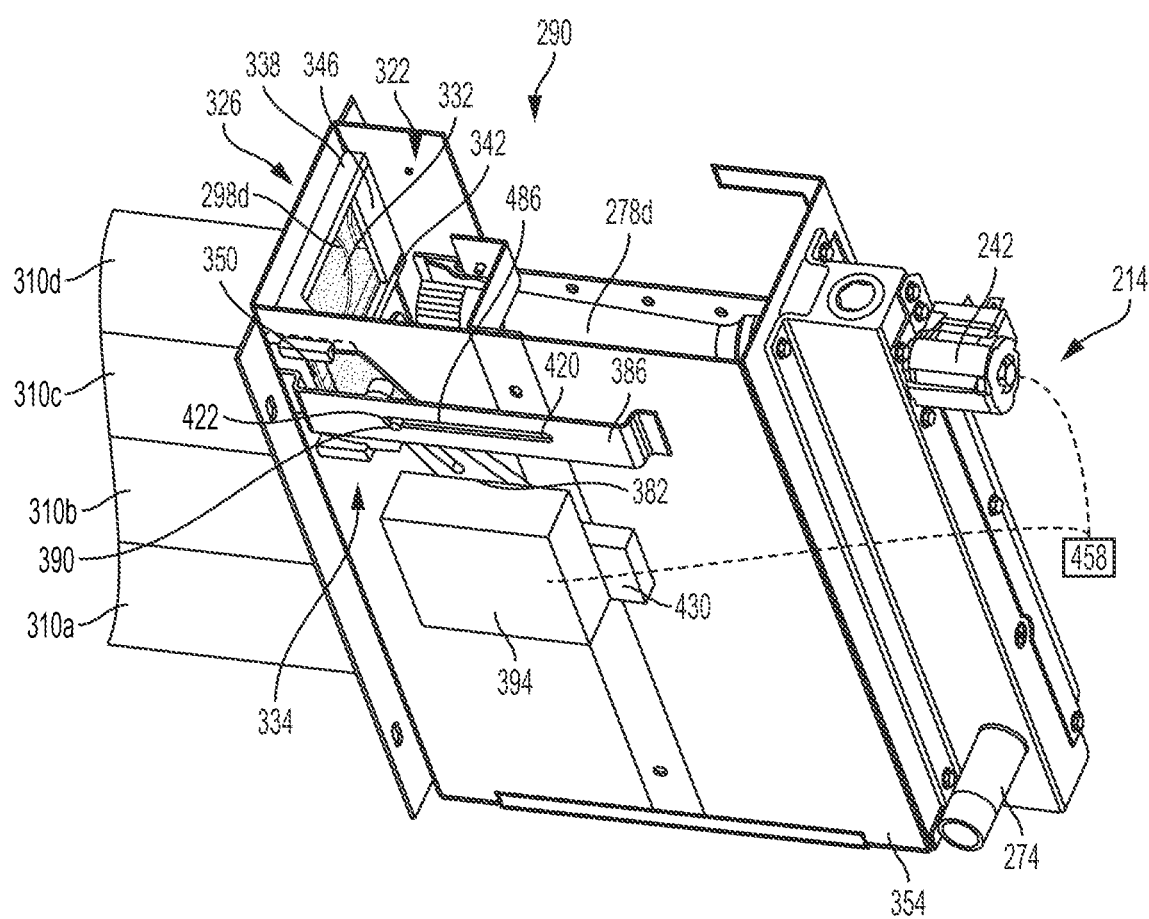
FIG. 23 is a perspective view of a slide mechanism engaged with the burner support housing of FIG. 22 according to one embodiment.
Figure 24A:
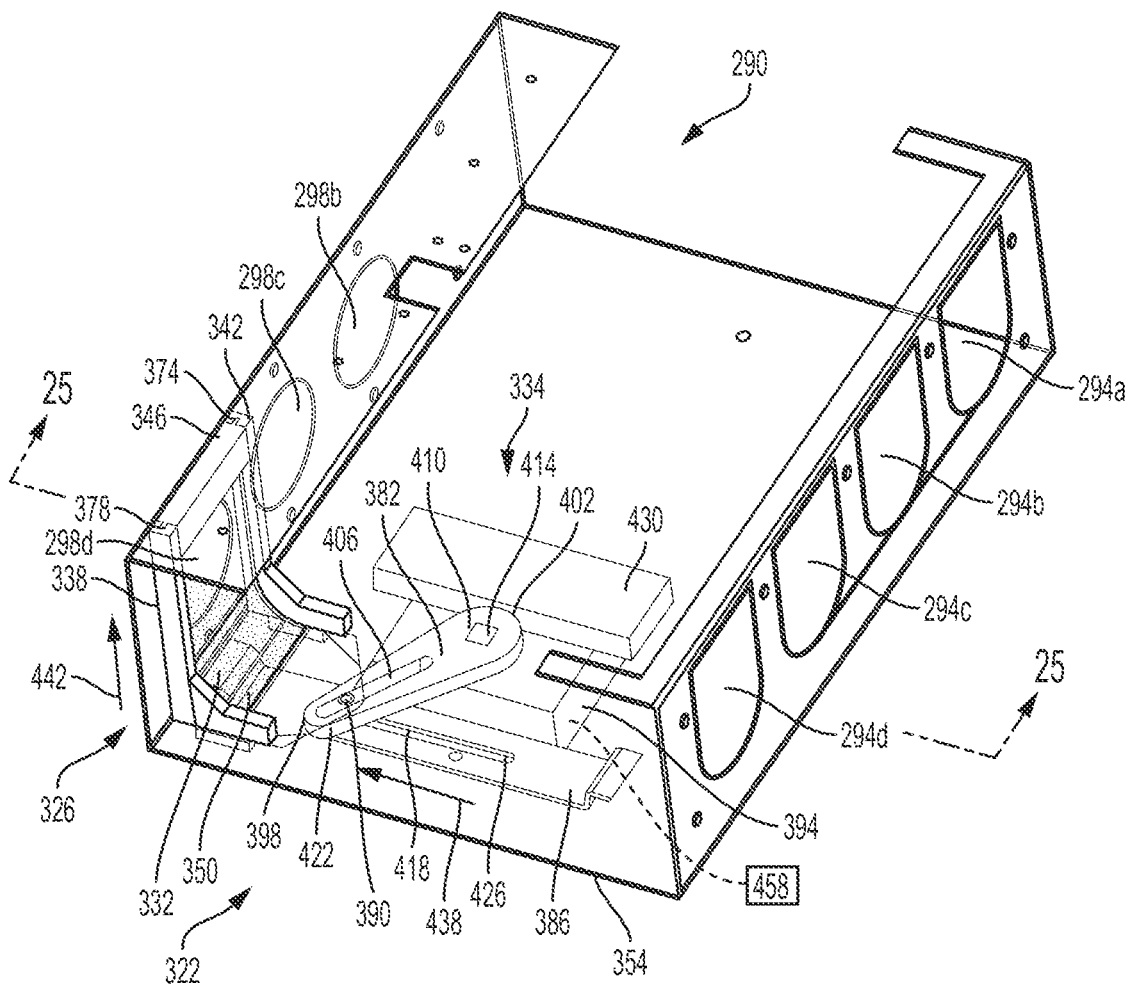
FIG. 24*a* is a perspective view of the slide mechanism of FIG. 23 in a closed position and engaged with the support burner housing of FIG. 22, with some parts made translucent to reveal other parts.
Figure 24B:
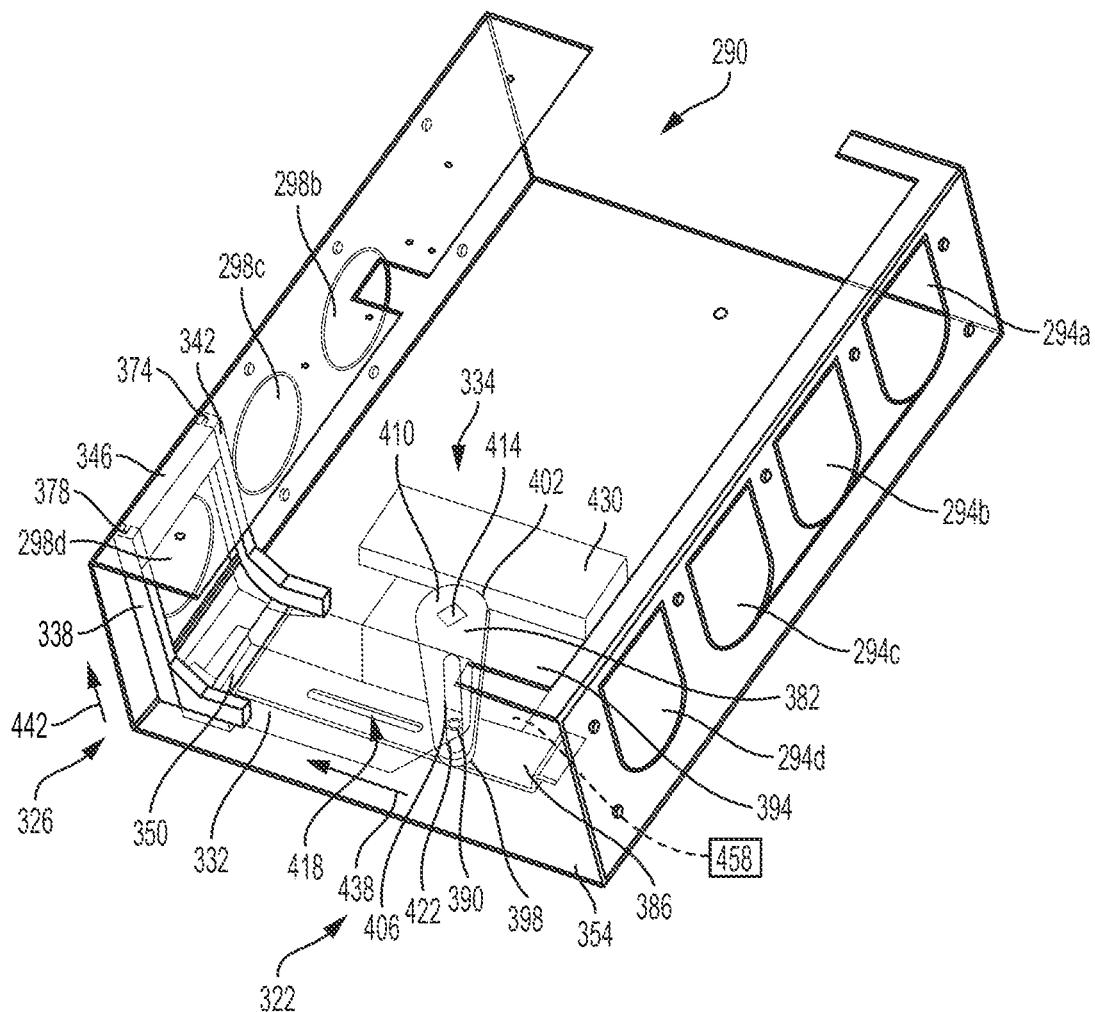
FIG. 24*b* is a perspective view of the slide mechanism of FIG. 23 in an open position and engaged with the support burner housing of FIG. 22, with some parts made translucent to reveal other parts.
Figure 25:
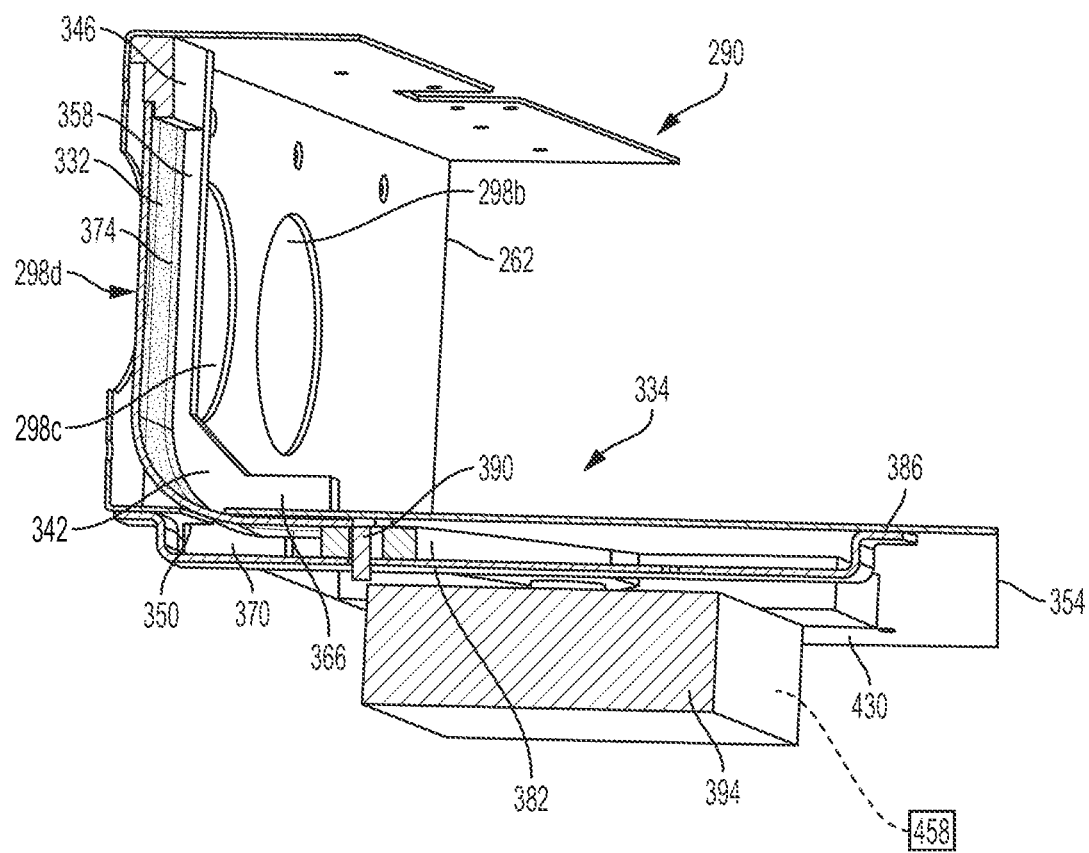
FIG. 25 is a section view of the slide mechanism engaged with the burner support housing of FIG. 24*a*, taken along line 25-25.

FIGS. 22 and 23 show a gas manifold 214 for installation in an oven 20 according to some embodiments. The gas manifold 214 may be mounted to a burner housing 290. With reference to FIGS. 24a, 24b, and 25, the burner housing 290 includes burner inlets 294a-d and heat exchange inlets 298b-d. As described above in connection with FIGS. 17-21, the burners 278b-d are mounted to the gas outlets 262b-d (see FIGS. 20 and 21), respectively, and are positioned within the burner housing 290. The burners 278b-d are supported by a burner support 302 (see FIG. 22). A first end 306b-d of each heat exchange tube 310b-d is connected to each of the heat exchange inlets 298a-d of the burner housing 290. A second end 314b-d of each heat exchange tube 310b-d is in fluid communication with a plenum of the oven 20 (not shown). A target 318b-d is positioned proximate the second end 314b-d of each of the heat exchange tubes 310b-d. The targets 318b-d are spaced from the second ends 314b-d of the heat exchange tubes 310b-d to restrict (slow) the flow of flue gasses from the heat exchange tubes 310b-d during operation of the oven 20 and to prevent flames from lifting off of the burners 278b-d. Each of the burners 278b-d is aligned with a respective heat exchange tube 310b-d so that burners 278b-d are in fluid communication with the heat exchange tube inlets 298b-d. In the illustrated embodiment, there are three burners 278b-d aligned with three heat exchange tubes 310b-d. The illustrated embodiment shows a heat exchange tube 310a that is not in fluid communication with a burner (i.e. "dummy" tube). The heat exchange tube 310a is positioned adjacent one of the heat exchange tubes 310b-d. A first end 306a of the heat exchange tube 310a is positioned adjacent the burner housing 290, and a second end 314a of the heat exchange tube 310a is in fluid communication with a plenum of the oven 20 (not shown). A target 318a is positioned adjacent the heat exchange tube 310a. The burner housing 290 does not include a heat exchange tube inlet aligned with the heat exchange tube 310a, so that the heat exchange tube 310a that is not in fluid communication with one the burners 278b-d is not in fluid communication with the burner housing 290. Such an arrangement prevents the heat exchange tube 310a from drawing relatively cool air into the plenum of the oven 20. Alternate embodiments may include more or less burners, some or all of which are supported in other manners (e.g., with different structure for supporting each burner as an alternative to the illustrated burner support 302, with no burner support, and the like). In some embodiments having four burners, the heat exchange tube 310a is in fluid communication with the housing 290 and one of the burners, as described above with respect to heat exchange tubes 310b-c.

In some embodiments, it is desirable to prevent air passage through the heat exchanger tube 310d corresponding to the burner 278d when the burner 278d is off. Such air passage can result in heating inefficiencies during operation of the other burners 278b and 278c. For this purpose, and as shown in FIG. 23, the heat exchange tube 310d that corresponds to (e.g., is aligned with) the burner 278d is selectively covered by a damper assembly 322. The burner 278d is connected to the outlet 262d, which is better shown in FIGS. 17-20. As will be described in greater detail below, the damper assembly 322 is configured to block access to the heat exchange tube 310d when the gas valve 242 is in the closed position and prevents gas flow to the third burner 278d.

As shown in FIGS. 23-25, the damper system 322 includes a damper support 326, a damper 332, and a damper actuator 334. In the illustrated embodiment, the damper support 326 includes a first side bracket 338, a second side bracket 342, and a connecting bracket 346. With reference to FIGS. 23, 24a, and 24b, the first side bracket 338 and the second side bracket 342 of the illustrated embodiment are positioned within a slot 350 formed in a bottom 354 of the burner housing 290, whereas the connecting bracket 346 is positioned above the first side bracket 338 and the second side bracket 342. The first side bracket 338 and the second side bracket 342 are substantially L-shaped, and are positioned on either side of the heat exchange tube inlet 298*d*. The first side bracket 338 is substantially similar to the second side bracket 342. Accordingly, only the second side bracket 342 will be described in detail below.

With reference to FIG. 25, a first portion 358 of the second side bracket 342 is engaged with a side 262 of the burner housing 290, and a second portion 366 of the second side bracket 342 is positioned along the bottom 354 of the burner housing 290. The second portion 366 includes a protrusion 370 that extends through a slot 350 formed in the bottom 354 of the burner housing 290. The second side bracket 342 also includes a track 374 that extends along the first portion 358 and along the protrusion 370 of the second portion 366 so that the track 374 extends through the slot 350 from one side of the bottom 354 of the burner housing 290 to an opposite side thereof.

The damper 332 is made from a flexible, thermostable material such as aluminum or polytetrafluroethylene (PTFE). The damper 332 is positioned along the tracks 374, 378 in the first side bracket 338 and the second side bracket 342, respectively. The damper 332 is movable between a first position (FIG. 24*a*) in which the inlet 298*d* to the heat exchange tube 310*d* is blocked, and a second position (FIG. 24*b*), in which the inlet 298*d* to the heat exchange tube 310*d* is open. In some embodiments, the damper 332 is continuously positionable (i.e., capable of being moved and stopped to any position in a range of positions) along the tracks 374, 378.

Although the damper support 326 in the illustrated embodiment includes the side brackets 338, 342, connecting bracket 346, and tracks 374 along which the damper 332 is moved, it should be noted that any other structure performing the same function (i.e., guiding and supporting the damper 332 in movement between opened and closed positions as described above) can instead be used, such as any other suitable frame or bracket at least partially surrounding the first heat exchange inlet 298*d*. Also, although the damper support 326 is shown secured to the burner housing 290 by protrusions 370 extending through slots 350 in the bottom 354 of the burner housing 290, it should be noted that the damper support 290 can be secured to and/or with respect to the bottom 354 or any other wall or structure of the burner housing 290 in any manner desired, such as by adhesive or cohesive bonding material, fasteners, snap-fit connections, inter-engaging elements, and the like.

With continued reference to the embodiment of FIGS. 22-25, a number of other dampers and damper materials can be used to perform the same function as the damper 332 described above. For example, rather than utilizing a flexible, thermostable material such as aluminum or polytetrafluroethylene (PTFE), more rigid and inflexible materials can still be used for the damper 332. For example, the damper 332 can be constructed of rigid bars of material hinged together (whether via hinge elements pivotably connected to like the roll top of a roll-top desk) to flex while running along the tracks 374 of the damper support 326 described above.

The damper actuator 334 of the illustrated embodiment is mounted to the bottom 354 of the burner housing 290 and includes an arm 382, a damper guide 386, a pin 390, and a motor 394. As shown in FIGS. 24*a* and 24*b*, the arm 382 has a first end 398 and a second end 402. A slot 406 extends from the first end 398 along a length of the arm 382. The second end 402 of the arm 382 includes an opening 410 sized to engage an output shaft 414 of the motor 394. The damper guide 386 is secured to the bottom 354 of the burner housing 290, and can extend substantially parallel to the burners 278*b*-*d* as shown. The illustrated damper guide 386 includes a longitudinally extending slot 418. The pin 390 is engaged with the damper 332 and is positioned within the slot 406 of the arm 382 and the slot 418 of the damper guide 386. The pin 390 is movable from a first position proximate a first end 422 of the damper guide 386 (FIGS. 24*a* and 24*b*) and a second position proximate a second end 426 of the damper guide 386. In the illustrated embodiment, the motor 394 is a non-spring return motor capable of at a least a 0° and 90° range of motion, and is secured to the bottom 354 of the burner housing 290 by a motor mounting block 430, although other suitable motor mounts can instead be used as desired. In other embodiments, however, any other type of prime mover (e.g., solenoid, hydraulic or pneumatic actuator, rotary magnetic system, and the like) can instead be used to move the arm 382, or to otherwise directly or indirectly move the damper 332 between its opened and closed positions.

In the illustrated embodiment, one of the heat exchange inlets 298*d* of the burner housing 290 is provided with a damper system 322. However, in other embodiments two or more damper systems 322 can be provided on the burner housing 290 to perform similar functions (i.e., on other heat exchange inlets 298*b*, 298*c*) as the damper system 322 described above for heat exchange inlet 298*d*. In this regard, each such damper system 322 can be individually controllable and actuatable with its own damper support, damper, and damper actuator in the manner described above with regard to the damper system 322 for heat exchange inlet 298*d*. Any number of the same or different damper systems 322 can be installed and used on the burner housing 290 as desired.

Also, although the damper 332 of the illustrated damper system 322 slides along tracks 374 of the damper support 326, and in so doing flexes as it turns a corner between opened and closed positions, the damper 332 can be installed and actuated in a number of other ways to selectively cover and close the heat exchange inlet 298*d*. By way of example only, the damper 332 can slide along straight tracks in a damper support 290 in which the damper 332 only translates to and from a position closing the heat exchange inlet 298*d*, can rotate or pivot toward and away from such a position, or can move toward and away from such a position in any other manner. Depending at least in part upon the shape and orientation of the damper support 326 with respect to the burner housing 290, such damper movement can be established by flexible or inflexible dampers 332 driven by any of the actuators described herein.

Figure 26:
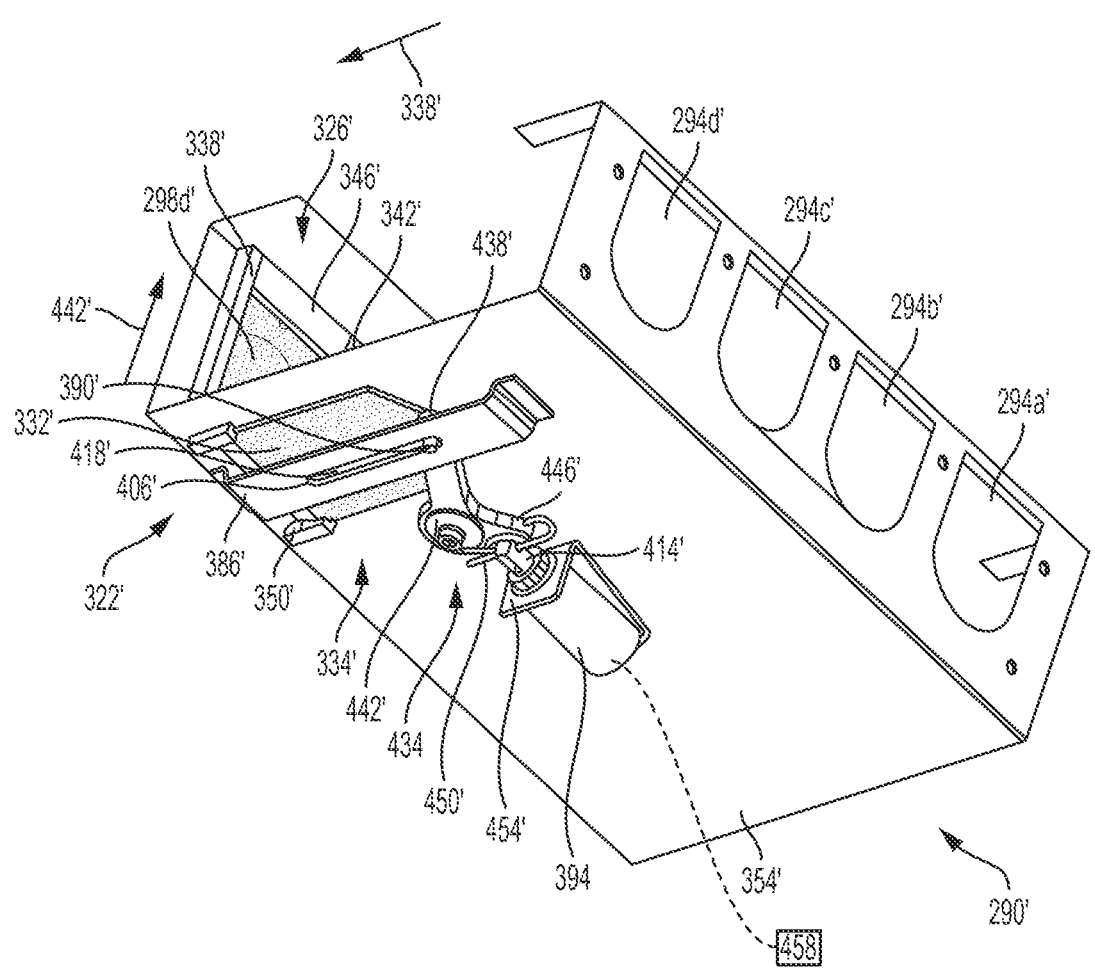
FIG. 26 is a perspective view of a slide mechanism engaged with the burner support housing of FIG. 22, shown in an open position according to an alternative embodiment.
Figure 27:
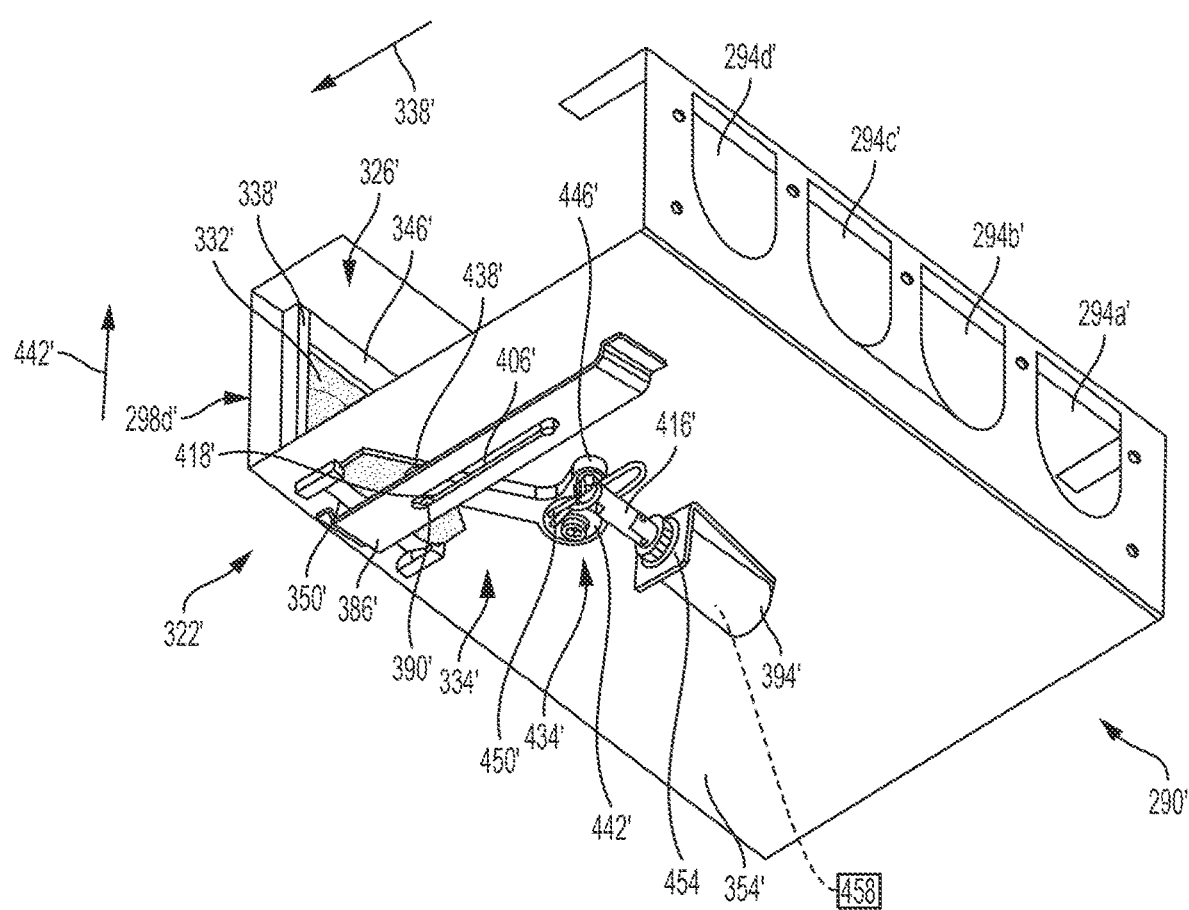
FIG. 27 is a perspective view of the slide mechanism of FIG. 26, shown in the closed position.
Figure 28:
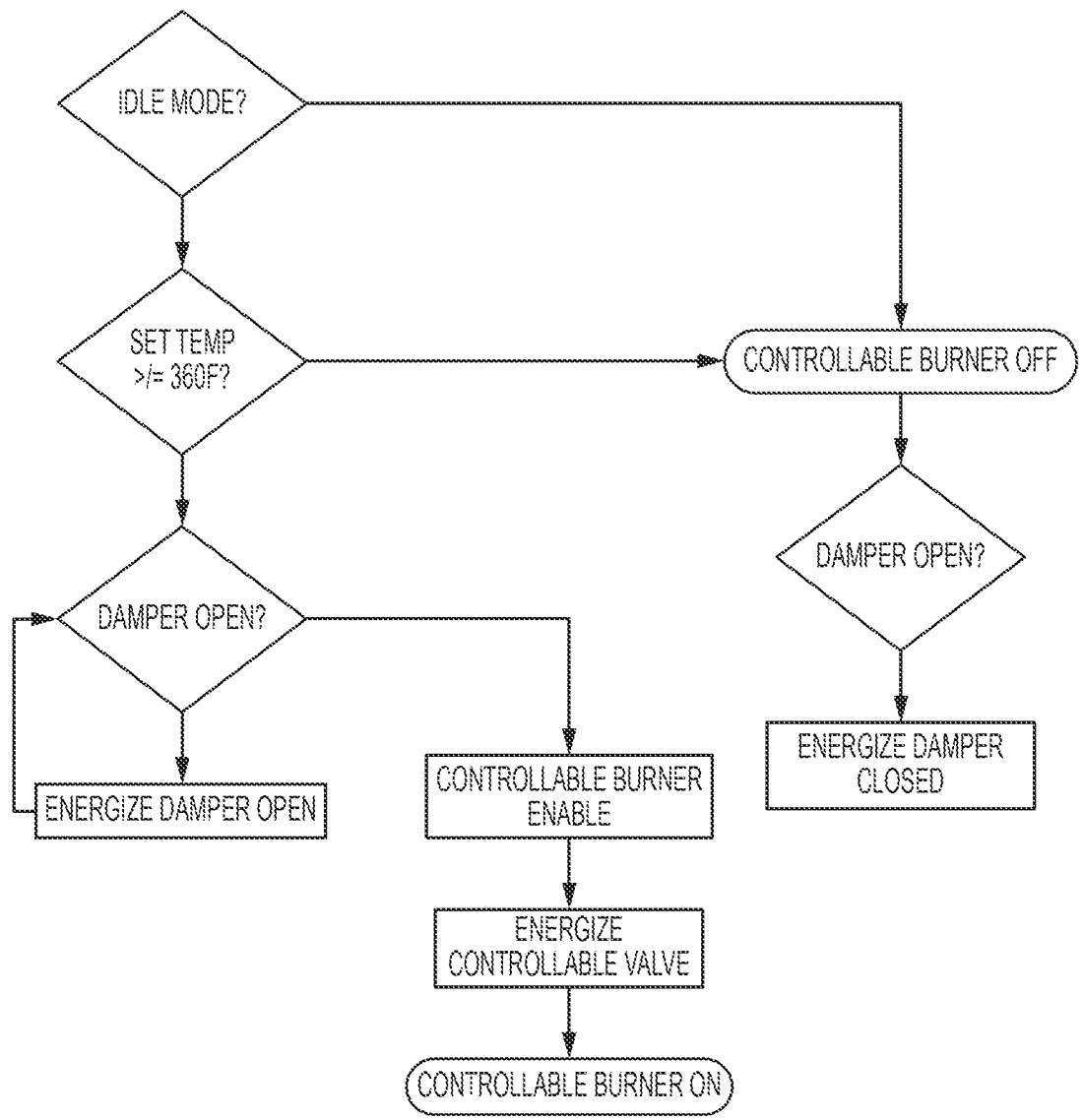
FIG. 28 is a flowchart illustrating an exemplary slide mechanism control logic for the conveyor oven of FIG. 22.
Figure 29:
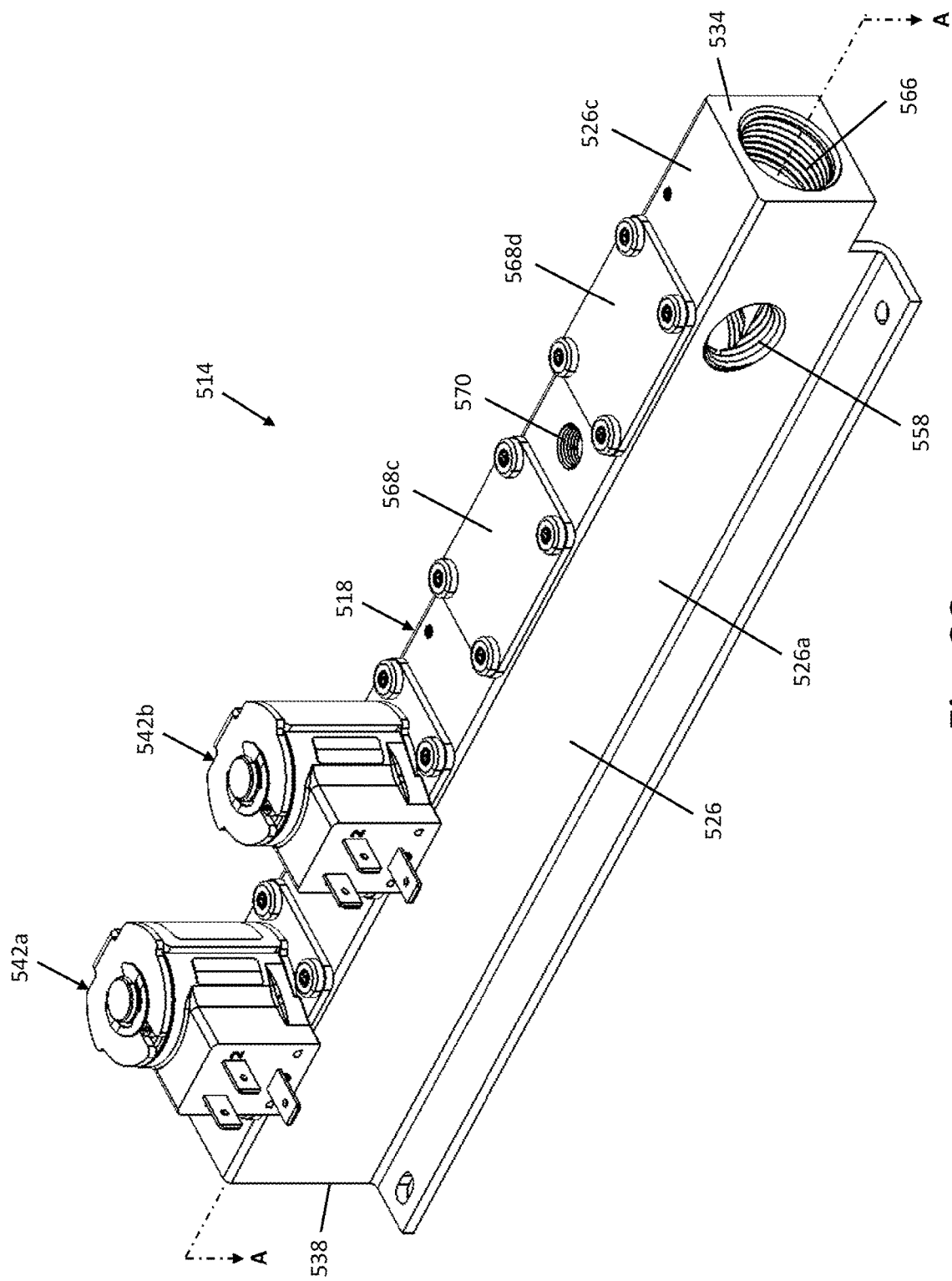
FIG. 29 is a left perspective view of another embodiment of a gas manifold.
Figure 30:
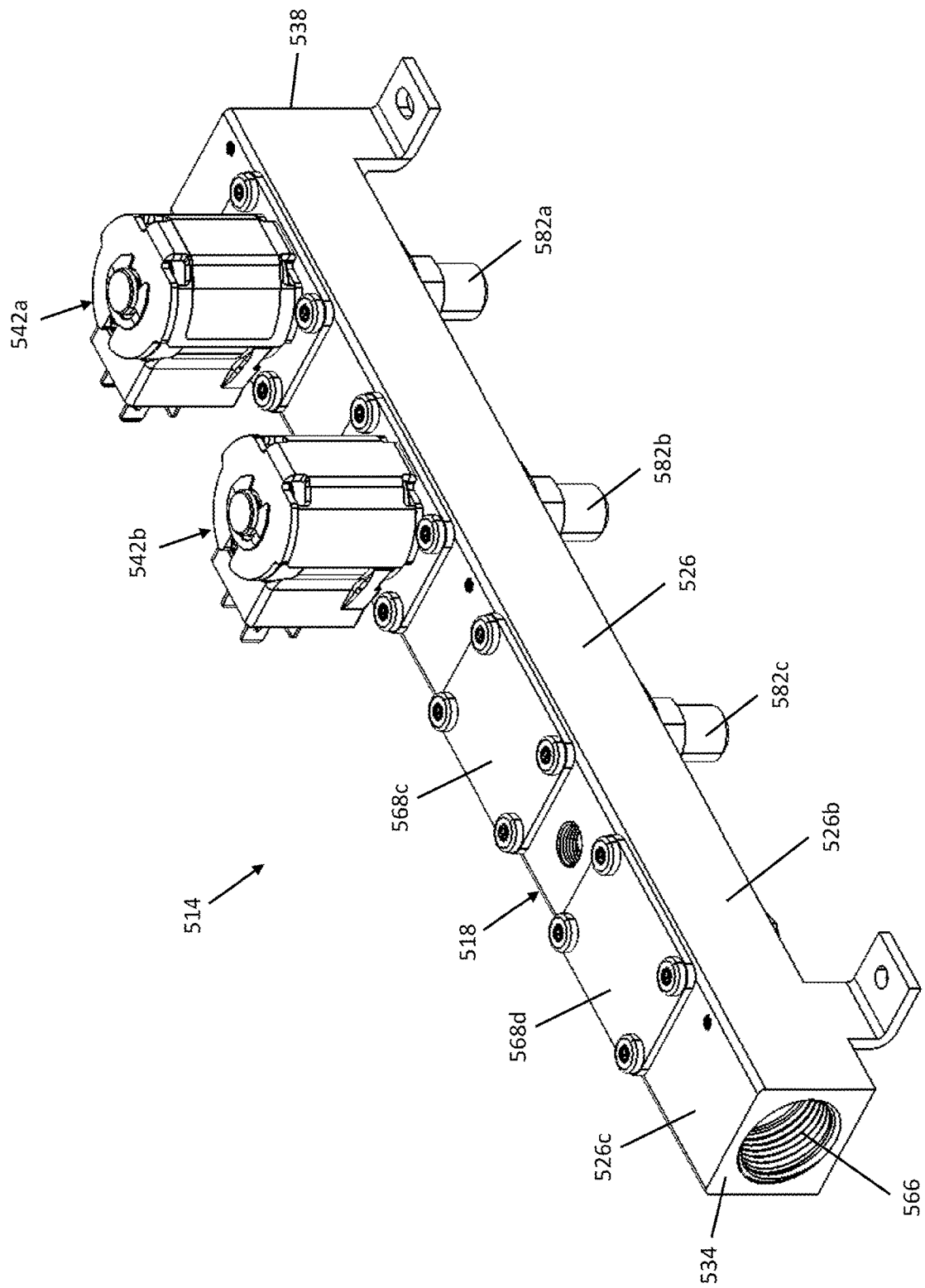
FIG. 30 is a right perspective view of the gas manifold of FIG. 29.

FIGS. 26 and 27 show an alternate embodiment of a damper system 322'. The damper system 332' includes a damper support 326', a damper 332', and a damper actuator 334'. The damper support 326' and the damper 332' are substantially the same as described above in connection with FIGS. 22-25, and will not be described in detail below. Reference is hereby made to FIGS. 22-25 and the accompanying text for further description of the elements and features of the damper support 326' and damper 332' (and alternatives thereto). Like parts in FIGS. 26 and 27 are referred to with like numbering, wherein parts of the damper system 322' will be indicated with the prime symbol "'".

As shown in FIGS. 26-27, the damper actuator 334' is mounted to a bottom 354' of a burner housing 290' and includes an arm 434', a damper guide 386', a pin 390', and a solenoid 394'. With continued reference to FIGS. 26-27, the illustrated arm 434' is substantially "L"-shaped, and has a first end 438', a central portion 442', and a second end 446'. The first end 438' is engaged with the damper 332' and includes the downwardly extending pin 390'. The pin 390' is received in a slot 406' of the damper guide 386'. The central portion 442' is pivotally mounted to the burner support housing 290'. The second end 446' of the illustrated arm 434' is engaged with an output shaft 414' of the solenoid 394'. The second end 446' of the arm 434' may be secured to the solenoid 394' using a clip 450' as shown in FIGS. 26-27, or may be connected to the output shaft 414' of the solenoid 394' using other fastening devices. In the illustrated embodiment of FIGS. 26 and 27, the solenoid 394' may be a linear actuator, and is secured to the bottom 354' of the burner housing 290' by a support bracket 454'.

The damper guide 386' of the illustrated embodiment of FIGS. 26 and 27 is secured to the bottom of the burner housing 290' and can extend substantially parallel to the burners 278b-d as shown. The damper guide 386' includes a longitudinally extending slot 418'. The pin 390' engaged with the first end 422' of the arm 434' is positioned within the slot 418' of the damper guide 386', and is movable from a first position proximate a first end 422' of the damper guide 386' (FIG. 27) and a second position proximate a second end 426' of the damper guide 386' (FIG. 26).

In the illustrated embodiment of FIGS. 26 and 27, the solenoid 394' is a two-position linear actuator, for example, a spring-returned solenoid, and is secured to the bottom 354' of the burner housing 290' by a support bracket 454'. With reference to FIGS. 23-28, in operation, the controller 458 determines whether controllable burner 278d is off. When the controllable burner 278d is off, the controller 458 actuates the motor 394 or solenoid 394' to close the damper 332, 332'. To close the damper 332, 322', the controller 458 commands the motor 394 or solenoid 394' to rotate the output shaft 414, 414' a calculated degree. The rotation of the output shaft 414, 414' rotates the arm 382, 434'. As a result, the pin 390, 390' moves along the slot 418, 418' of the damper guide 386, 386' to move the damper 332, 322' in a direction shown by arrow 438, 438' along the bottom 354, 354' of the burner housing 218, 218' and in a direction shown by arrow 442, 442' along the tracks 374, 378, 374', 378', of the first side bracket 338, 338' and the second side bracket 342, 342' into the closed position. In some embodiments, the controllable burner 278d is always off when the oven 20 is operating in the idle mode. In such embodiments, the controller 458 determines whether the oven is operating in the idle mode. When the oven 20 is entering into or operating in the idle mode, the controllable burner 278d is off, so the controller 434 actuates the motor 394 to close the damper 332.

When the oven 20 is not operating in the idle mode or is exiting the idle mode, in some embodiments the controller 458 senses a temperature of the cooking chamber of the oven 20. In the illustrated embodiment, when the sensed temperature is below a threshold temperature (e.g., 360° F.), the controller 458 turns the controllable burner 278d off and actuates the motor 394 or solenoid 394' to move the damper 332, 332' to the closed position as described above. If the controller 458 senses that the temperature is above a threshold temperature (which can be the same or different from the threshold temperature just described), the controller 458 turns the controllable burner 278d off and actuates the motor 394 or solenoid 394' to move the damper 332, 332' to the closed position as described above.

When the controller 458 determines a need to activate the controllable burner 278, the controller 458 determines whether the damper 332 is in an open or a closed position. To open the damper 332, 332', the controller 458 commands the motor 394 or solenoid 394' to rotate the output shaft 414, 414' a calculated degree. The rotation of the output shaft 414, 414' rotates the arm 382, 434'. As a result, the pin 390, 390' moves along the slot 418, 418' of the damper guide 386, 386' to move the damper 332, 322' in a direction opposite to that shown by arrow 438, 438' along the bottom 354, 354' of the burner housing 218, 218' and in a direction opposite to that shown by arrow 442, 442' along the tracks 374, 378, 374', 378', of the first side bracket 338, 338' and the second side bracket 342, 342' into the open position. In some embodiments, when the controller 458 senses that the damper 332, 332' is in the open position, the controller 458 energizes the gas valve 242 to bring the controllable gas outlet 262d into communication with the interior volume 230 of the gas manifold 214, and ignites the controllable burner 278d. The controller 458 can be programed so that the controllable burner 278d is never ignited when the damper 332, 332' is closed.

Figure 32:
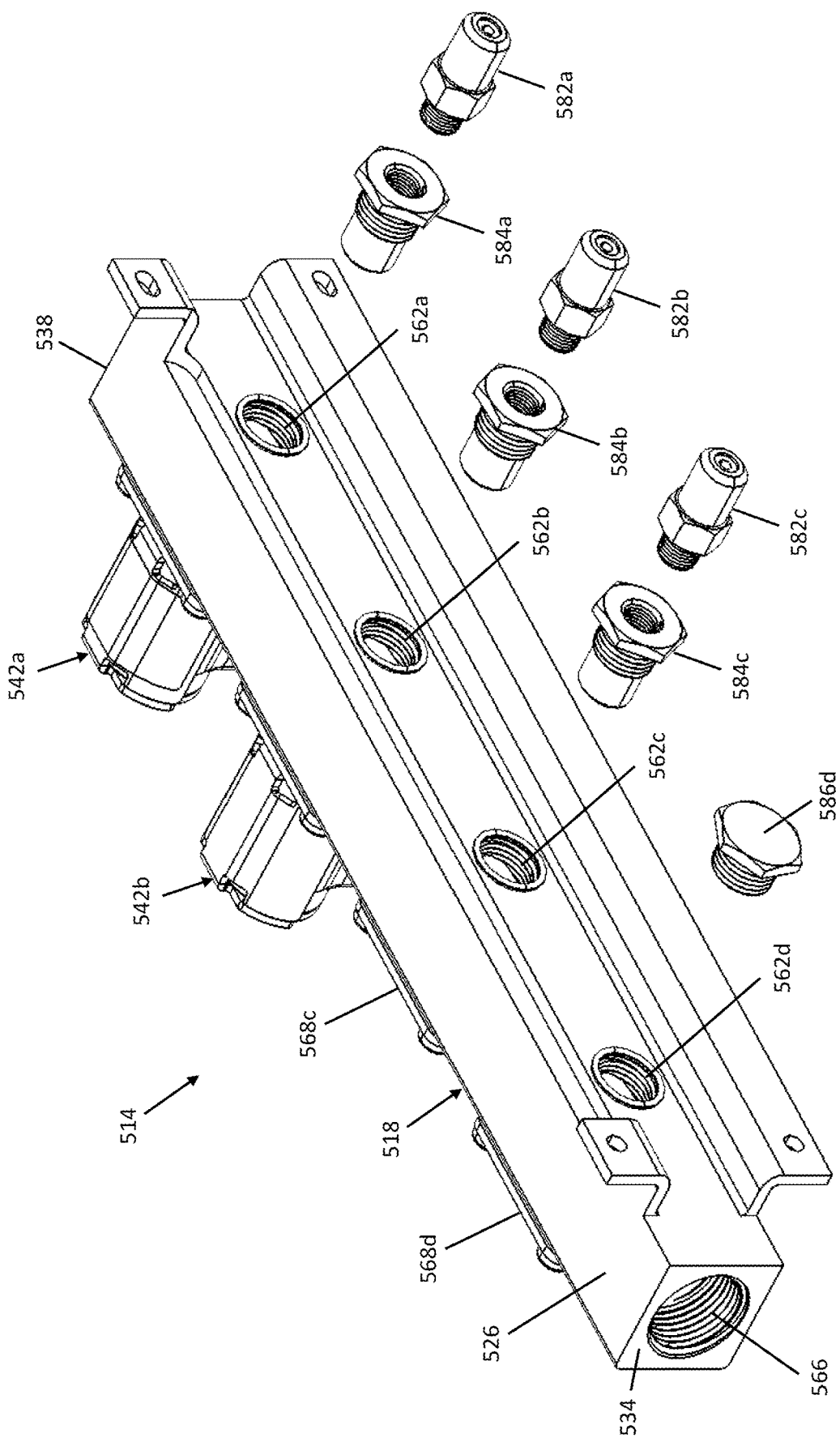
FIG. 32 is a partially exploded bottom perspective view of the gas manifold of FIG. 29.
Figure 33:
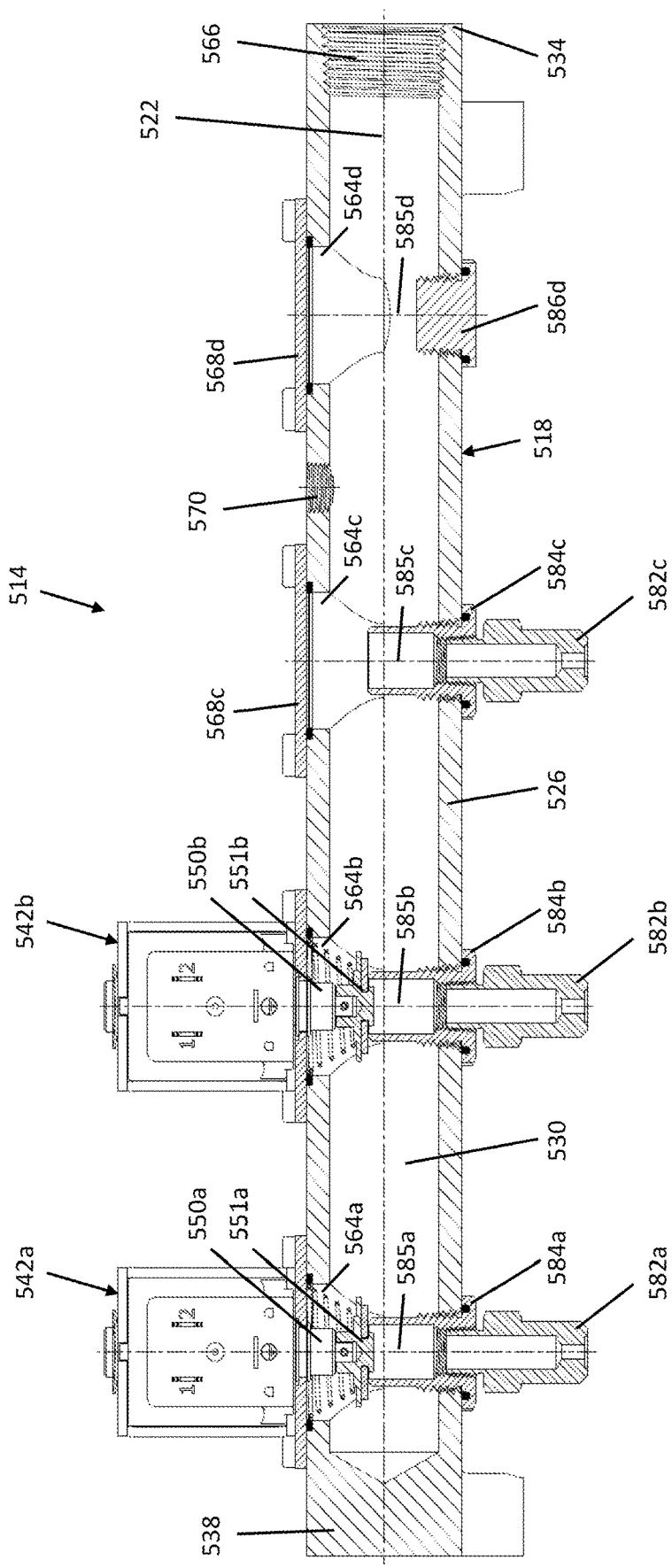
FIG. 33 is a section view of the gas manifold of FIG. 29 taken along line 18-18 and showing a plurality of manifold valve each in a closed position.
Figure 34:
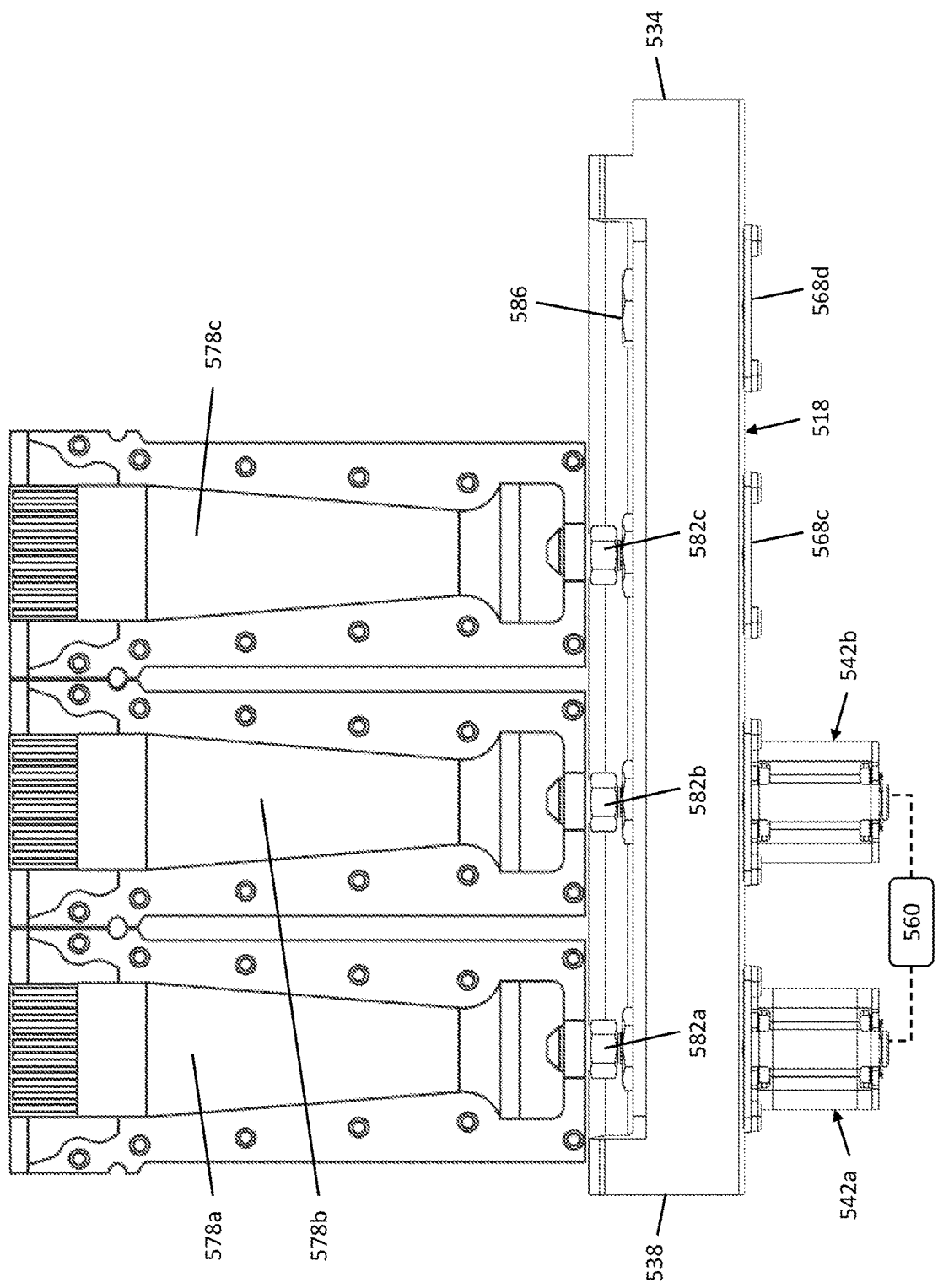
FIG. 34 is a side view of the gas manifold of FIG. 29 engaged with a plurality of burners.

FIGS. 29-34 show an alternate embodiment of a gas manifold 514 for regulating the supply of gas to a set of gas burners 578 (FIG. 34). With the exception of structure and features described above and illustrated in FIGS. 1-21 that are incompatible with the embodiment of FIGS. 29-34, reference is hereby made to the embodiments of FIGS. 1-21 described above for a more complete description of the features and elements of the embodiments of FIGS. 29-34 (and possible alternatives thereto), which above descriptions apply equally to the embodiments of FIGS. 29-34, with like elements being identified by like reference numbers in the 500-series of reference numbers. The gas manifold 514 is modular and can be reconfigured to operate a different number of burners 578 independently of each other as explained below.

As shown in FIGS. 29-34, the gas manifold 514 includes an elongated housing 518 that defines a longitudinal axis 522 extending through a first end 534 of the housing 518 and a second end 538 of the housing 518 spaced apart from the first end 534. The housing 518 can comprise either a one-piece unit or multiple units connected together, as described above in connection with the housing 114 of the embodiments of FIGS. 8-16. In the illustrated embodiment of FIGS. 29-34, the housing 518 is constructed of a single integral unit and may produced by machining operations (e.g., drilling, milling, and the like) on a piece of metal to create the various features of the housing 518 described herein. The housing 518 defines an interior volume 530 that is at least partially enclosed by a wall 526. In the exemplary embodiments of FIGS. 29-34, the wall 526 extends continuously between the first end 534 and the second end 538 in a direction parallel to the longitudinal axis 522 for the entire length of the housing 518 and has a rectangular outer perimeter defined by a first sidewall 526a, a second sidewall 526b opposite the first sidewall 526a, a third sidewall 526c, and a fourth sidewall 526d opposite the third sidewall 526c. In the illustrated embodiment, the interior volume 530 has a circular cross section along the longitudinal axis 522 extending between the first end 534 and the second end 538 of the housing 518, although other cross-sectional shapes are possible, including without limitation other rounded or polygonal cross-sections. In other embodiments, the housing 518 may be an extruded part having a through opening that extends along the longitudinal axis 522 between the first end 534 and the second end 538 of the housing 518 to define at least a portion of the interior volume 530, wherein each end of the through opening can be engaged with a plug (not shown) to prevent gas in the interior volume 530 from flowing out of the ends of the through opening.

The housing 518 includes a gas inlet 558, a plurality of gas outlets 562 (FIG. 32), and a plurality of valve openings 564 (FIG. 33), and can also include a first opening 566 and/or a second opening 570 such as those shown in FIGS. 29-33. The gas inlet 558, the plurality of gas outlets 562, the plurality of valve openings 564, the first opening 566, and the second opening 570 of the illustrated embodiment are formed within the wall 526 of the housing 518. The gas inlet 558 is in fluid communication with the interior volume 530 of the housing 518 such that gas flowing through the gas inlet 558 is received within the interior volume 530. The gas inlet 558 of the illustrated embodiment is formed in the first sidewall 526a. However, the gas inlet 558 can be formed in any of the sidewalls 526a-526d of the housing 518 based upon other configurations of the gas manifold 514. The gas inlet 558 may be threaded and sized to receive a gas conduit (e.g., gas conduit 274 shown in FIGS. 22-23), although any other suitable type of connection to an upstream gas supply line can instead be used. The gas conduit is coupled to a gas supply (not shown) and allows gas to enter the interior volume 530.

Figure 31:
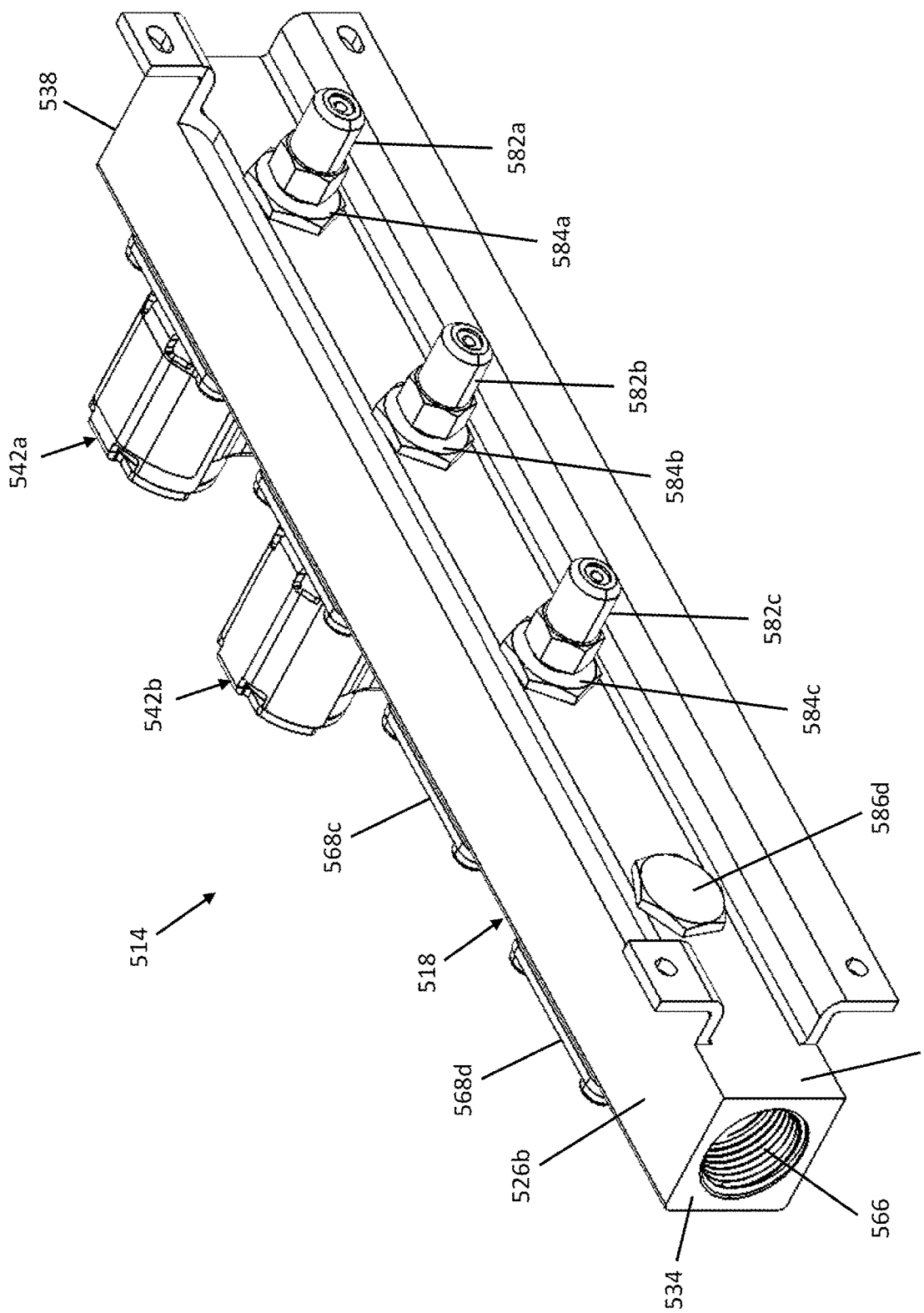
FIG. 31 is a bottom perspective view of the gas manifold of FIG. 29.

As shown in FIGS. 31-32, each gas outlet 562 is in fluid communication with the interior volume 530 and extends through the wall 526 of the housing 518. In the illustrated embodiment, the plurality of gas outlets 562 includes four gas outlets 562a-d. The gas outlets 562a-d are positioned along the wall 526 of the housing 518 and are spaced apart from the gas inlet 558 in respective positions downstream of the gas inlet 558. For example, the gas outlets 562a-d of the illustrated embodiment are spaced apart from one another along the axis 522 between the first end 534 and the second end 538 of the housing 518, and can be positioned on the same side of the housing 518, such as in the manner shown in FIGS. 29-34. Alternatively, different numbers and arrangements of gas outlets 562 are possible. For example, at least two gas outlets 562 may be positioned above one another in a direction perpendicular to the axis 522 on the same side of the housing 518, or at least two gas outlets 562 may be spaced apart from one another along the axis 522 and positioned on different sides of the housing 518.

Each gas outlet 562 may be sized to interchangeably receive a seat insert 584 or a plug 586. In some embodiments, each gas outlet 562 may be removably coupled with a seat insert 584 or a plug 586. In the illustrated embodiment, for example, each gas outlet 562 may be threadedly engaged with a seat insert 584 or a plug 586, for example, internal threads of each gas outlet 562 mating with external threads of a seat insert 584 or a plug 586. In particular, the first three gas outlets 562a-c of the illustrated embodiment are threadedly engaged with seat inserts 584a-c, respectively, and the fourth gas outlet 562d is threadedly engaged with a plug 586d. Each of the seat inserts 584a-c received in one of the gas outlets 562a-c is removable and can be replaced with an additional plug 586. Likewise, the plug 586d received in the gas outlet 562d is removable and can be replaced with an additional seat insert 584. In other embodiments, the gas outlets 562 may be coupled to the seat inserts 584 or the plugs 586 by a fastener, a press fit, a snap fit, a weld, a braze, or by any other suitable method of attachment.

Each of the seat inserts 584a-c has a hollow passageway to discharge gas from the interior volume 530 as shown in FIG. 33. In the illustrated embodiment, each of the seat inserts 584a-c is an elongated seat insert that defines a longitudinal axis between opposite open ends of the seat insert. The hollow passageway of each of the seat inserts 584a-c of the illustrated embodiment extends between the open ends of the seat insert along its longitudinal axis 585a-c. A portion of each of the seat inserts 584a-c extends into the interior volume 530. The longitudinal axis of each of the seat inserts 584a-c can be substantially perpendicular to the longitudinal axis 522 of the housing 518 when the seat insert is received in one of the gas outlets 562a-c, by way of example.

As shown in FIG. 34, the seat inserts 584a-c are each in fluid communication with a burner 578a-c, respectively. For example, in the illustrated embodiment, the seat inserts 584a, 584b, and 584c are in fluid communication with burners 578a, 578b, and 578c, respectively. As a result, the gas outlets 562a-c corresponding to the seat inserts 584a-c also are each in fluid communication with the burners 578a-c, respectively. The burners 578a-c may be in-shot burners, as shown in FIG. 34, or any other suitable type of burner, including, for example, gas jet burners. As shown in FIGS. 31-34, the seat inserts 584a-c of the illustrated embodiment are coupled to the burners 578a-c by an injector 582a-c, respectively. In particular, the seat inserts 584a-c each each sized to receive an injector 582a-c. The injectors 582a-c can be substantially the same as the injectors 174 described above, and can include a hollow passageway to allow gas to pass from the interior volume 530 of the housing 518 to the burners 578a-c.

In the illustrated embodiment, each of the injectors 582a-c may be coupled to one of the seat inserts 584a-c via a threaded connection, for example, external threads of each of the injectors 582a-c mating with internal threads of the seat inserts 584a-c. With this configuration, each injector 582 is removable from a corresponding seat insert 584 and is interchangeable with another injector, for example an injector having the same or different gas flow properties. In other embodiments, each injector 582 and corresponding seat insert 584 may be permanently connected together as a single integral unit. Additionally, in some embodiments, an end of each of the injectors 582a-c opposite the gas manifold 514 is slidingly received within an inlet of a burner 578a-c. In other embodiments, supply tubes (not shown) of any length and construction (e.g., flexible or rigid) may be used with or without such injectors 582a-c to direct the gas from each seat inserts 584a-c to a corresponding burner 578a-c. Alternatively, when multiple burners 578 are configured to receive gas from a shared seat insert 584, the burners 578 may be coupled to a common supply tube (not shown) leading to the shared seat insert 584. Gas is received by the burner 578 at a proximal end, and is ignited as it passes through the burner 578, thus producing a flame at a distal end of the burner 578. Each burner 578 may have its own independent igniter (not shown), or burners may share igniters. Further, the burners 578 may include a carryover tube for carrying the ignition flame from one burner to the next that is integral to each burner or is separate from and is connected to the burners.

With continued reference to the illustrated embodiment of FIGS. 29-34, the plurality of valve openings 564 are each in fluid communication with the interior volume 530 and extend through the wall 526 of the housing 518 (FIG. 33). Each valve opening 564 is positioned along the wall 526 opposite a corresponding gas outlet 562. In the illustrated embodiment, the plurality of valve openings 564 includes four valve openings 564a-d positioned along the wall 526 at locations opposite the gas outlets 562a-d, respectively.

The gas manifold 514 may include one or more gas valves 542 that are each aligned with a corresponding valve opening 564. In the illustrated embodiment, a first gas valve 542a is aligned with the first valve opening 564a and a second gas valve 542b is aligned with the second valve opening 564b. The gas valves 542a-b can be removably coupled to the wall 526 of the housing 518 (e.g., by threaded fittings as shown in the illustrated embodiment). With this configuration, the gas valves 542a-b of the illustrated embodiment are removably installed opposite gas outlets 562a-b, respectively, and are each aligned with a corresponding seat insert 584a-b received in one of the gas outlets 562a-b. Alternatively, different numbers and arrangements of valve openings 564 and gas valves 542 are possible. For example, at least two valve openings 564 may be formed above one another in a direction perpendicular to the axis 522 on the same side of the housing 518, or at least two valve openings 564 may be spaced apart from one another along the axis 522 and formed on different sides of the housing 518.

As shown in FIG. 33, in the illustrated embodiment, each of the gas valves 542a-b is received in a corresponding valve opening 564 and includes a valve body 550a-b. Each valve body 50a-b is at least partially positioned within the interior volume 530 and is aligned with and movable along the longitudinal axis of the corresponding seat insert 584a-b. In particular, each of the valve bodies 550a-b has a valve disk 551a-b at one end that is movable with the respective valve body within volume 530. In operation, each of the valve bodies 550a-b is continuously repositionable from a closed position (FIG. 33) in which the valve disk 551a-b of valve body is seated against the corresponding seat insert 584a-b and a retracted position, including a fully open position (not shown) in which the valve disk 551a-b of valve body is seated against the housing 518. In other embodiments, the valve bodies 550a-b may initially be positioned entirely outside the interior volume 530, including, for example, in the valve opening 564.

Any valve opening 564 that does not receive a gas valve 542 can be sealed to prevent gas in the interior volume 530 from flowing out of the unused valve opening 564. In the illustrated embodiment, cover plates 568c-d are mounted over the third and fourth valve openings 564c-d, respectively, in sealing engagement with the housing 518, and can be removably coupled to the housing 518 (e.g., by threaded fittings as shown in the illustrated embodiment) to selectively cover and close the valve openings 564c-d. Each of the cover plates 568c-d covering one of the third and fourth valve openings 564c-d is removable and can be replaced with an additional gas valve 542. Likewise, each of the gas valves 542a-b installed in one of the first and second valve openings 564a-b is removable and can be replaced with an additional cover plate 568. In some embodiments, other suitable structure can instead be used to selectively seal the valve openings 564, such as any suitable plug removably and sealingly engaging with the valve openings 564, for example a plug having external threads mating with internal threads of each valve opening 564.

With reference to FIGS. 29-33, the first opening 566 can be engaged with a plug (not shown), which prevents gas in the interior volume 530 from flowing out of the first opening 566. For example, the first opening 566 may be threadedly engaged with a plug, for example, external threads of the plug mating with internal threads of the first opening 566. Any unused gas outlets 562a-d can also be engaged with a plug (e.g., plug 586 described above) based upon other configurations of the gas manifold 514, for example, via a threaded connection. In some embodiments, sensors may be installed through the openings 566, 570, or the openings 566, 570 may function as additional gas inlets or additional gas outlets. For example, in the illustrated embodiment, the second opening 570 can be used as a manifold pressure monitoring port, and so can be sized to receive via a threaded connection at least one sensor (not shown) for measuring a pressure within the manifold 514. In such embodiments, the sensor can be in communication with a main controller 560 (described in greater detail below) so that when the gas valve 542 and/or another gas control valve (e.g., main control valve 48 shown in FIG. 3A) are adjusted, the pressure within the manifold 514 can be monitored.

Additional valves may be used with the gas manifold 514 to further control the flow of gas. For example, in some embodiments, one or more gas control valves as described above in the embodiments of FIGS. 1-21, such as a modulating variable flow and/or a shut off valve (not shown), may be in fluid communication with the gas supply conduit (e.g., gas conduit 274 shown in FIGS. 22-23) upstream of the gas inlet 558. Any such valves can be positioned external to the housing 518, and can be operable to selectively control the flow of gas to the interior volume 530 of the gas manifold 514. Valves supplying gas to the gas manifold 514 can take any of the forms and can be connected and operated in any of the manners described above in connection with the embodiments of FIGS. 1-21. Reference is hereby made to these earlier embodiments for a more complete description of such valves and valve arrangements (and alternatives thereto) that can be utilized in the embodiments of FIGS. 29-34.

The gas manifold 514 can be installed in the oven 20 as a single integral unit. More specifically, in some embodiments the housing 518 and the gas valves 542 are permanently or releasably connected together (e.g., by threaded fittings as shown in the illustrated embodiment, or with clamps, brackets, fasteners, brazing, welding, or in any other suitable manner) as a single integral unit, and can therefore be mounted within the oven 20 by an installer, service technician, or other user as a single integral unit. In other embodiments, the gas control valve and/or the burners 578 are also installed with the housing 518 and the gas valves 542 as part of the same assembly (i.e., as part of the same single integral unit).

In operation, and with reference to FIG. 34, a controller 560 controls the operation of the gas manifold 514, including gas valves 542a-b and any additional valves that control the gas supply to the manifold 514. The controller 560 is substantially similar to the main controller 42 discussed above, and will therefore not be described in detail. Reference is hereby made to the embodiments of FIGS. 1-21 above for further description of the controller 560 and its operation (and alternatives thereto). The controller 560 in the embodiments of FIGS. 29-34 controls the gas valves 542a-b to regulate the flow of gas to the gas outlets 562a-b, thereby controlling operation of the burners 578a-b supplied with gas by the gas outlet 562a-b through the seat inserts 584a-b and the injectors 582a-b. In some embodiments, the controller 560 can control the gas valves 542a-b according to a set of predetermined instructions or programs. The controller 560 may also communicate with temperature sensors, position sensors, and thermocouples to control the gas valves 542a-b as described above, such as (by way of example only) to adjust the oven 20 toward a steady state temperature throughout the oven tunnel 24 or in a selected tunnel segment 20A, 20B, or to control operation of an energy savings mode as described above and in in U.S. Pat. Nos. 8,087,407 and 8,839,714, the entire contents of each of which are hereby incorporated by reference.

Additionally, the gas valves 542*a-b* can control the flow of gas to the gas outlets 562*a-b* in different ways depending at least in part upon the type of valve used, and operation of the controller 560. For example, a gas valve 542 may be a shut-off valve that includes an open state and a closed state. In such embodiments, the gas valve 542 fully blocks the flow of gas to a corresponding gas outlet 562 with the valve disk 551 seated against the inlet of the gas outlet 562 in a closed state and allows gas to flow into the gas outlet 562 with valve disk 551 retracted from the inlet of the gas outlet 562 when in an open state. Accordingly, when each of the gas valves 542*a-b* is in the open state, gas is supplied to all of the gas outlets 562*a-c*, and thus, to all of the burners 578*a-c*. When, for example, the first gas valve 242*a* is in the closed state, gas is supplied to the second and third gas outlets 562*b-c*, but is shut off from the first gas outlet 562*a*. Therefore, when the first gas valve 242*a* is in the closed state, the second and third burners 578*b-c* supplied by the second and third gas outlets 562*b-c* are turned on and can receive a modulated gas supply, while the first burner 578*a* supplied by the first gas outlet 562*a* is turned off.

Similarly, a gas valve 542 can instead be a modulating variable flow valve that modulates the flow of gas to a corresponding gas outlet 562. In such embodiments, the variable flow valve 542 can be adjusted from a fully-opened state to a fully-closed state, as well as partially-opened states between the fully-open state and the fully-closed state. Likewise, the controller 560 can control the gas supply valve (e.g., valve 48 in FIG. 3A) engaged with the gas conduit upstream of the gas manifold 514 to regulate the flow of gas to the interior volume 530. Such a gas supply valve 48 can be used to control operation of all of the burners 578*a-c* connected to the gas outlets 562*a-c*. For example, when the gas supply valve 48 blocks the flow of gas into the interior volume 530, none of the burners 578*a-c* will receive gas, whereas when the gas supply valve 48 and the gas supply valves 542*a-b* are open, gas can be simultaneously supplied and modulated to the interior volume 530, the gas outlets 562*a-c*, and the burners 578*a-c*. Similar to the gas valve 542, the gas supply valve 48 can be used to control the flow of gas to the interior volume 530 in different ways depending at least in part upon the type of valve used. The gas supply valve may be a shut off valve 48 or can instead be a modulating variable flow valve such as modulating gas valve 53 described above in connection with FIG. 3A.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. A gas manifold comprising:
a housing defining an interior volume, the housing including
a gas inlet in fluid communication with the interior volume,
a plurality of gas outlets in fluid communication with the interior volume and spaced apart along a first side of the housing, each gas outlet of the plurality of gas outlets configured to alternatively be coupled with a gas burner or a plug to close the gas outlet, and
a plurality of valve openings into the interior volume and spaced apart along a second side of the housing opposite the first side, wherein each valve opening of the plurality of valve openings is aligned opposite a gas outlet of the plurality of gas outlets, and wherein each valve opening of the plurality of valve openings is configured to removably receive a valve independently from a gas burner coupled to a gas outlet aligned opposite the valve opening; and
at least one valve coupled to the housing and received in a first valve opening of the plurality of valve openings, wherein the at least one valve is aligned with a first gas outlet of the plurality of gas outlets, and wherein the at least one valve has a first closed position to block a flow of gas from the gas inlet to a first gas burner coupled with the first gas outlet and a second open position to allow the flow of gas from the gas inlet to the first burner, the first gas burner in fluid communication with the interior volume.

2. The gas manifold of claim 1, wherein the at least one valve is removably coupled to the housing.

3. The gas manifold of claim 1, comprising a plug configured to be removably coupled with any one of the plurality of gas outlets.

4. The gas manifold of claim 1, wherein the at least one valve is configured to be selectively received in any one of the plurality of valve openings.

5. A gas manifold comprising:
a housing defining an interior volume, the housing including
a gas inlet in fluid communication with the interior volume,
a plurality of gas outlets in fluid communication with the interior volume and spaced apart along the housing, each gas outlet of the plurality of gas outlets configured to be coupled with a gas burner, and
a plurality of valve openings into the interior volume and spaced apart along the housing such that there is no fluid flow through the plurality of valve openings to the plurality of gas outlets, wherein each valve opening of the plurality of valve openings is aligned with a gas outlet of the plurality of gas outlets;
at least one valve coupled to the housing and configured to be selectively received in any one of the plurality of valve openings, wherein the at least one valve has a first position to block a flow of gas from the gas inlet to a first gas burner coupled with a first gas outlet and a second open position to allow the flow of gas from the gas inlet to the first burner, the first gas burner in fluid communication with the interior volume, wherein the first gas burner is coupled to the first gas outlet independently from the at least one valve; and
at least one cover plate configured to be coupled to the housing and selectively disposed over any one of the plurality of valve openings to close the selected valve opening.

6. The gas manifold of claim 5, wherein the at least one valve is removably coupled to the housing and the at least one cover plate is removably coupled to the housing.

7. The gas manifold of claim 5, wherein each gas outlet of the plurality of gas outlets is configured to alternatively be coupled with a seat insert or a plug to close the gas outlet.

8. A gas manifold comprising:
a housing defining an interior volume, the housing including
a gas inlet in fluid communication with the interior volume,
a plurality of gas outlets in fluid communication with the interior volume and spaced along the housing, each gas outlet of the plurality of gas outlets configured to alternatively be coupled with a gas burner or a plug to close the gas outlet, and a plurality of valve openings into the interior volume and spaced along the housing, wherein each valve opening of the plurality of valve openings is aligned opposite a gas outlet of the plurality of gas outlets such that there is no fluid flow through the plurality of valve openings to the plurality of gas outlets;

at least one valve coupled to the housing and received in a first valve opening of the plurality of valve openings, wherein the at least one valve is aligned opposite a first gas outlet of the plurality of gas outlets, wherein the at least one valve has a first position to block a flow of gas from the gas inlet to a first gas burner coupled to the first gas outlet and a second open position to allow the flow of gas from the gas inlet to the first burner, the first gas burner in fluid communication with the interior volume, and wherein the at least one valve is configured to be selectively received in any one of the plurality of valve openings; and at least one cover plate configured to be coupled to the housing and disposed over a second valve opening of the plurality of valve openings, wherein the at least one cover plate is configured to be selectively disposed over any one of the plurality of valve openings.

9. A gas manifold comprising:

a housing defining an interior volume, the housing including a gas inlet in fluid communication with the interior volume, a plurality of gas outlets in the housing and in fluid communication with the interior volume, the plurality of gas outlets spaced along the housing, each gas outlet of the plurality of gas outlets configured to alternatively be coupled with a gas burner or a plug to close the gas outlet; and a valve coupled to the housing and aligned opposite a first gas outlet of the plurality of gas outlets, wherein the valve has a first position to block a flow of gas from the gas inlet to a first gas burner coupled with the first gas outlet and a second open position to allow the flow of gas from the gas inlet to the first burner, the first gas burner in fluid communication with the interior volume, wherein the first gas burner is coupled to the first gas outlet independently from the valve.

10. The gas manifold of claim 9, further comprising an injector configured to be selectively coupled with any one of the plurality of gas outlets.

11. The gas manifold of claim 9, further comprising a plurality of burners and a plurality of injectors, wherein each one of the plurality of injectors is configured to be selectively coupled with any one of the plurality of gas outlets and each one of the plurality of gas burners is configured to be selectively coupled with any one of the plurality of injectors.

12. The gas manifold of claim 9, wherein the valve includes a valve body having a valve disk that extends into the interior volume and is configured to block the flow of gas to the first gas burner.

13. The gas manifold of claim 12, wherein the valve disk is configured to be seated against the first gas outlet of the plurality of gas outlets when the valve is in the first position.

14. The gas manifold of claim 12, wherein the valve body is continuously repositionable from a second fully open position in which the valve disk is positioned adjacent the housing opposite the first gas outlet of the plurality of gas outlets to the first closed position in which the valve disk is seated against the first gas outlet of the plurality of gas outlets.

15. The gas manifold of claim 9, wherein the first gas outlet of the plurality of gas outlets is an elongated gas outlet formed by an interior portion of the housing.

16. The gas manifold of claim 15, wherein the interior portion of the housing forms a valve seat of the first gas outlet of the plurality of gas outlets.

17. The gas manifold of claim 9, further comprising a plug configured to be removably coupled with at least one gas outlet of the plurality of gas outlets.

* * * * *